US009052802B2

(12) United States Patent
Yu et al.

(10) Patent No.: US 9,052,802 B2
(45) Date of Patent: *Jun. 9, 2015

(54) MULTIMEDIA INTERACTION SYSTEM AND RELATED COMPUTER PROGRAM PRODUCT CAPABLE OF FILTERING MULTIMEDIA INTERACTION COMMANDS

(71) Applicant: Realtek Semiconductor Corp., Hsinchu (TW)

(72) Inventors: Siu-Leong Yu, Hsinchu County (TW); Shih-Chun Wei, Hsinchu (TW); Chen Ma, San Jose, CA (US)

(73) Assignee: Realtek Semiconductor Corp., Hsinchu (TW)

( * ) Notice: Subject to any disclaimer, the term of this patent is extended or adjusted under 35 U.S.C. 154(b) by 181 days.

This patent is subject to a terminal disclaimer.

(21) Appl. No.: 13/782,400

(22) Filed: Mar. 1, 2013

(65) Prior Publication Data

US 2013/0232422 A1     Sep. 5, 2013

Related U.S. Application Data

(60) Provisional application No. 61/605,771, filed on Mar. 2, 2012, provisional application No. 61/718,182, filed on Oct. 24, 2012.

(30) Foreign Application Priority Data

Aug. 24, 2012   (TW) .............................. 101130868 A
Dec. 21, 2012   (TW) .............................. 101149214 A

(51) Int. Cl.
*G06F 3/048*        (2013.01)
*G06F 3/0484*      (2013.01)
(Continued)

(52) U.S. Cl.
CPC .............. *G06F 3/0484* (2013.01); *G06F 3/017* (2013.01); *G06F 3/0346* (2013.01);
(Continued)

(58) Field of Classification Search
CPC .............. A63F 13/06; A63F 2300/105; A63F 2300/6045; A63F 13/12; A63F 13/04; A63F 2300/8076; A63F 2300/1087; A63F 2300/8082; A63F 9/0204; G06F 3/0338; G06F 3/0383; H04M 2203/359; G01B 2210/30; G01B 5/004; A61B 2019/5268
USPC .......... 715/733; 345/156, 173, 158, 659, 649, 345/175, 679, 1.1; 463/32, 1; 709/205; 702/94, 95, 150, 152, 153
See application file for complete search history.

(56) References Cited

U.S. PATENT DOCUMENTS 7,667,646 B2     2/2010   Kalliola et al.

FOREIGN PATENT DOCUMENTS

WO            WOA1                                 6/2009
2009/074762

*Primary Examiner* — William Bashore
*Assistant Examiner* — Maria Ayad
(74) *Attorney, Agent, or Firm* — Birch, Stewart, Kolasch & Birch, LLP

(57) ABSTRACT

A multimedia interaction system is disclosed, including: a plurality of member electronic devices; a plurality of displays respectively arranged on the member electronic devices; and a location detection circuit configured to operably detect respective member electronic device's spatial position and orientation dynamically and to transmit detection results to at least one of the member electronic devices. When an user instructs a source electronic device of the member electronic devices to transmit a target image object toward a target direct, a candidate electronic device of the member electronic devices would execute a target command corresponding to the target image object to utilize a corresponding display to perform a multimedia operation corresponding to the target image object only if a relative position between the candidate electronic and the target direct satisfies a predetermined condition.

14 Claims, 24 Drawing Sheets

(51) Int. Cl.
*G06F 3/01* (2006.01)
*G06F 3/0346* (2013.01)
*A63F 13/211* (2014.01)
*A63F 13/573* (2014.01)
*A63F 13/92* (2014.01)
*A63F 13/327* (2014.01)
*A63F 13/812* (2014.01)

(52) U.S. Cl.
CPC .......... *A63F 13/211* (2014.09); *A63F 13/573* (2014.09); *A63F 13/92* (2014.09); *A63F 13/327* (2014.09); *A63F 13/812* (2014.09)

(56) References Cited

U.S. PATENT DOCUMENTS

| | | | |
|---|---|---|---|
| 2006/0152487 A1* | 7/2006 | Grunnet-Jepsen et al. | 345/158 |
| 2008/0136796 A1* | 6/2008 | Dowling | 345/204 |
| 2010/0150404 A1* | 6/2010 | Marks et al. | 382/107 |
| 2011/0161856 A1* | 6/2011 | Nurmi et al. | 715/772 |
| 2011/0219420 A1 | 9/2011 | Raveendran et al. | |
| 2012/0216153 A1* | 8/2012 | Sip | 715/863 |
| 2012/0272149 A1* | 10/2012 | Lee et al. | 715/716 |
| 2013/0053190 A1* | 2/2013 | Mettler | 473/463 |
| 2013/0169546 A1* | 7/2013 | Thomas et al. | 345/173 |
| 2013/0222266 A1* | 8/2013 | Gardenfors et al. | 345/173 |

* cited by examiner

MULTIMEDIA INTERACTION SYSTEM AND RELATED COMPUTER PROGRAM PRODUCT CAPABLE OF FILTERING MULTIMEDIA INTERACTION COMMANDS

CROSS-REFERENCE TO RELATED APPLICATIONS

This application claims the benefit of priority to Patent Application No. 101130868, filed in Taiwan on Aug. 24, 2012; the entirety of which is incorporated herein by reference for all purposes.

This application claims the benefit of priority to Patent Application No. 101149214, filed in Taiwan on Dec. 21, 2012; the entirety of which is incorporated herein by reference for all purposes.

This application claims the benefit of priority to U.S. Provisional Application Ser. No. 61/605,771, filed on Mar. 2, 2012; the entirety of which is incorporated herein by reference for all purposes.

This application claims the benefit of priority to U.S. Provisional Application Ser. No. 61/718,182, filed on Oct. 24, 2012; the entirety of which is incorporated herein by reference for all purposes.

BACKGROUND

The disclosure generally relates to a multimedia interaction system and, more particularly, to a multimedia interaction system including multiple displays and capable of filtering multimedia interaction commands and a related computer program product.

As technology progresses, multimedia interaction systems allowing multimedia interactions to be carried out among different electronic devices and related applications have become more and more important. In the design of many interaction applications related to multimedia content, it is expected that particular multimedia interaction operations can only be performed if a relative position among multiple electronic devices participating in the multimedia interaction satisfies a specific condition. In a traditional multimedia interaction system, however, a transmitting-end electronic device of a multimedia interaction command is unable to determine the relative position among itself and other electronic devices, and unable to restrict the transmission direction of multimedia contents or interaction commands. Accordingly, multimedia interaction results that do not conform to normal user experiences, multimedia interaction results that are not supposed to occur in the design of the multimedia interaction applications, multimedia interaction results that violate rules configured by the interaction applications, or unexpected multimedia interaction results often occur among the electronic devices.

For example, in the design of some multimedia interaction applications, it is expected that a particular image object or command can only be transmitted from the transmitting-end electronic device to a receiving-end electronic device if the receiving-end electronic device and its user are in front of a user of the transmitting-end electronic device. In practical operations, however, even if the receiving-end electronic device and its user are both behind the user of the transmitting-end electronic device, the receiving-end electronic device can still receive the particular image object or commands originated from the transmitting-end electronic device. Such kind of unexpected interaction does not conform to normal user experience and is not supposed to occur according to the original design of the multimedia interaction applications, but it still often occurs. This is because in order to acquire better signal transmission quality, conventional electronic devices are typically designed to be able to transmit/receive signals to/from various directions, but a specific direction.

One way to reduce the afore-mentioned problems is to redesign communication circuits of the electronic devices so that the electronic devices are only allowed to transmit/receive signals to/from a specific direction. But such approach severely influences the signal transmission ability and signal receiving range of the electronic device. Apparently, it will be obstructive to the development and progress of cross-device multimedia interaction applications if the multimedia interaction system is unable to deliver user experience that conforms to the original design purpose of the multimedia interaction applications.

SUMMARY

In view of the foregoing, it can be appreciated that a substantial need exists for apparatuses that can reduce possibilities of multimedia interaction results that do not conform to normal user experiences, multimedia interaction results that are not supposed to occur in the design of the multimedia interaction applications, multimedia interaction results that violate rules configured by the interaction applications, or unexpected multimedia interaction results among multiple electronic devices participating the multimedia interaction applications.

An embodiment of a multimedia interaction system having multiple displays is disclosed. The multimedia interaction system comprises: a plurality of electronic devices; a plurality of displays, respectively arranged on the electronic devices; and a location detection circuit, configured to dynamically detect a spatial location and an orientation for each of the electronic devices, and configured to transmit information related to detection results to at least one of the electronic devices through a wireless communication approach; wherein when a user instructs a source electronic device of the electronic devices to transmit a target image object toward a target direction, the source electronic device transmits information of the target direction and a target command corresponding to the target image object to a candidate electronic device of the other electronic devices, the candidate electronic device determines whether a relative position between the candidate electronic device and the target direction satisfies a predetermined condition, and only if the relative position between the candidate electronic device and the target direction satisfies the predetermined condition, the candidate electronic device utilizes a corresponding candidate display to perform a multimedia operation corresponding to the target image object according to the target command.

An embodiment of a computer program product is disclosed. The computer program product is stored in a non-transitory storage device of a candidate electronic device. The candidate electronic device comprises a candidate display. The computer program product enables the candidate electronic device to perform a multimedia interaction operation when the computer program product is executed by a control circuit of the candidate electronic device. The multimedia interaction operation comprises: utilizing a communication circuit of the candidate electronic device to dynamically receive information related to a spatial location and an orientation for each of the candidate electronic device and one or more electronic devices through a wireless communication approach; when a user instructs a source electronic device of the one or more electronic devices to transmit a target image object toward a target direction, utilizing the control circuit to receive information of the target direction and a target command corresponding to the target image object from the source electronic device; utilizing the control circuit to determine whether a relative position between the candidate electronic device and the target direction satisfies a predetermined condition; and utilizing the candidate display to perform a multimedia operation corresponding to the target image object according to the target command only if the relative position between the candidate electronic device and the target direction satisfies the predetermined condition.

One advantage of the above embodiments is that multimedia interaction results that do not conform to normal user experiences, multimedia interaction results that are not supposed to occur in the design of the multimedia interaction applications, multimedia interaction results that violate rules configured by the interaction applications, or unexpected multimedia interaction results can be effectively prevented from occurring among the source electronic device of multimedia interaction commands and other electronic devices.

Another advantage of the above embodiments is that the multimedia interaction system filters or blocks out multimedia interaction commands that may lead to multimedia interaction results that do not conform to normal user experiences, multimedia interaction results that are not supposed to occur in the design of the multimedia interaction applications, multimedia interaction results that violate rules configured by the interaction applications, or unexpected multimedia interaction results to occur in the multimedia interaction system, so as to ensure that the multimedia interaction behaviors in the multimedia interaction system can conform to the original design purpose of the multimedia interaction applications. As a result, the user experiences delivered by the multimedia interaction system can be greatly improved.

It is to be understood that both the foregoing general description and the following detailed description are example and explanatory only and are not restrictive of the invention, as claimed.

DETAILED DESCRIPTION

Reference is made in detail to embodiments of the invention, which are illustrated in the accompanying drawings.

Figure 1:
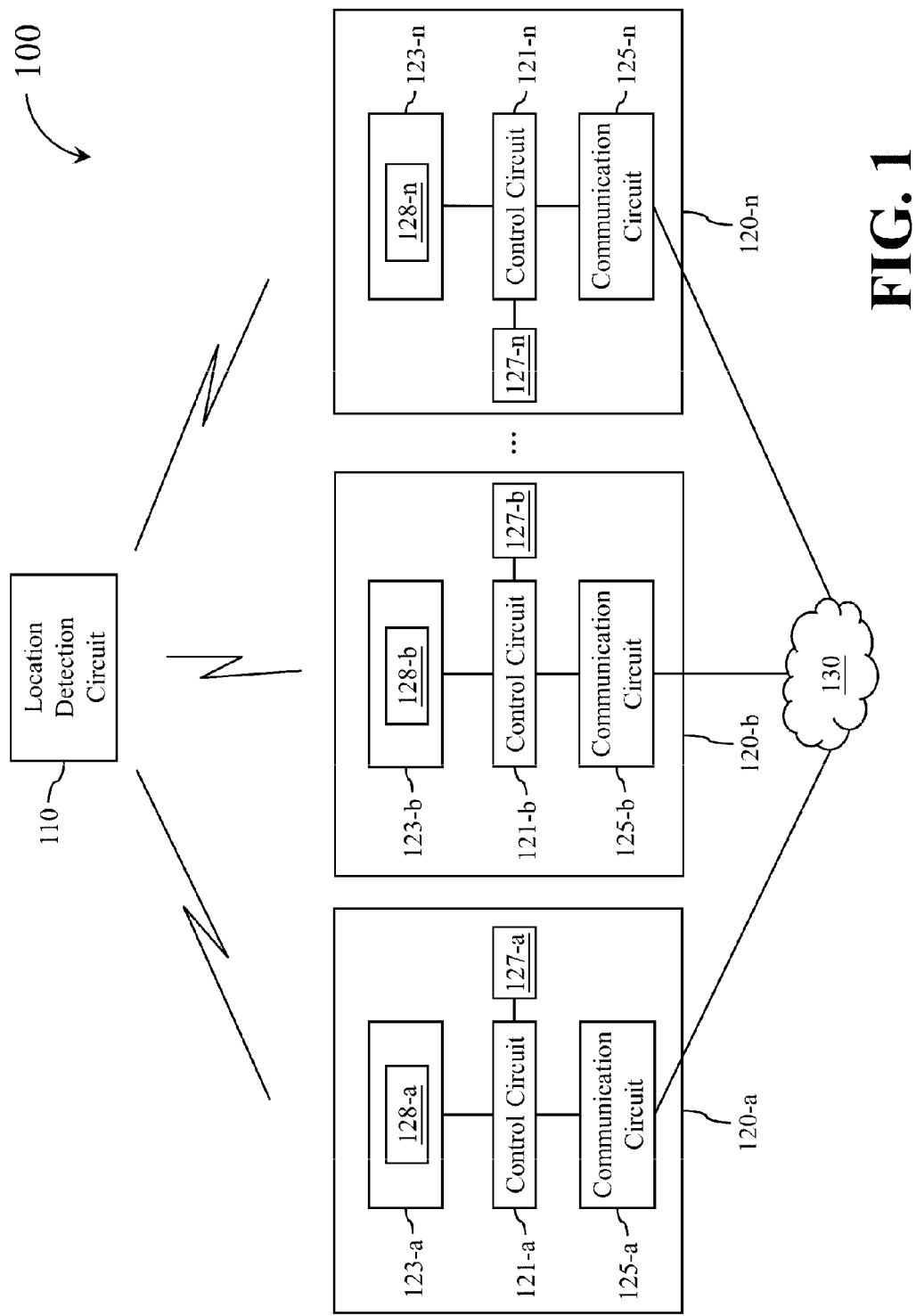
FIG. 1 shows a simplified functional block diagram of a multimedia interaction system according to an embodiment of the present disclosure.

Please refer to FIG. 1. FIG. 1 shows a simplified functional block diagram of a multimedia interaction system 100 according to an embodiment of the present disclosure. The multimedia interaction system 100 comprises a location detection circuit 110 and multiple member electronic devices (electronic devices 120-a~120-n are shown in FIG. 1 as examples). In the multimedia interaction system 100, different users are allowed to perform interactive operations related to multimedia contents, such as sharing of various multimedia contents, interaction of multimedia contents, collaborative editing of multimedia contents, on-line sport games, card games, role-playing games (RPG), action games, adventure games, strategy games (SLG), realtime strategy games (RSG), or the like through the electronic devices 120-a~120-n.

The location detection circuit 110 may be realized with various existing object positioning circuits, such as one or more magnetic sensor circuits, ultrasonic positioning circuits, infrared sensing circuits, image sensing and identifying circuits, Wi-Fi signal positioning circuits, motion detecting circuits, indoor GPS circuits, posture sensing circuits, or the like. In implementation, the location detection circuit 110 may be positioned above all of the electronic devices 120-a~120-n, such as be positioned at a ceiling, so that a position of the location detection circuit 110 is higher than positions of all the electronic devices 120-a~120-n in order to enhance location detecting accuracy.

Throughout the specification and drawings, indexes a~n may be used in the reference numbers of components and devices for ease of referring to respective components and devices. The use of indexes a~n does not intend to restrict the count of components and devices to any specific number. In the specification and drawings, if a reference number of a particular component or device is used without using the index, it means that the reference number is used to refer to any unspecific component or device of corresponding component group or device group. For example, the reference number 121-a is used to refer to the specific control circuit 121-a, and the reference number 121 is used to refer to any control circuit of the control circuits 121-a~121-n. In another example, the reference number 120-b is used to refer to the specific electronic device 120-b, and the reference number 120 is used to refer to any electronic device of electronic devices 120-a~120-n.

In the embodiment of FIG. 1, each of the electronic devices 120-a~120-n comprises a control circuit 121, and a storage device 123, a communication circuit 125, and a display 127 coupled with the control circuit 121. In implementation, the control circuit 121 may be realized with one or more processor units, and the communication circuit 125 may be a wired network interface, a wireless network interface, or a hybrid circuit integrated with two functionalities of above the wired network interface and the wireless network interface. In addition, a multimedia interaction module 128 is stored in the storage device 123. The multimedia interaction module 128 may be realized with one or more application program modules. For the purpose of explanatory convenience in the following description, other elements and related connections in the electronic device 120 are not shown in FIG. 1.

In operations, the electronic devices 120-a~120-n may communicate data with each other through a network 130. The aforementioned network 130 may be an internet or an intranet adopting various communication protocols.

In applications, the electronic devices 120-a~120-n may be multiple electronic devices having a same hardware specification and operation system, or having different hardware specifications and operation systems. In other words, the electronic devices 120-a~120-n may be various combination of desktop computers, desktop game consoles, business machines, mobile electronic devices (such as mobile phones, tablet computers, notebook computers, netbook computers, electronic books, and handheld game consoles), or various home appliances (such as televisions, refrigerators, and stereos) which are capable of connecting to network.

The operations of the multimedia interaction system 100 will be further described below with reference to FIG. 3.

Figure 3:
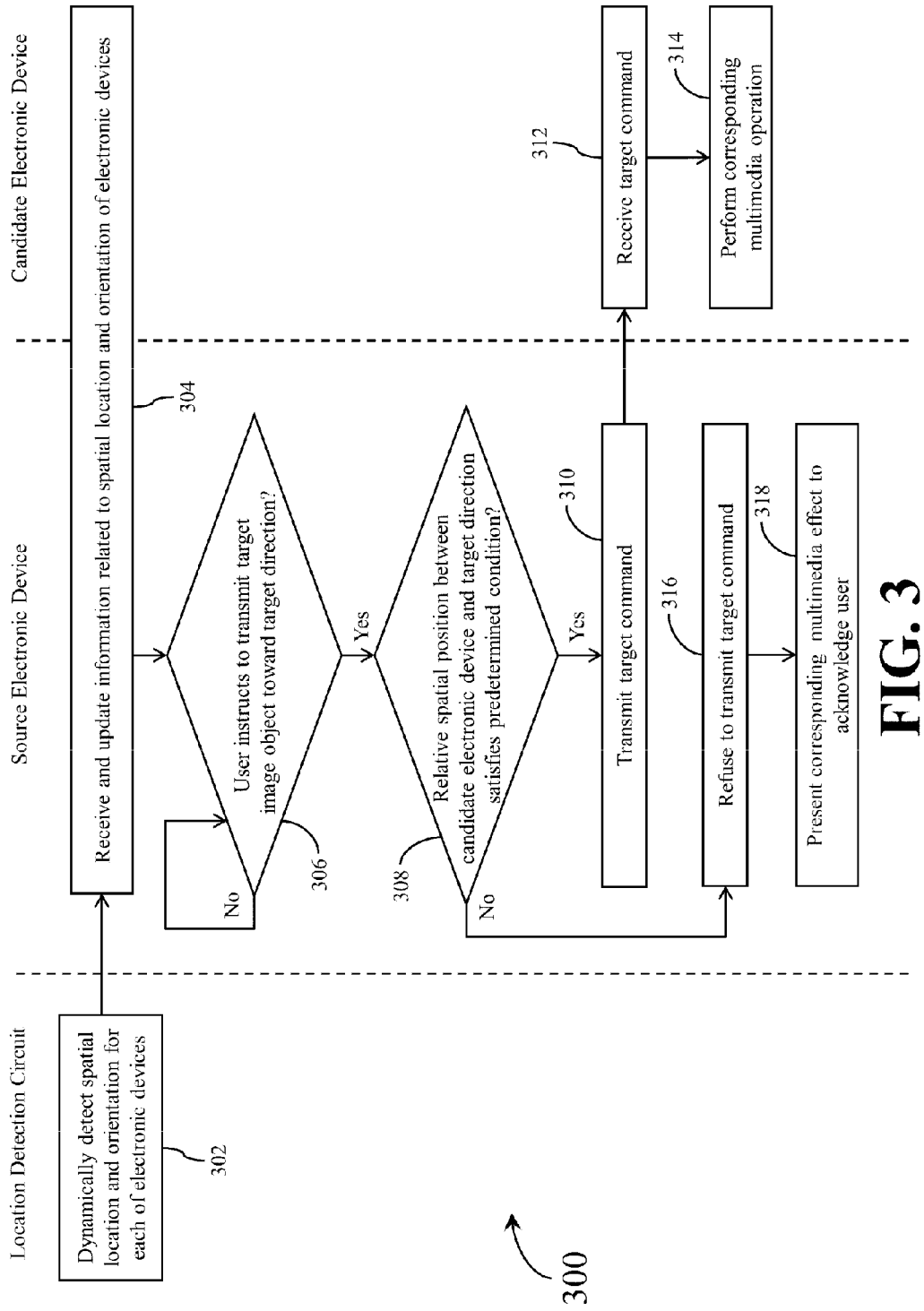
FIG. 3 shows a simplified flowchart illustrating a multimedia interaction method according to an embodiment of the present disclosure.

FIG. 3 shows a simplified flowchart 300 illustrating a multimedia interaction method for the multimedia interaction system 100 according to an embodiment of the present disclosure.

In the flowchart 300, operations within a column under the name of a specific device are operations to be performed by the specific device. For example, operations within a column under the label "location detection circuit" are operations to be performed by the location detection circuit 110, operations within a column under the label "source electronic device" are operations to be performed by an electronic device from which a multimedia interaction command is generated, operations within a column under the label "candidate electronic device" are operations to be performed by an electronic device that may be utilized to receive or execute the multimedia interaction command, and so forth. The same analogous arrangement also applies to the subsequent flowcharts.

When performing the multimedia interaction method of the flowchart 300, the control circuit 121 of the electronic device 120 executes the multimedia interaction module 128 to enable the electronic device 120 to perform some or all operations within the corresponding column.

For illustrative purpose, it is assumed hereinafter that the source electronic device is the electronic device 120-a, and the candidate electronic device may be one of the other electronic devices 120-b~120-n in order to illustrate the operations of the multimedia interaction system 100.

In an operation 302, the location detection circuit 110 may dynamically detect a spatial location and an orientation for each of the electronic devices 120-a~120-n so as to generate information related to the spatial location and the orientation for each of the electronic devices 120-a~120-n. The location detection circuit 110 also transmits the information related to detection results to at least one of the electronic devices 120a~120-n through a wireless transmission approach.

In the multimedia interaction system 100, a spatial location of a particular geometry characteristic of the electronic device 120, a spatial location of a particular symbol of the electronic device 120, a spatial location of a particular element of the electronic device 120, a spatial location of a particular region of the electronic device 120, a spatial location of a particular geometry characteristic of the display 127, or a spatial location of a particular geometry characteristic of a particular display region of the display 127 may be utilized to represent a spatial location of the electronic device 120.

For example, the location detection circuit 110 may detect and utilize a centroid location of the electronic device 120 to represent the spatial location of the electronic device 120. Alternatively, the location detection circuit 110 may detect and utilize a centroid location of the display 127 to represent the spatial location of the electronic device 120.

Figure 2:
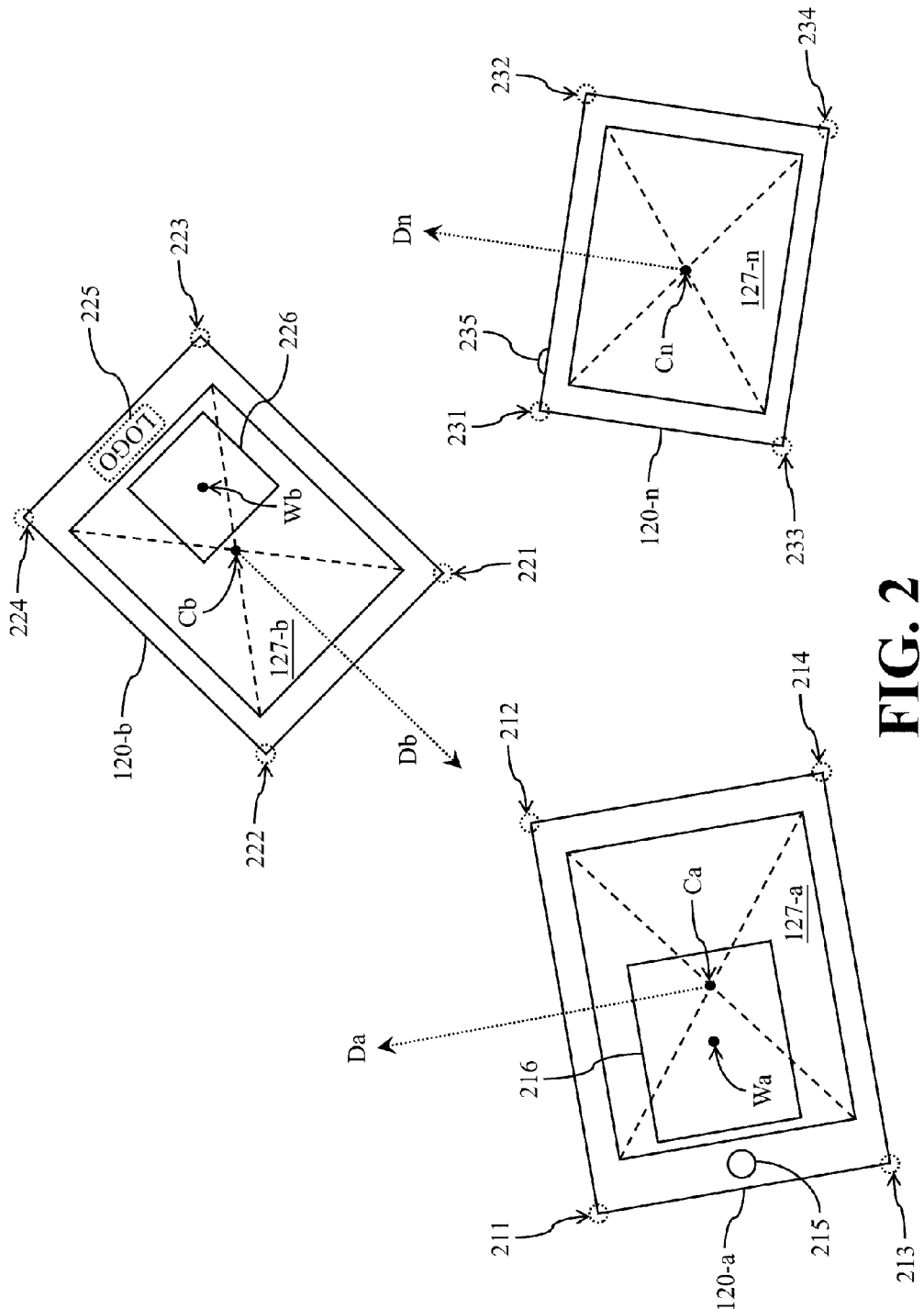
FIG. 2 shows a simplified schematic diagram of spatial locations for partial electronic devices in FIG. 1 according to an embodiment of the present disclosure.

In implementation, the location detection circuit 110 may cooperate with respective electronic devices 120-a~120-n to compute respective spatial locations of the electronic devices 120-a~120-n. The location detection circuit 110 may detect and transmit spatial coordinates of multiple reference points of the electronic device 120 to the electronic device 120, and then the electronic device 120 utilizes the control circuit 121 to compute the centroid location of the electronic device 120 according to the spatial coordinates of the reference points to represent the spatial location of the electronic device 120. For example, in the embodiment of FIG. 2, the location detection circuit 110 may detect and transmit spatial coordinates of reference points 211~214 of the electronic device 120-a to the electronic device 120-a, detect and transmit spatial coordinates of reference points 221~224 of the electronic device 120-b to the electronic device 120-b, and detect and transmit spatial coordinates of reference points 231~234 of the electronic device 120-n to the electronic device 120-n.

Since a length and a width of the electronic device 120-a are given values, the electronic device 120-a may utilize the control circuit 121-a to compute a centroid location of the electronic device 120-a according to the spatial coordinates of some or all of the reference points 211~214 to represent a spatial location of the electronic device 120-a. Since a length and a width of the electronic device 120-b are given values, the electronic device 120-b may utilize the control circuit 121-b to compute a centroid location of the electronic device 120-b according to the spatial coordinates of some or all of the reference points 221~224 to represent a spatial location of the electronic device 120-b. Since a length and a width of the electronic device 120-n are given values, the electronic device 120-n may utilize the control circuit 121-n to compute a centroid location of the electronic device 120-n according to the spatial coordinates of some or all of the reference points 231~234 to represent a spatial location of the electronic device 120-n.

Alternatively, the electronic device 120 may utilize the control circuit 121 to compute the centroid location of the display 127 to represent the spatial location of the electronic device 120 according to the received spatial coordinates of the reference points. For example, in the embodiment of FIG. 2, the location detection circuit 110 may detect and transmit the spatial coordinates of the reference points 211~214 to the electronic device 120-a, detect and transmit the spatial coordinates of the reference points 221~224 to the electronic device 120-b, and detect and transmit the spatial coordinates of the reference points 231~234 to the electronic device 120-n.

Since the length and the width of the electronic device 120-a are given values, a size of a display 127-a of the electronic device 120-a is given, and a spatial arrangement of the display 127-a with respect to the electronic device 120-a is given as well, the electronic device 120-a may utilize the control circuit 121-a to compute a location of a centroid Ca of the display 127-a according to the spatial coordinates of some or all of the reference points 211~214 to represent the spatial location of the electronic device 120-a. Since the length and the width of the electronic device 120-b are given values, a size of a display 127-b of the electronic device 120-b is given, and a spatial arrangement of the display 127-b with respect to the electronic device 120-b is given as well, the electronic device 120-b may utilize the control circuit 121-b to compute a location of a centroid Cb of the display 127-b according to the spatial coordinates of some or all of the reference points 221~224 to represent the spatial location of the electronic device 120-b. Similarly, since the length and the width of the electronic device 120-n are given values, a size of a display 127-n of the electronic device 120-n is given, and a spatial arrangement of the display 127-n with respect to the electronic device 120-n is given as well, the electronic device 120-n may utilize the control circuit 121-n to compute three dimensional coordinates of a centroid Cn of the display 127-n according to the spatial coordinates of some or all of the reference points 231~234 to represent the spatial location of the electronic device 120-n.

Alternatively, the electronic device 120 may utilize the control circuit 121 to compute a location of a particular geometry characteristic (such as a central location) of a multimedia interaction program window (such as a browser window) that is being displayed on the display 127 according to the received spatial coordinates of the reference points to represent the spatial location of the electronic device 120. For example, in the embodiment of FIG. 2, the electronic device 120-a utilizes the display 127-a to display a target browser window 216, and the electronic device 120-b utilizes the display 127-b to display a target browser window 226. Since a size of the target browser window 216 displayed on the display 127-a and a relative position between the target browser window 216 and the display 127-a are configured by the control circuit 121-a, the size of the target browser window 216 and the relative position between the target browser window 216 and the display 127-a are known parameters to the control circuit 121-a. Accordingly, the location detection circuit 110 may detect and transmit the spatial coordinates of the reference points 211~214 of the electronic device 120-a to the electronic device 120-a, and then the electronic device 120-a may utilize the control circuit 121-a to compute three dimensional coordinates of a central location Wa of the target browser window 216 according to the spatial coordinates of some or all of the reference points 211~214 to represent the spatial location of the electronic device 120-a.

Similarly, since a size of the target browser window 226 displayed on the display 127-b and a relative position between the target browser window 226 and the display 127-b are configured by the control circuit 121-b, the size of the target browser window 226 and the relative position between the target browser window 226 and the display 127-b are known parameters to the control circuit 121-b. Accordingly, the location detection circuit 110 may detect and transmit the spatial coordinates of the reference points 221~224 of the electronic device 120-b to the electronic device 120-b, and then the electronic device 120-b may utilize the control circuit 121-b to compute three dimensional coordinates of a central location Wb of the target browser window 226 according to the spatial coordinates of some or all of the reference points 221~224 to represent the spatial location of the electronic device 120-b.

In addition, the location detection circuit 110 may further identify and detect locations of one or more reference objects or symbols of the electronic device 120, and compare the locations of the reference objects or symbols of the electronic device 120 with locations of other reference points to determine an orientation of the electronic device 120. For example, in the embodiment of FIG. 2, the location detection circuit 110 may identify and detect a location of a control button 215 of the electronic device 120-a, and compare the location of the control button 215 with the spatial coordinates of some or all of the aforementioned reference points 211~214 to determine the orientation of the electronic device 120-a. The location detection circuit 110 may identify and detect a location of a brand logo 225 of the electronic device 120-b, and compare the location of the brand logo 225 with the spatial coordinates of some or all of the aforementioned reference points 221~224 to determine the orientation of the electronic device 120-b. The location detection circuit 110 may identify and detect a location of a control button 235 of the electronic device 120-n, and compare the location of the control button 235 with the spatial coordinates of some or all of the aforementioned reference points 231~234 to determine the orientation of the electronic device 120-n.

Alternatively, the location detection circuit 110 may transmit the location detection results of the one or more reference objects or symbols to the electronic device 120 as well as the location detection results of other reference points. Then the electronic device 120 may utilize the control circuit 121 to compare the locations of the one or more reference objects or symbols with the locations of other reference points to determine the orientation of the electronic device 120 in order to reduce computation loading of the location detection circuit 110.

In the following description, the orientation of the electronic device 120-a is represented by an orientation direction Da, the orientation of the electronic device 120-b is represented by an orientation direction Db, and the orientation of the electronic device 120-n is represented by an orientation direction Dn. Please note that the terms "orientation" and "orientation direction" used throughout the description and the claims are intended to describe the placement of the electronic device 120 is use, and not refer to the signal transmitting direction or and signal receiving direction of the communication circuit 125 of the electronic device 120.

For the purpose of explanatory convenience in the following description, it is assumed hereinafter that the multimedia interaction system 100 utilizes the centroid location of the display 127 to represent the spatial location of the electronic device 120.

In operations, the spatial location and the orientation of each electronic device 120 may vary as a user's location or posture when manipulating the electronic device 120 changes. Accordingly, the location detection circuit 110 may perform the aforementioned operation 302 continuously or intermittently to dynamically detect the spatial location and the orientation for each of the electronic devices 120-a~120-n so as to generate the information related to the spatial location and the orientation for each of the electronic devices 120-a~120-n. The location detection circuit 110 may transmit the generated information to one or more electronic devices that require such information through a wireless transmission approach.

In an operation 304, the multimedia interaction module 128 of each electronic device 120 may utilize the communication circuit 125 to dynamically receive information related to the spatial location and the orientation for the electronic device 120 from the location detection circuit 110 through a wireless transmission approach, and record the received information. In addition, the multimedia interaction module 128 may also utilize the communication circuit 125 to dynamically receive information related to the spatial locations and the orientations of the other electronic devices from the location detection circuit 110 or the other electronic devices, and record the received information. The electronic device 120 may periodically or intermittently perform the aforementioned operation 304 to dynamically receive the latest information generated by the location detection circuit 110 or other electronic devices, and then update the record related to the spatial locations and the orientations of the electronic devices 120-a~120-n.

When a user of the source electronic device 120-a manipulates the source electronic device 120-a, a multimedia interaction module 128-a performs an operation 306 to determine whether the user instructs to transmit a target image object toward a target direction at this time. If the user's manipulation is not related to the target image object, the control circuit 121-a performs a corresponding operation according to the user's manipulation.

If the user of the source electronic device 120-*a* performs a predetermined manipulation (such as a particular touch control scheme, a particular mouse manipulation, or issuing a particular voice control command) to the source electronic device 120*a* to instruct the source electronic device 120-*a* to transmit a target image object toward a target direction, the multimedia interaction module 128-*a* performs an operation 308.

In the operation 308, the multimedia interaction module 128-*a* may sequentially select one of the electronic devices 120-*b*~120-*n* as a candidate electronic device, and then determine whether a relative position between the selected candidate electronic device and the target direction satisfies a predetermined condition according to the latest information related to a spatial location and an orientation of the selected candidate electronic device. If the relative position between the selected candidate electronic device and the target direction satisfies the predetermined condition, the multimedia interaction module 128-*a* performs an operation 310. On the contrary, if the relative position between the selected candidate electronic device and the target direction does not satisfy the predetermined condition, the multimedia interaction module 128-*a* performs an operation 316.

In the operation 310, the multimedia interaction module 128-*a* utilizes a communication circuit 125-*a* to transmit a target command corresponding to the target image object and the user's instructions to a candidate electronic device that satisfies the predetermined condition. The aforementioned target command may comprise one or more commands utilized by the electronic device 120-*a* to configure, control, change, or adjust the multimedia contents presented on a display of the candidate electronic device (hereinafter, a candidate display). The target command may comprise parameters related to image attributes, such as the shape, size, color, position, lasting time, moving direction, moving speed, or the like of one or more image objects.

In an operation 312, a multimedia interaction module of the candidate electronic device utilizes a communication circuit of the candidate electronic device to receive the target command.

In an operation 314, the multimedia interaction module of the candidate electronic device utilizes the candidate display to perform a multimedia operation corresponding to the target image object according to the target command. For example, the multimedia interaction module of the candidate electronic device may utilize a control circuit to configure or adjust the image attributes, such as the shape, size, color, position, lasting time, moving direction, moving speed, or the like of one or more image objects corresponding to the target image object to generate one or more corresponding images and display the one or more corresponding images on the candidate display to achieve a multimedia interaction operation.

In implementation, the multimedia interaction module 128-*a* may perform the determination of the aforementioned operation 308 for each of the electronic devices 120-*b*~120-*n* to find all candidate electronic devices that satisfy the predetermined condition. Alternatively, the multimedia interaction module 128-*a* may finish the operation 308 once the multimedia interaction module 128-*a* finds a candidate electronic device that satisfies the predetermined condition of the operation 308 from the electronic devices 120-*b*~120-*n*, and omit the determination of the relative position between each of the other electronic devices and the target direction.

In the operation 316, the multimedia interaction module 128-*a* refuses to transmit the target command to the candidate electronic device.

In an operation 318, the multimedia interaction module 128-*a* may utilize the display 127-*a* (hereinafter, a source display), a speaker, a luminance circuit, a vibrator, or the like of the source electronic device 120-*a* to present a corresponding multimedia effect indicating that the multimedia interaction module 128-*a* refused to transmit the target command to the candidate electronic device. For example, the multimedia interaction module 128-*a* may control the display 127-*a* to present an animation effect showing that the target image object collides with an edge of the display 127-*a* and then rebounds. The multimedia interaction module 128-*a* may control the speaker to produce a particular sound effect. The multimedia interaction module 128-*a* may control the vibrator to perform a particular vibration mode. The multimedia interaction module 128-*a* may control the luminance circuit (such as a LED or a flashlight) to present a particular vision effect. The multimedia interaction module 128-*a* may utilize various combination of the aforementioned devices to present particular multimedia effect in order to acknowledge the user that the source electronic device 120-*a* does not transmit the target image object or the target command to the candidate electronic device.

As can be seen from the aforementioned descriptions, only if the relative position between the target direction and the selected candidate electronic device satisfies the predetermined condition, the source electronic device 120-*a* transmits the target command corresponding to the target image object to the selected candidate electronic device, so that the candidate electronic device utilizes the corresponding candidate display to perform the multimedia operation corresponding to the target image object according to the target command. If the relative position between the target direction and the candidate electronic device does not satisfy the predetermined condition, the source electronic device 120-*a* would not transmit the target command to the candidate electronic device, and thus the candidate electronic device would not execute the target command. Similarly, the source electronic device 120-*a* would not transmit the target command to other electronic devices that do not satisfy the predetermined condition so as to prevent the electronic devices that do not satisfy the predetermined condition from performing the multimedia operation corresponding to the target image object. In other words, by adopting the multimedia interaction method of FIG. 3 the multimedia interaction system 100 is enabled to effectively prevent strange or unreasonable multimedia interaction results from occurring.

The operations of the source electronic device 120-*a* in the aforementioned operation 308 will be further described below with reference to FIG. 4~12.

FIGS. 4~12 show simplified schematic diagrams of different types of relative position among partial electronic devices in the multimedia interaction system 100 when the user of the source electronic device 120-*a* instructs the source electronic device 120-*a* to transmit a target image object 400 toward a target direction Dt according to several embodiments of the present disclosure.

In implementation, the multimedia interaction system 100 may determine whether a relative position between the candidate electronic device and the target direction Dt satisfies the predetermined condition in the aforementioned operation 308 according to three dimensional coordinates of the candidate electronic device.

In a first embodiment, the aforementioned predetermined condition specifies that the candidate electronic device has to be positioned on a target path Pt to which the target direction Dt points.

In a second embodiment, the aforementioned predetermined condition specifies that a distance between the location of the candidate electronic device and the target path Pt is less than a first predetermined value R1.

In a third embodiment, the aforementioned condition specifies that the target path Pt passes through any position of the candidate display of the candidate electronic device.

In a fourth embodiment, the aforementioned condition specifies that the candidate electronic device is positioned on a target vertical plane (not shown) in which the target path Pt resides, and the target vertical plane is perpendicular to the ground.

In a fifth embodiment, the aforementioned condition specifies that a distance between the location of the candidate electronic device and the aforementioned target vertical plane is less than the first predetermined value R1.

Figure 4:
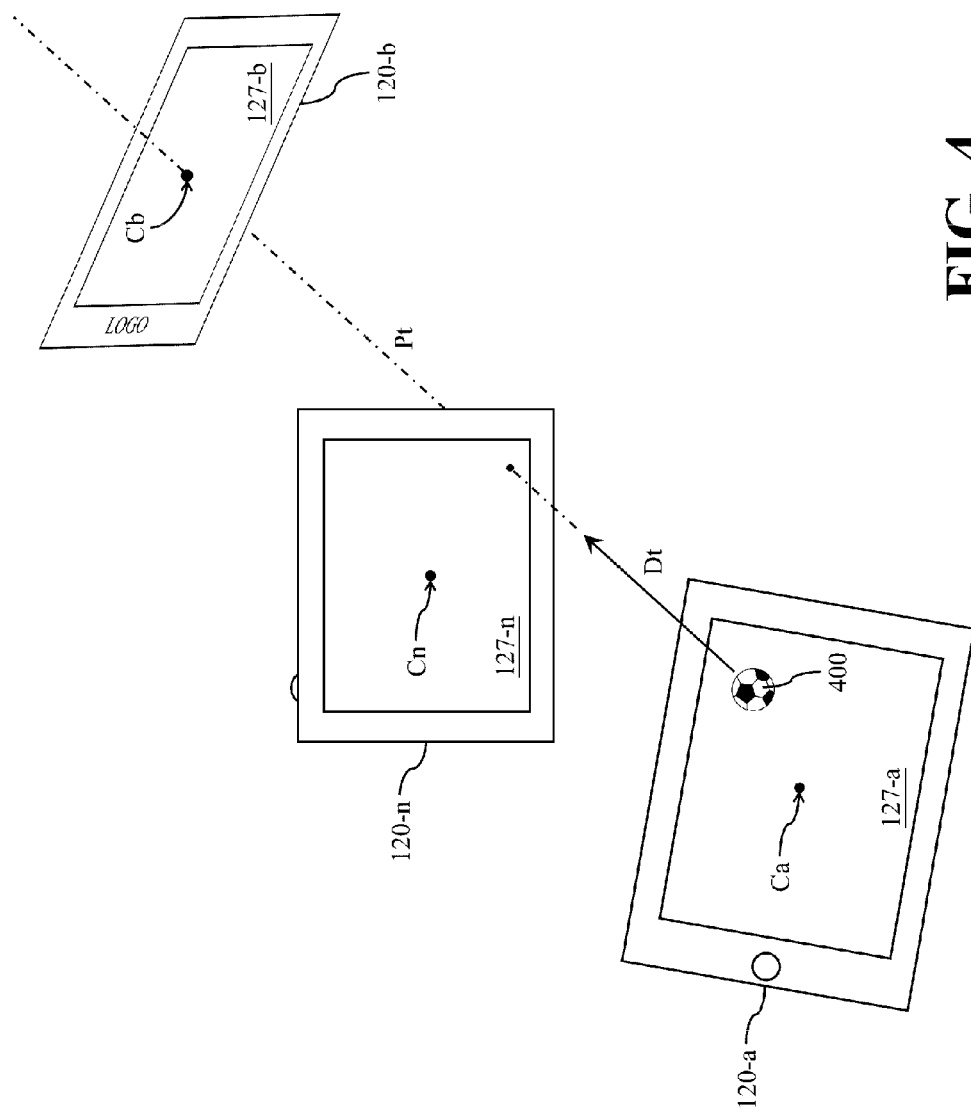
FIGS. 4~12 show simplified schematic diagrams of different types of relative position among partial electronic devices in FIG. 1 according to several embodiments of the present disclosure.

In the pattern of FIG. 4, the target path Pt to which the target direction Dt points passes through the centroid Cb of the display 127-b. This means that the electronic device 120-b is positioned on the target path Pt and also positioned on the target vertical plane (not shown) in which the target path Pt resides. Since the electronic device 120-b is positioned on the target path Pt and the target vertical plane, a distance between the location of the electronic device 120-b and the target path Pt is zero, and a distance between the location of the electronic device 120-b and the target vertical plane is zero as well. As shown in FIG. 4, the target path Pt passes through the display 127-n but does not pass through the centroid Cn of the display 127-n, which means that the electronic device 120-n is not positioned on the target path Pt and not positioned on the target vertical plane in which the target path Pt resides.

Accordingly, for the pattern of FIG. 4, when the candidate electronic device is the electronic device 120-b, the multimedia interaction module 128-a determines that a relative position between the location of the electronic device 120-b and the target direction Dt satisfies the predetermined condition in the aforementioned first to fifth embodiments. When the candidate electronic device is the electronic device 120-n, the multimedia interaction module 128-a determines that a relative position between the location of the electronic device 120-n and the target direction Dt satisfies the predetermined condition in the aforementioned third embodiment. The multimedia interaction module 128-a, however, determines that the relative position between the location of the electronic device 120-n and the target direction Dt does not satisfy the predetermined condition in the aforementioned first or fourth embodiment.

Figure 5:
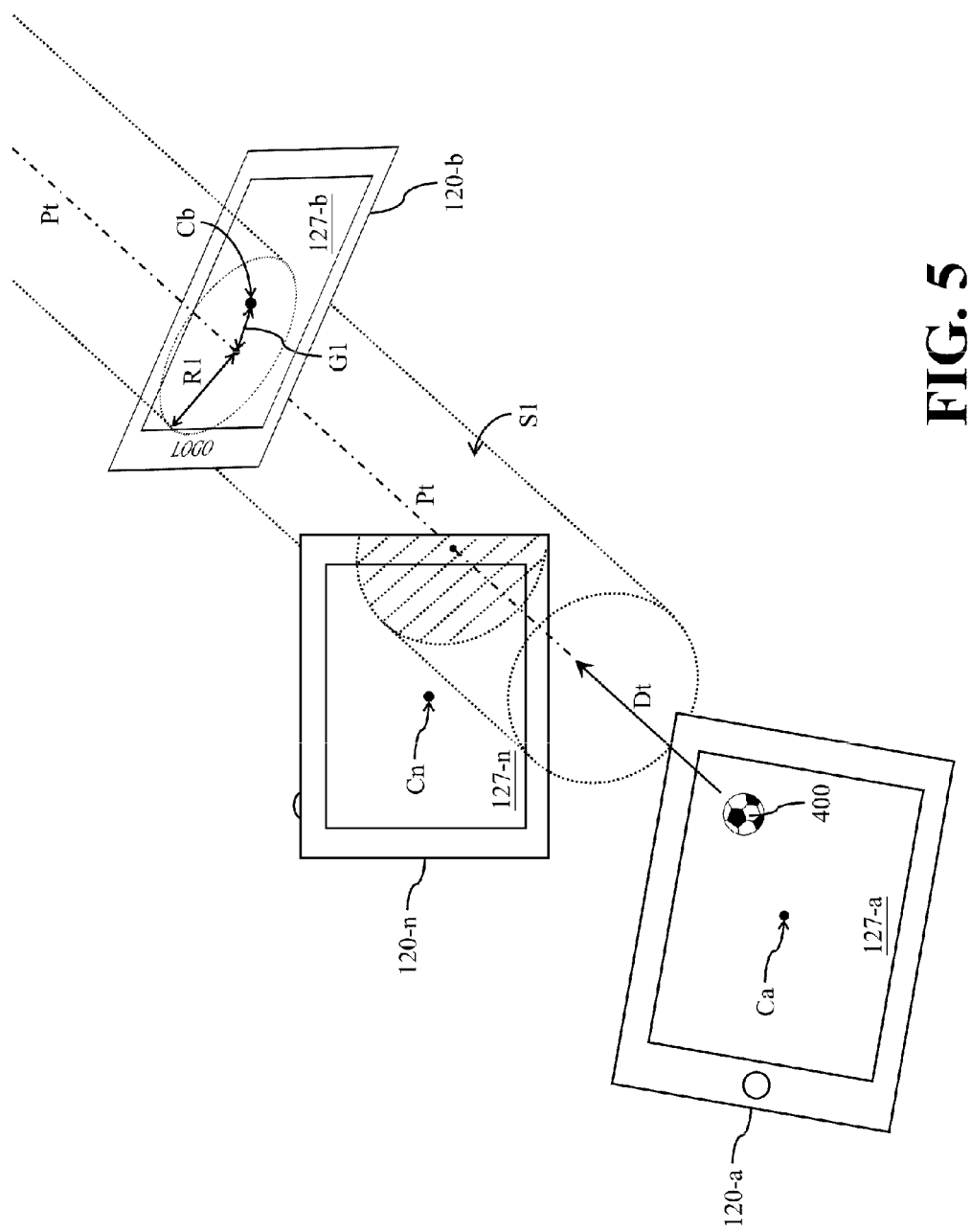

In the pattern of FIG. 5, the target path Pt to which the target direction Dt points passes through a region of the display 127-b but does not pass through the centroid Cb of the display 127-b. This means that the electronic device 120-b is not positioned on the target path Pt and not positioned on the target vertical plane in which the target path Pt resides. A distance between the centroid Cb and the target path Pt is G1, which means that the distance between the location of the electronic device 120-b and the target path Pt is G1. In addition, the target path Pt passes through a peripheral region of the electronic device 120-n but does not pass through a region of the display 127-n, which means that the electronic device 120-n is not positioned on the target path Pt and not positioned on the target vertical plane in which the target path Pt resides. As shown in FIG. 5, the distance G1 between the centroid Cb of the display 127-b and the target path Pt is less than the first predetermined value R1, but a distance between the centroid Cn of the display 127-n and the target path Pt is apparently greater than the first predetermined value R1.

Accordingly, for the pattern of FIG. 5, when the candidate electronic device is the electronic device 120-b, the multimedia interaction module 128-a determines that the relative position between the location of the electronic device 120-b and the target direction Dt satisfies the predetermined condition in the aforementioned second, third, and fifth embodiments. In comparison, the multimedia interaction module 128-a determines that the relative position between the location of the electronic device 120-b and the target direction Dt does not satisfy the predetermined condition in the aforementioned first and fourth embodiments. When the candidate electronic device is the electronic device 120-n, the multimedia interaction module 128-a determines that the relative position between the location of the electronic device 120-n and the target direction Dt does not satisfy the predetermined condition in the aforementioned first to fifth embodiments.

In a sixth embodiment, the aforementioned predetermined condition specifies that the candidate electronic device is positioned in a pillar region S1 to which the target direction Dt points, wherein the target direction Dt is an axis of the pillar region S1, and a radius of the pillar region S1 is the first predetermined value R1.

In the pattern of FIG. 5, the centroid Cb of the display 127-b is positioned within the pillar region S1 to which the target direction Dt points. This means that the electronic device 120-b is positioned in the pillar region S1. The centroid Cn of the display 127-n is positioned outside the pillar region S1, which means that the electronic device 120-n is not positioned in the pillar region S1.

Accordingly, for the pattern of FIG. 5, when the candidate electronic device is the electronic device 120-b, the multimedia interaction module 128-a determines that the relative position between the location of the candidate electronic device 120-b and the target direction Dt satisfies the predetermined condition in the aforementioned sixth embodiment. When the candidate electronic device is the electronic device 120-n, the multimedia interaction module 128-a determines that the relative position between the location of the candidate electronic device 120-n and the target direction Dt does not satisfy the predetermined condition in the aforementioned sixth embodiment.

In a seventh embodiment, the aforementioned predetermined condition specifies that the candidate electronic device is positioned in a pyramidal or cone region S2 to which the target direction Dt points, wherein the target direction Dt is an axis of the pyramidal or cone region S2, a location of the target image object 400 is an apex of the pyramidal or cone region S2, and a vertex angle of the pyramidal or cone region S2 is an acute angle. In implementation, the pyramidal or cone region S2 may be a pyramidal region or a cone region.

Figure 6:
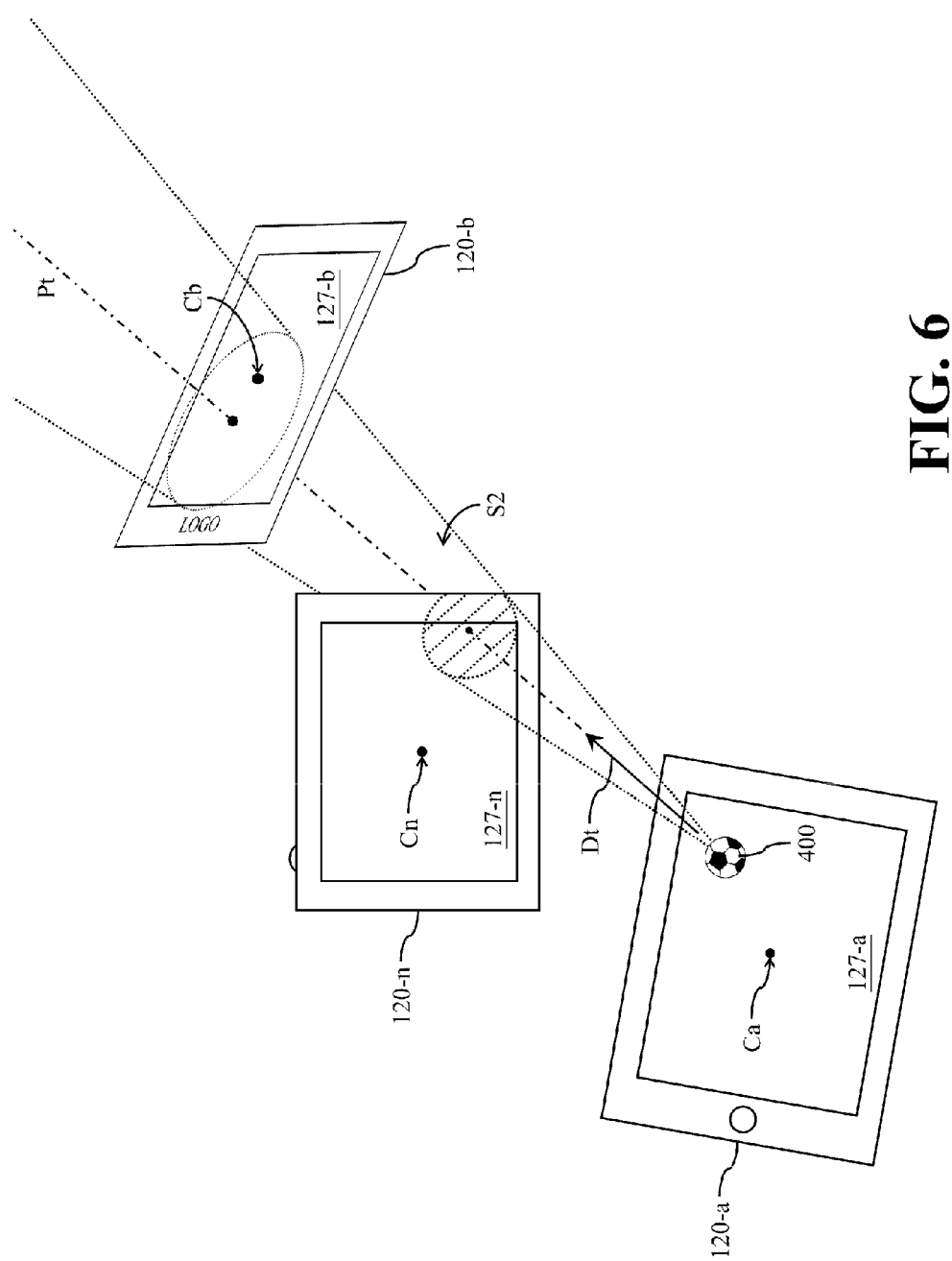

In the pattern of FIG. 6, the pyramidal or cone region S2 is a cone region and the centroid Cb of the display 127-b is positioned within the pyramidal or cone region S2, which means that the electronic device 120-b is positioned in the pyramidal or cone region S2. The centroid Cn of the display 127-n is positioned outside the pyramidal or cone region S2, which means that the electronic device 120-n is not positioned in the pyramidal or cone region S2.

Accordingly, for the pattern of FIG. 6, when the candidate electronic device is the electronic device 120-b, the multimedia interaction module 128-a determines that the relative position between the location of the electronic device 120-b and the target direction Dt satisfies the predetermined condition in the aforementioned seventh embodiment. When the candidate electronic device is the electronic device 120-n, the multimedia interaction module 128-a determines that the relative position between the location of the electronic device 120-*n* and the target direction Dt does not satisfy the predetermined condition in the aforementioned seventh embodiment.

In an eighth embodiment, the aforementioned predetermined condition specifies that the target direction Dt is parallel to a target shifted direction Dts, a first included angle between the target shifted direction Dts and a first direction is an acute angle, and the first included angle is less than a threshold angle Ath, wherein a location of the source electronic device 120-*a* is a starting point of both the target shifted direction Dts and the first direction, and the first direction points to the location of the candidate electronic device.

Figure 7:
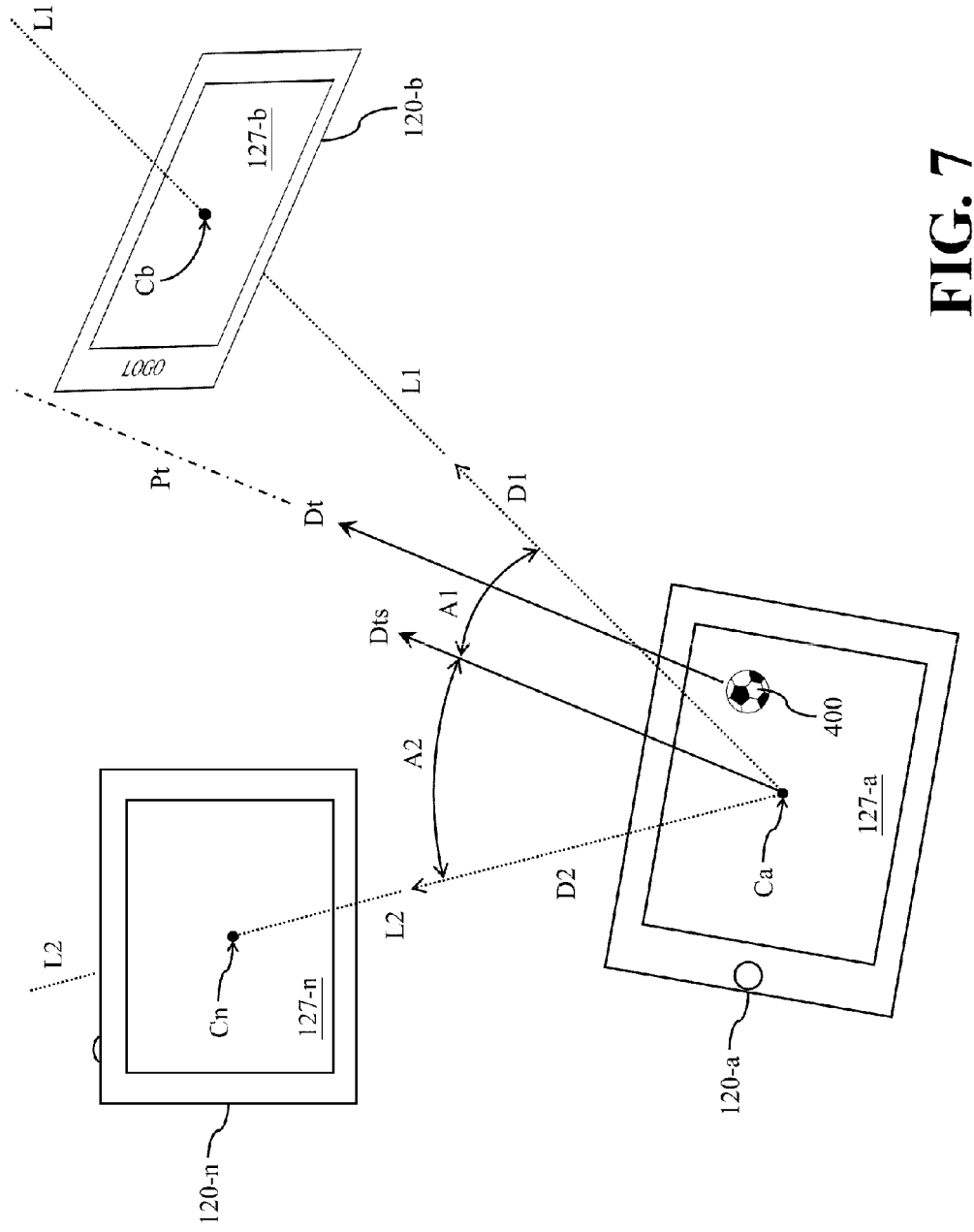

In the pattern of FIG. 7, the multimedia interaction module 128-*a* may shift the target direction Dt so that the location of the source electronic device 120-*a* (e.g., the location of the centroid Ca in this embodiment) becomes the starting point of the shifted target direction Dt, and utilize the shifted target direction Dt as the target shifted direction Dts. When the candidate electronic device is the electronic device 120-*b*, the first direction is a direction D1 that points to the centroid Cb of the display 127-*b*, and the centroid Ca of the display 127-*a* is the starting point of the first direction. A line L1 to which the direction D1 points passes through the centroid Cb of the display 127-*b*. The first included angle is an included angle A1 between the direction D1 and the target shifted direction Dts. The distance between the location of the candidate electronic device 120-*b* and the target path Pt to which the target direction Dt points is related to the included angle A1 to some extent. In this embodiment, the smaller the included angle A1, the closer the location of the candidate electronic device 120-*b* to the target path Pt. Accordingly, if the included angle A1 is an acute angle and smaller than the threshold angle Ath, the multimedia interaction module 128-*a* determines that the relative position between the location of the electronic device 120-*b* and the target direction Dt satisfies the predetermined condition in the aforementioned eighth embodiment. On the contrary, if the included angle A1 is greater than the threshold angle Ath, the multimedia interaction module 128-*a* determines that the relative position between the location of the electronic device 120-*b* and the target direction Dt does not satisfy the predetermined condition in the aforementioned eighth embodiment.

In the pattern of FIG. 7, when the candidate electronic device is the electronic device 120-*n*, the first direction is a direction D2 that points to the centroid Cn of the display 127-*n*, and the centroid Ca of the display 127-*a* is the starting point of the first direction. A line L2 to which the direction D2 points passes through the centroid Cn of the display 127-*n*. The first included angle is an included angle A2 between the direction D2 and the target shifted direction Dts. The distance between the location of the candidate electronic device 120-*n* and the target path Pt to which the target direction Dt points is related to the included angle A2 to some extent. In this embodiment, the smaller the included angle A2, the closer the location of the candidate electronic device 120-*n* to the target path Pt. Accordingly, if the included angle A2 is an acute angle and smaller than the threshold angle Ath, the multimedia interaction module 128-*a* determines that the relative position between the location of the electronic device 120-*n* and the target direction Dt satisfies the predetermined condition in the aforementioned eighth embodiment. On the contrary, if the included angle A2 is greater than the threshold angle Ath, the multimedia interaction module 128-*a* determines that the relative position between the location of the electronic device 120-*n* and the target direction Dt does not satisfy the predetermined condition in the aforementioned eighth embodiment.

In the patterns illustrated in the aforementioned FIG. 7 and some of the following drawings, if the centroids Ca, Cb, and Cn are not positioned on a same spatial plane, the target direction Dt, the directions D1, and D2 are not positioned on the same spatial plane. In this situation, the target shifted direction Dts, the direction D1, and the direction D2 are not positioned on the same spatial plane as well.

If the relative position between the location of the candidate electronic device and the target direction Dt satisfies the predetermined condition specified in any of the aforementioned first to eighth embodiments, it means that the candidate electronic device is positioned near the target path Pt to which the target direction Dt points, and the distance between the candidate electronic device and the target path Pt is within an error tolerance range. Accordingly, when the multimedia interaction system 100 wants to create a multimedia interaction effect showing that the target image object is transmitted from the source electronic device 120-*a* to the candidate electronic device, by adopting the configuration of the predetermined condition illustrated in any of the aforementioned first to eighth embodiments the multimedia interaction system 100 is enabled to prevent the candidate electronic device from receiving the target image object when the distance between the candidate electronic device and the target path Pt to which the target direction Dt points is beyond a reasonable range, or to prevent similar unexpected results.

In addition, if the multimedia interaction application that is being carried out by the multimedia interaction system 100 does not demand a highly accurate determination for the relative position between the candidate electronic device and the target direction Dt, the multimedia interaction system 100 may loosen the aforementioned first predetermined value R1 or the threshold angle Ath. On the contrary, if the multimedia interaction application demands a higher accurate determination for the relative position between the candidate electronic device and the target direction Dt, the multimedia interaction system 100 may lower the aforementioned first predetermined value R1 or the threshold angle Ath, or simply adopt the configuration of the predetermined condition in the first embodiment.

In a ninth embodiment, the aforementioned predetermined condition specifies that a second included angle between the target shifted direction Dts and a second direction is an acute angle, and the aforementioned first included angle is less than the second included angle, wherein the location of the source electronic device 120-*a* is a starting point of the second direction, and the second direction points to a location of a third electronic device of the electronic devices 120-*a*~120-*n*.

Figure 8:
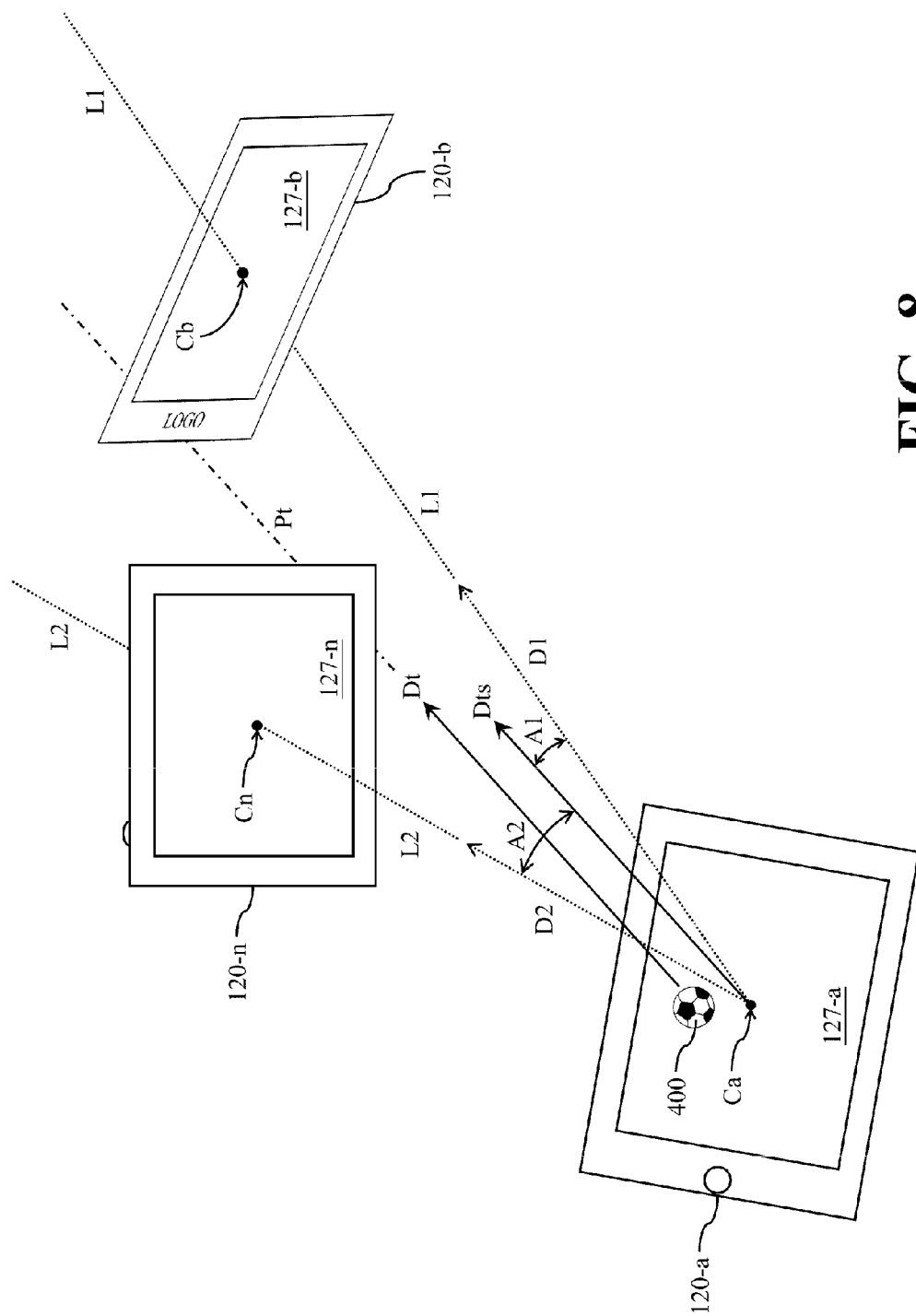

In the pattern of FIG. 8, when the candidate electronic device is the electronic device 120-*b*, the multimedia interaction module 128-*a* selects another electronic device near the target path Pt, such as the electronic device 120-*n*, as a third electronic device. In this situation, the first direction is the direction D1 that points to the centroid Cb of the display 127-*b*, and the centroid Ca of the display 127-*a* is the starting point of the first direction. The first included angle is the included angle A1 between the direction D1 and the target shifted direction Dts. The second direction is the direction D2 that points to the centroid Cn of the display 127-*n*, and the centroid Ca of the display 127-*a* is the starting point of the second direction. The second included angle is the included angle A2 between the direction D2 and the target shifted direction Dts. The distance between the location of the third electronic device 120-*n* and the target path Pt is related to the included angle A2 to some extent. In this embodiment, the smaller the included angle A2, the closer the third electronic device 120-*n* to the target path Pt. In the pattern of FIG. 8, since the included angle A1 is an acute angle and less than the included angle A2, it means that the location of the electronic device 120-*b* is closer to the target path Pt than the third electronic device 120-*n*. Accordingly, the multimedia interaction module 128-*a* determines that the relative position between the location of the candidate electronic device 120-*b* and the target direction Dt satisfies the predetermined condition in the ninth embodiment.

In the pattern of FIG. 8, when the candidate electronic device is the electronic device 120-*n*, the multimedia interaction module 128-*a* selects another electronic device near the target path Pt, such as the electronic device 120-*b*, as a third electronic device. In this situation, the first direction is the direction D2 that points to the centroid Cn of the display 127-*n*, and the centroid Ca of the display 127-*a* is the starting point of the second direction. The first included angle is the included angle A2 between the direction D2 and the target shifted direction Dts. The second direction is the direction D1 that points to the centroid Cb of the display 127-*b*, and the centroid Ca of the display 127-*a* is the starting point of the second direction. The second included angle is the included angle A1 between the direction D1 and the target shifted direction Dts. In the pattern of FIG. 8, since the included angle A2 is greater than the included angle A1, it means that the location of the third electronic device 120-*b* is closer to the target path Pt to which the target direction Dt points than the location of the electronic device 120-*n*. Accordingly, the multimedia interaction module 128-*a* determines that the relative position between the location of the candidate electronic device 120-*n* and the target direction Dt does not satisfy the predetermined condition in the aforementioned ninth embodiment.

When the multimedia interaction system 100 wants to create a multimedia interaction effect where the target image object or the target command transmitted from the source electronic device 120-*a* can only be received by a single candidate electronic device which is closest to the target path Pt to which the target direction Dt points, by adopting the configuration of the predetermined condition illustrated in the aforementioned ninth embodiment the multimedia interaction system 100 is enabled to prevent the target image object from being received by multiple candidate electronic devices, or to prevent similar unexpected results.

In a tenth embodiment, the aforementioned predetermined condition specifies that the candidate electronic device is positioned on the target path Pt, and a section of the target path Pt between the source electronic device 120-*a* and the candidate electronic device does not contact with other electronic devices of the electronic devices 120-*a*~120-*n*.

In an eleventh embodiment, the aforementioned predetermined condition specifies that the distance between the location of the candidate electronic device and the target path Pt is less than the first predetermined value R1, and the section of the target path Pt between the source electronic device 120-*a* and the candidate electronic device does not contact with other electronic devices of the electronic devices 120*a*~120-*n*.

In a twelfth embodiment, the aforementioned predetermined condition specifies that the target path Pt passes through the candidate display of the candidate electronic device, and the section of the target path Pt between the source electronic device 120-*a* and the candidate electronic device does not contact with other electronic devices of the electronic devices 120-*a*~120-*n*.

In a thirteenth embodiment, the aforementioned predetermined condition specifies that the candidate electronic device is positioned on the target vertical plane in which the target path Pt resides, and a section of the target vertical plane between the source electronic device 120-*a* and the candidate electronic device does not contact with other electronic devices of the electronic devices 120-*a*~120-*n*.

In a fourteenth embodiment, the aforementioned predetermined condition specifies that a distance between the location of the candidate electronic device and the target vertical plane is less than the first predetermined value R1, and the section of the target vertical plane between the source electronic device 120-*a* and the candidate electronic device does not contact with other electronic devices of the electronic devices 120-*a*~120-*n*.

Figure 9:
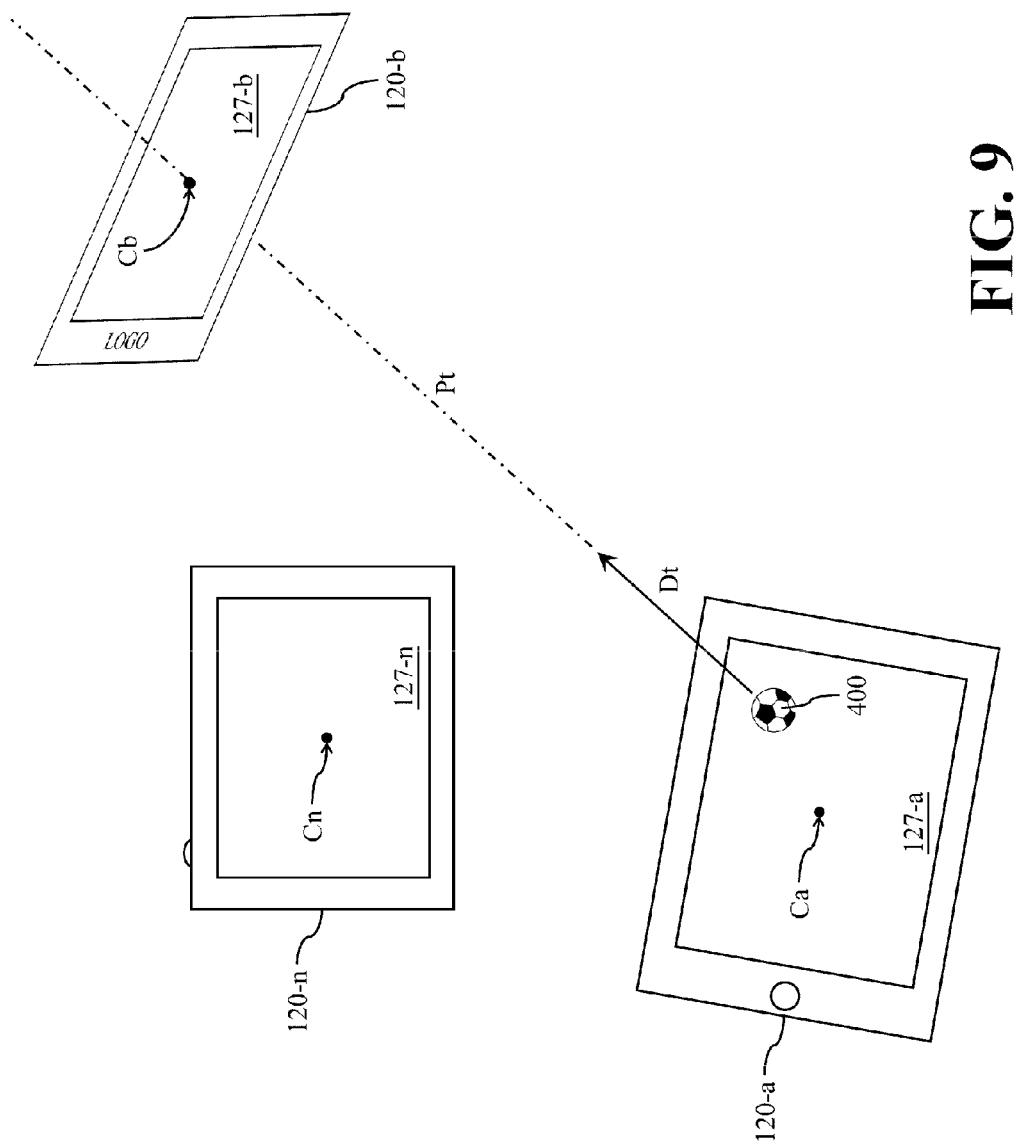

In the pattern of FIG. 9, the target path Pt to which the target direction points passes through the centroid Cb of the display 127-*b*, which means that the electronic device 120-*b* is positioned on the target path Pt and also positioned on the target vertical plane in which the target path Pt resides. Since the electronic device 120-*b* is positioned on the target path Pt and the target vertical plane, the distance between the electronic device 120-*b* and the target path Pt is zero, and the distance between the electronic device 120-*b* and the target vertical plane is zero as well. In addition, a section of the target path Pt between the source electronic device 120-*a* and the electronic device 120-*b* does not contact with other electronic devices. In one aspect, this means that the section between the source electronic device 120-*a* and the electronic device 120-*b* is not blocked by other electronic devices.

Accordingly, for the pattern of FIG. 9, when the candidate electronic device is the electronic device 120-*b*, the multimedia interaction module 128-*a* determines that the relative position between the location of the candidate electronic device 120-*b* and the target direction Dt satisfies the predetermined condition in the aforementioned tenth to fourteenth embodiments.

In compared with FIG. 9, in the pattern of aforementioned FIG. 4, the section of the target path Pt between the source electronic device 120-*a* and the electronic device 120-*b* passes through the region of the display 127-*n* of the electronic device 120-*n*. In one aspect, this means that the section between the source electronic device 120-*a* and the electronic device 120-*b* is blocked by the electronic device 120-*n*.

Accordingly, for the pattern of FIG. 4, when the candidate electronic device is the electronic device 120-*b*, the multimedia interaction module 128-*a* determines that the relative position between the location of the candidate electronic device 120-*b* and the target direction Dt does not satisfy the predetermined condition in the aforementioned tenth to fourteenth embodiments.

If the relative position between the location of the candidate electronic device and the target direction Dt satisfies the predetermined condition specified in any of the aforementioned tenth to fourteenth embodiments, it means that the candidate electronic device is positioned near the target path Pt to which the target direction Dt points, the distance between the candidate electronic device and the target path Pt is within an error tolerance range, and no other electronic device block is positioned between the candidate electronic device and the source electronic device 120-*a*. Accordingly, when the multimedia interaction system 100 wants to create a multimedia interaction effect where the target image object can be transmitted from the source electronic device 120-*a* to the candidate electronic device only if no other electronic device is positioned between the candidate electronic device and the source electronic device 120-*a*, by adopting the configuration of the predetermined condition illustrated in any of the aforementioned first to eighth embodiments the multimedia interaction system 100 is enabled to prevent the candidate electronic device from receiving the target image object if there is other electronic device blocking between the candidate electronic device and the source electronic device 120-a, or to prevent similar unexpected results.

In a fifteenth embodiment, the aforementioned predetermined condition specifies that a third included angle is defined by the aforementioned first direction and second direction, and the first included angle is less than a half of the third included angle.

In a sixteenth embodiment, the aforementioned predetermined condition specifies that a second vertical plane in which the aforementioned second direction resides divides a space into a first half space and a second half space, wherein the second vertical plane is perpendicular to the ground, the target direction Dt points to the first half space, and the candidate electronic device is positioned in the first half space.

Figure 10:
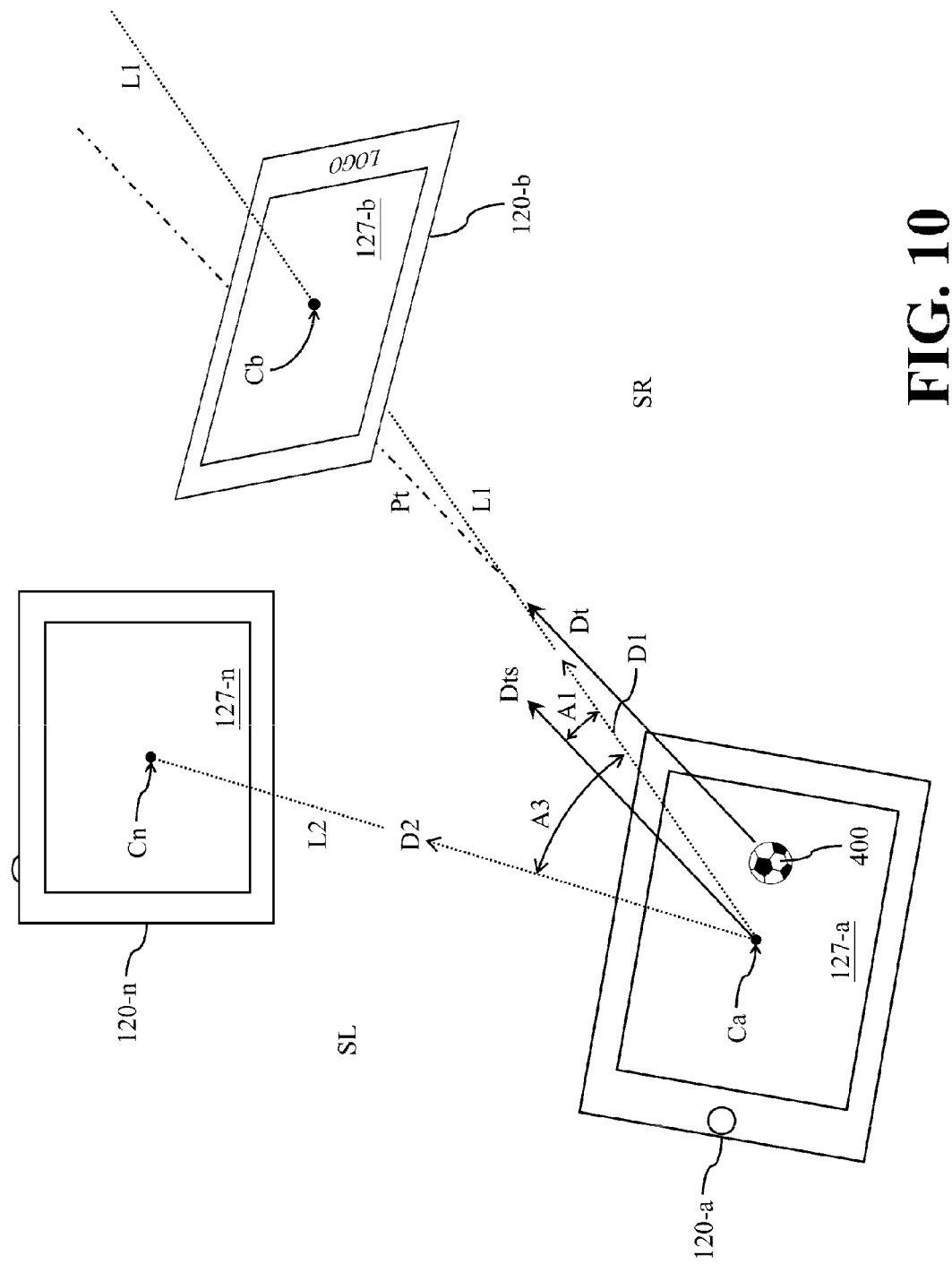

In the pattern of FIG. 10, when the candidate electronic device is the electronic device 120-b, the multimedia interaction module 128-a selects another electronic device near the target path Pt, such as the electronic device 120-n, as a third electronic device. In this situation, the first direction is the direction D1 that points to the centroid Cb of the display 127-b, and the centroid Ca of the display 127-a is the starting point of the first direction. The first included angle is the included angle A1 between the direction D1 and the target shifted direction Dts. The second direction is the direction D2 that points to the centroid Cn of the display 127-n, and the centroid Ca of the display 127-a is the starting point of the second direction. The third included angle is an included angle A3 between the direction D1 and the direction D2. If the included angle A1 is less than a half of the third included angle A3, it means that the location of the candidate electronic device 120-b is closer to the target path Pt than the location of the third electronic device 120-n. In addition, a second vertical plane (not shown) in which the second direction D2 resides divides a space into a first half space SR and a second half space SL, wherein the second vertical plane is perpendicular to the ground. As shown in FIG. 10, the target direction Dt points to the first half space SR, and the candidate electronic device 120-b is positioned in the first half space SR. Accordingly, the multimedia interaction module 128-a determines that the relative position between the location of the candidate electronic device 120-b and the target direction Dt satisfies the predetermined condition in the aforementioned fifteenth and sixteenth embodiments.

When the multimedia interaction system 100 wants to create a multimedia interaction effect where the target image object or the target command transmitted from the source electronic device 120-a can only be received by a single candidate electronic device which is closest to the target path Pt to which the target direction Dt points, by adopting the configuration of the predetermined condition illustrated in the aforementioned fifteenth or sixteenth embodiment the multimedia interaction system 100 is enabled to prevent the target image object from being received by multiple candidate electronic devices, or to prevent similar unexpected results.

In a seventeenth embodiment, the aforementioned predetermined condition specifies that a source vertical plane in which a source orientation direction Da of the source electronic device 120-a resides refers to the location of the source electronic device 120-a as an axis and rotates a first viewing angle VA1 toward two sides of the axis to define a target viewing angle region, wherein the source vertical plane is perpendicular to the ground, the source vertical plane divides the target viewing angle region into a first half region and a second half region, the target direction Dt points to the first half region, and the candidate electronic device is positioned in the first half region.

In an eighteenth embodiment, the aforementioned predetermined condition specifies that a fourth included angle is defined by the source orientation direction Da and the target shifted direction Dts, a fifth included angle is defined by the aforementioned first direction and the source orientation direction Da, and the fourth included angle and the fifth included angle are both less than the first viewing angle VA1.

Figure 11:
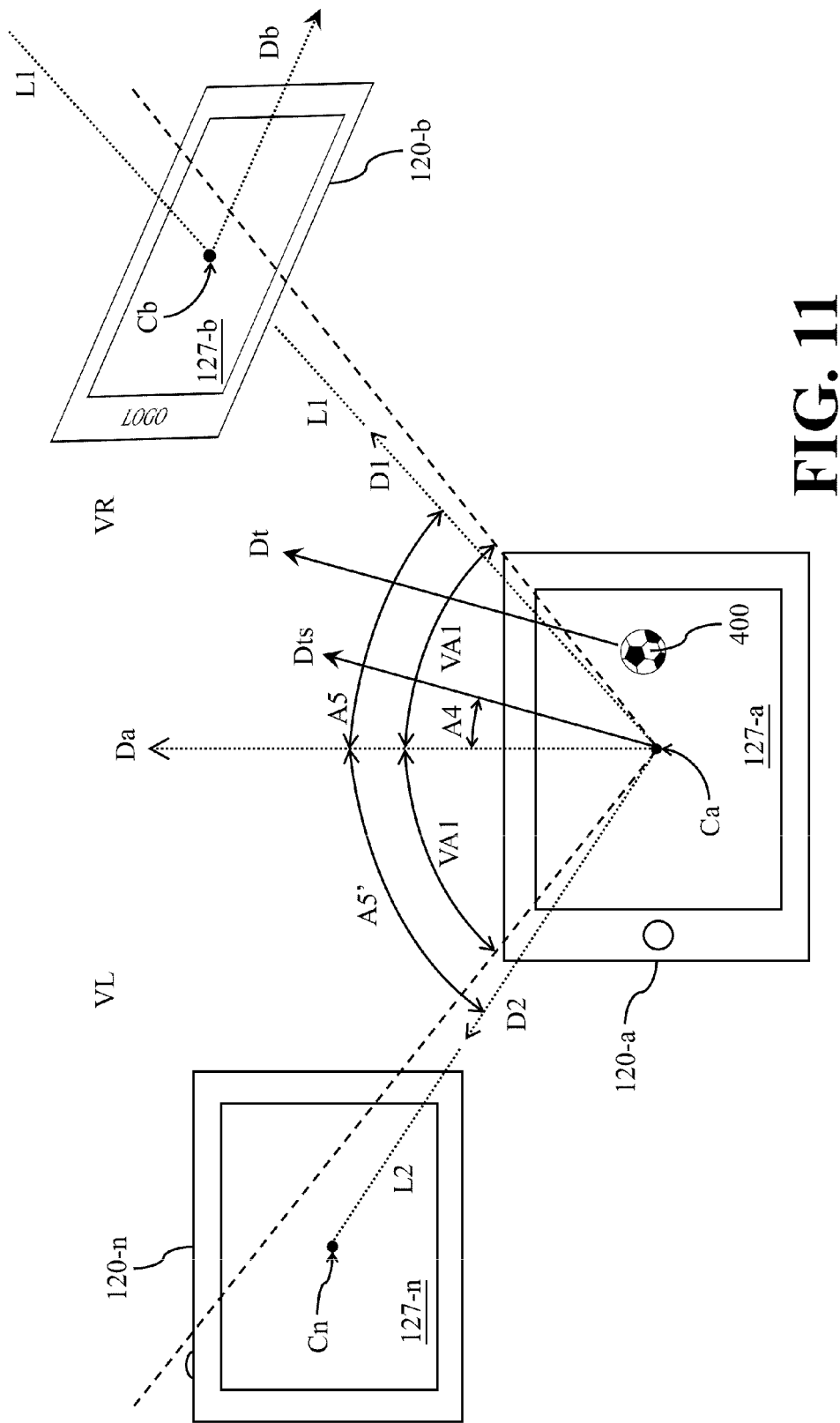

In the pattern of FIG. 11, a source vertical plane (not shown) in which the source orientation direction Da of the source electronic device 120-a resides refers to the location of the source electronic device 120-a (e.g., the location of the centroid Ca in this embodiment) as an axis and rotates the first viewing angle VA1 toward two sides of the axis to define a target viewing angle region composed of a right-half region VR and a left-half region VL, wherein the source vertical plane is perpendicular to the ground. The centroid Cb of the display 127-b is positioned within the right-half region VR, which means that the electronic device 120-b is positioned within the right-half region VR. As shown in FIG. 11, the target direction Dt points to the right-half region VR. The fourth included angle is an included angle A4 between the source orientation direction Da and the target shifted direction Dts. If the included angle A4 is less than the first viewing angle VA1, it means that the target direction Dt points to the target viewing angle region of the source electronic device 120-a.

For the pattern of FIG. 11, when the candidate electronic device is the electronic device 120-b, the first direction is the direction D1 that points to the centroid Cb of the display 127-b, and the centroid Ca of the display 127-a is the starting point of the first direction. The fifth included angle is an included angle A5 between the direction D1 and the source orientation direction Da. Since the included angle A4 and the included angle A5 are both less than the first viewing angle VA1, the multimedia interaction module 128-a determines that the relative position between the location of the candidate electronic device 120-b and the target direction Dt satisfies the predetermined condition in the aforementioned seventeenth and eighteenth embodiments.

As shown in FIG. 11, the centroid Cn of the display 127-n is positioned outside the target viewing angle region, which means that the electronic device 120-n is positioned outside the target viewing angle region.

For the pattern of FIG. 11, when the candidate electronic device is the electronic device 120-n, the first direction is the direction D2 that points to the centroid Cn of the display 127-n, and the centroid Ca of the display 127-a is the starting point of the first direction. The fifth included angle in this case is an included angle A5' between the direction D2 and the source orientation direction Da. As shown in FIG. 11, the included angle A5' is greater than the first viewing angle VA1, which means that the electronic device 120-n is positioned outside the target viewing angle region. Accordingly, the multimedia interaction module 128-a determines that the relative position between the location of the candidate electronic device 120-n and the target direction Dt does not satisfy the predetermined condition in the aforementioned seventeenth and eighteenth embodiments.

When the multimedia interaction system 100 wants to create a multimedia interaction effect where the target image object or the target command transmitted from the source electronic device 120-a can be received by a candidate electronic device only if the candidate electronic device is positioned within the target viewing angle region of the source electronic device 120-a, by adopting the configuration of the predetermined condition illustrated in the aforementioned seventeenth or eighteenth embodiment the multimedia interaction system 100 is enabled to prevent the target image object from being received by other electronic devices outside the target viewing angle region of the source electronic device 120-a, or to prevent similar unexpected results.

In a nineteenth embodiment, the aforementioned predetermined condition specifies that a sixth included angle is defined by a candidate orientation direction of the candidate electronic device and a first inverse direction, the aforementioned fourth included angle and fifth included angle are both less than the first viewing angle VA1, and the sixth included angle is less than a second viewing angle VA2, wherein the location of the candidate electronic device is a starting point of the first inverse direction, and the first inverse direction points to the location of the source electronic device.

In a twentieth embodiment, the aforementioned predetermined condition specifies that a candidate vertical plane in which the candidate orientation direction resides refers to the location of the candidate electronic device as an axis and rotates the second viewing angle VA2 toward two sides of the axis to define a candidate viewing angle region, wherein the candidate vertical plane is perpendicular to the ground, the source electronic device is positioned in the candidate viewing angle region, the target direction points to the first half region, and the candidate electronic device is positioned in the first half region.

When the fifth included angle is less than the first viewing angle VA1, it means that the candidate electronic device is positioned within the target viewing angle region of the source electronic device 120-a. When the sixth included angle is less than the second viewing angle VA2, it means that the source electronic device 120-a is positioned within the candidate viewing angle region of the candidate electronic device.

Figure 12:
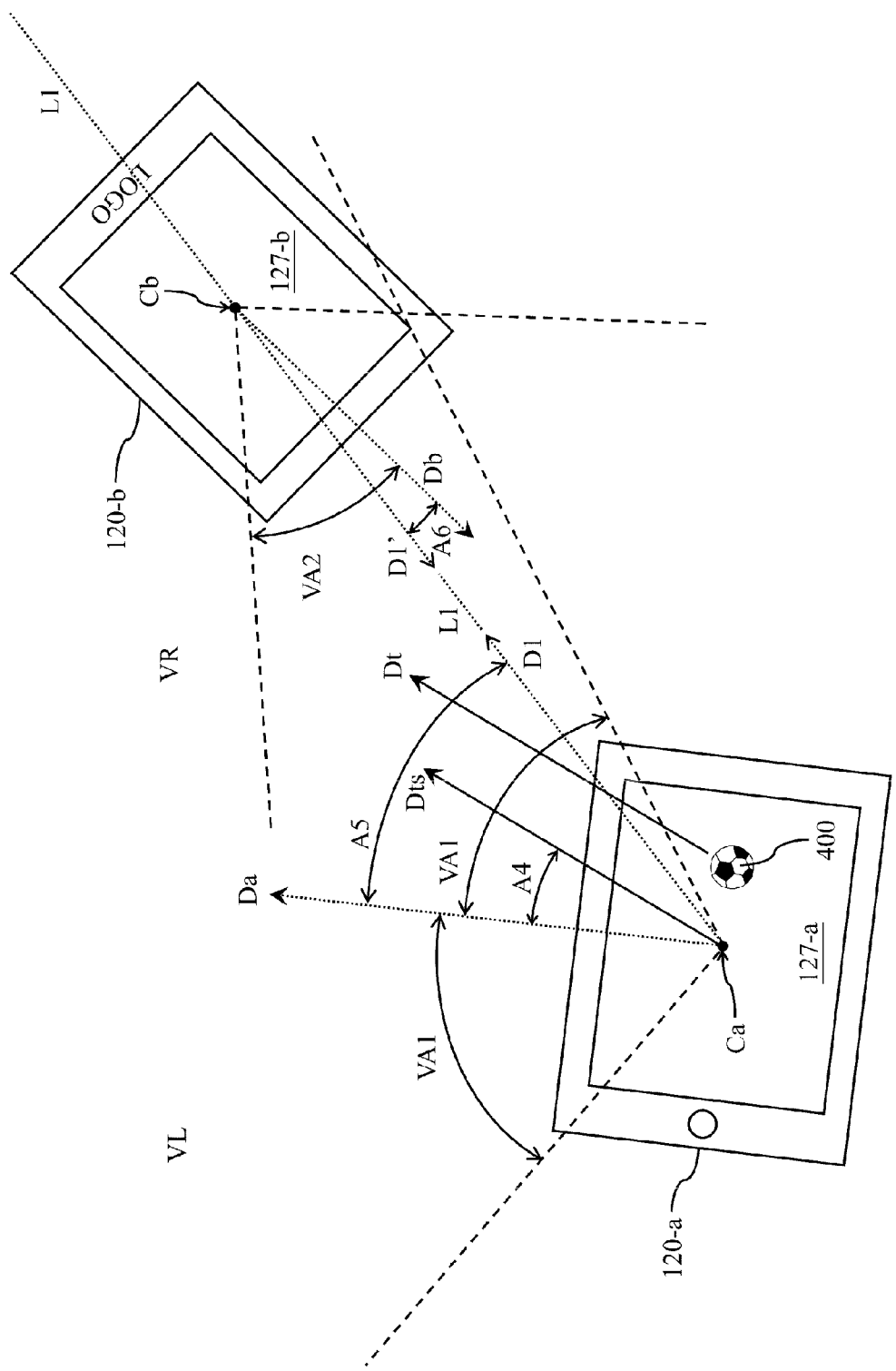

In the pattern of FIG. 12, the source vertical plane (not shown) in which the source orientation direction Da resides refers to the location of the source electronic device 120-a (e.g., the location of the centroid Ca in this embodiment) as an axis and rotates the first viewing angle VA1 toward two sides of the axis to define the target viewing angle region composed of the right-half region VR and the left-half region VL. The centroid Cb of the display 127-b is positioned within the right-half region VR, which means that the electronic device 120-b is positioned within the right-half region VR. As shown in FIG. 12, the target direction Dt points to the right-half region VR. The fourth included angle is the included angle A4 between the source orientation direction Da and the target shifted direction Dts. When the included angle A4 is less than the first viewing angle VA1, it means that the target direction Dt points to the target viewing angle region of the source electronic device 120-a. When the candidate electronic device is the electronic device 120-b, the first direction is the direction D1 that points to the centroid Cb of the display 127-b, and the centroid Ca of the display 127-a is the starting point of the first direction. The fifth included angle is the included angle A5 between the direction D1 and the source orientation direction Da. The multimedia interaction module 128-a may shift the first direction D1 so that the location of the source electronic device 120-b (e.g., the location of the centroid Cb in this embodiment) becomes the starting point of the shifted first direction D1. The multimedia interaction module 128-a then inverses the shifted first direction D1 and utilize the inversed direction as a first inverse direction D1'. The sixth included angle is an included angle A6 between the first inverse direction D1' and the candidate orientation direction Db of the candidate electronic device 120-b. A candidate vertical plane (not shown) in which the candidate orientation direction Db resides refers to the location of the candidate electronic device 120-b (e.g., the location of the centroid Cb in this embodiment) as an axis and rotates the second viewing angle VA2 toward two sides of the axis to define the candidate viewing angle region. As shown in FIG. 12, since the included angle A5 is less than the first viewing angle VA1 and the included angle A6 is less than the second viewing angle VA2, the multimedia interaction module 128-a determines that the relative position between the location of the candidate electronic device 120-b and the target direction Dt satisfies the predetermined condition in the aforementioned nineteenth and twentieth embodiments.

In the aforementioned nineteenth embodiment, by restricting the fifth included angle to be less than the first viewing angle VA1 and restricting the sixth included angle to be less than the second viewing angle VA2, the source electronic device 120-a is allowed to transmit the target command to the candidate electronic device 120-b only if the relative position between the source electronic device 120-a and the candidate electronic device 120-b belongs to or is close to a face-to-face pattern, thereby avoiding strange user experience.

In implementation, the aforementioned first viewing angle VA1 may be the same with the second viewing angle VA2, or may be different from the second viewing angle VA2.

When the multimedia interaction system 100 wants to create a multimedia interaction effect where the target image object or the target command transmitted from the source electronic device 120-a can be received by a candidate electronic device only if the relative position between source electronic device 120-a and the candidate electronic device 120-b belongs to or is close to a face-to-face pattern, by adopting the configuration of the predetermined condition illustrated in the aforementioned nineteenth or twentieth embodiment the multimedia interaction system 100 is enabled to prevent the target image object or the target command from being received by the candidate electronic device when the candidate electronic device is back to the source electronic device 120-a, or to prevent similar unexpected results. On the other hand, by adopting the configuration of the predetermined condition illustrated in the aforementioned nineteenth or twentieth embodiment the multimedia interaction system 100 is enabled to prevent the target image object or the target command from being received by the candidate electronic device when the source electronic device 120-a is back to the candidate electronic device, or to prevent similar unexpected results.

In implementation, the multimedia interaction system 100 may determine whether a relative position between the candidate electronic device and the target direction Dt satisfies the predetermined condition in the aforementioned operation 308 according to two dimensional coordinates of the candidate electronic device. The multimedia interaction system 100 may utilize the location detection circuit 110 to detect a projection location, a shape of a projection region, and an orientation on a same reference horizontal plane that is parallel to the ground for each of the electronic devices 120-a~120-n. In the multimedia interaction system 100, a projection location of a particular geometry characteristic of the electronic device 120, a projection location of a particular symbol of the electronic device 120, a projection location of a particular element of the electronic device 120, or a projection location of a particular region of the electronic device 120 on the reference horizontal plane may be utilized to represent a spatial location of the electronic device 120.

For example, the location detection circuit 110 may detect and utilize a projection location of the centroid of the electronic device 120 on the reference horizontal plane to represent the spatial location of the electronic device 120. Alternatively, the location detection circuit 110 may detect and utilize a projection location of the centroid of the display 127 on the reference horizontal plane to represent the spatial location of the electronic device 120.

Similarly, the location detection circuit 110 may cooperate with respective electronic devices 120-a~120-n to compute respective spatial locations of the electronic devices 120-a~120-n. For example, in the embodiment of FIG. 2, the location detection circuit 110 may detect and transmit two dimensional coordinates of the projections of multiple reference points of the electronic device 120 on the reference horizontal plane to the electronic device 120, and then the electronic device 120 utilizes the control circuit 121 to compute the projection location of the centroid of the electronic device 120 or the projection location of the centroid of the display 127 on the reference horizontal plane according to the received coordinates of the multiple reference points to represent the spatial location of the electronic device 120.

Since the electronic device 120 is typically equipped with a gyroscope (not shown), the control circuit 121 of the electronic device 120 may utilize the gyroscope to calculate an inclined angle of the electronic device 120. In addition, the length and width of the electronic device 120, the length and width of the display 127, and the spatial arrangement of the display 127 with respect to the electronic device 120 are given parameters. Accordingly, the electronic device 120 is allowed to utilize the control circuit 121 to compute the projection location of the centroid of the electronic device 120 or the projection location of the centroid of the display 127 on the reference horizontal plane according to the coordinates of the aforementioned reference points to represent the spatial location of the electronic device 120.

Alternatively, the electronic device 120 may utilize the control circuit 121 to compute a projection location of a particular geometry characteristic (such as a central location) of a multimedia interaction program window (such as a browser window) that is being displayed on the display 127 on the reference horizontal plane according to the received coordinates of the reference points to represent the spatial location of the electronic device 120. For example, in the embodiment of FIG. 2, the electronic device 120a utilizes the display 127-a to display the target browser window 216, and the electronic device 120-b utilizes the display 127-b to display the target browser window 226. Since the size of the target browser window 216 displayed on the display 127-a and the relative position between the target browser window 216 and the display 127-a are configured by the control circuit 121-a, the size of the target browser window 216 and the relative position between the target browser window 216 and the display 127-a are known parameters to the control circuit 121-a. Accordingly, the location detection circuit 110 may detect and transmit the two dimensional coordinates of the projections of the reference points 211~214 of the electronic device 120-a on the reference horizontal plane to the electronic device 120-a, and then the electronic device 120-a may utilize the control circuit 121-a to compute two dimensional coordinates of a projection location of the central location Wa of the target browser window 216 on the reference horizontal plane according to the coordinates of some or all of the reference points to represent the spatial location of the electronic device 120-a.

Similarly, since the size of the target browser window 226 displayed on the display 127-b and the relative position between the target browser window 226 and the display 127-b are configured by the control circuit 121-b, the size of the target browser window 226 and the relative position between the target browser window 226 and the display 127-b are known parameters to the control circuit 121-b. Accordingly, the location detection circuit 110 may detect and transmit the two dimensional coordinates of the projections of the reference points 221~224 of the electronic device 120-b on the reference horizontal plane to the electronic device 120-b, and then the electronic device 120-b may utilize the control circuit 121-b to compute two dimensional coordinates of a projection location of the central location Wb of the target browser window 226 on the reference horizontal plane according to the coordinates of some or all of the reference points to represent the spatial location of the electronic device 120-b.

The operations of determining whether the relative position between the candidate device and the target direction Dt satisfies the predetermined condition in the aforementioned operation 308 made by the source electronic device 120-a according to the two dimensional coordinates of the candidate electronic device will be further described below with reference to FIG. 13~21.

FIGS. 13~21 show simplified schematic diagrams of different types of relative position among partial electronic devices in the multimedia interaction system 100 when the user of the source electronic device 120-a instructs the source electronic device 120-a to transmit the target image object 400 toward the target direction Dt according to several embodiments of the present disclosure. In FIGS. 13~21, 120-ap denotes a projection region projected by the electronic device 120-a on the reference horizontal plane, 127-ap denotes a projection region projected by the display 127-a on the reference horizontal plane, and Cap denotes a projection location of the centroid Ca of the display 127-a on the reference horizontal plane. 120-bp denotes a projection region projected by the electronic device 120-b on the reference horizontal plane, 127-bp denotes a projection region projected by the display 127-b on the reference horizontal plane, and Cbp denotes a projection location of the centroid Cb of the display 127-b on the reference horizontal plane. 120-np denotes a projection region projected by the electronic device 120-n on the reference horizontal plane, 127-np denotes a projection region projected by the display 127-n on the reference horizontal plane, and Cnp denotes a projection location of the centroid Cn of the display 127-n on the reference horizontal plane. A target projection direction Dtp denotes a projection of the target direction Dt on the reference horizontal plane. A target projection object 1300 is a projection of the target image object 400 on the reference horizontal plane.

For the purpose of explanatory convenience in the following description, it is assumed hereinafter that the multimedia interaction system 100 utilizes the projection location of the centroid of the display 127 on the reference horizontal plane to represent the projection location of the electronic device 120 on the reference horizontal plane.

In a twenty-first embodiment, the predetermined condition in aforementioned operation 308 the specifies that a candidate projection location projected by the candidate electronic device on the reference horizontal plane is positioned on a target projection path Ptp to which a target projection direction Dtp points, wherein the target projection direction Dtp is projected by the target direction Dt on the reference horizontal plane.

In a twenty-second embodiment, the aforementioned predetermined condition specifies that a distance between the candidate projection location and the target projection path Ptp is less than the first predetermined value R1.

In a twenty-third embodiment, the aforementioned predetermined condition specifies that the target projection path Ptp passes through a display projection region projected by the candidate display of the candidate electronic device on the reference horizontal plane.

Figure 13:
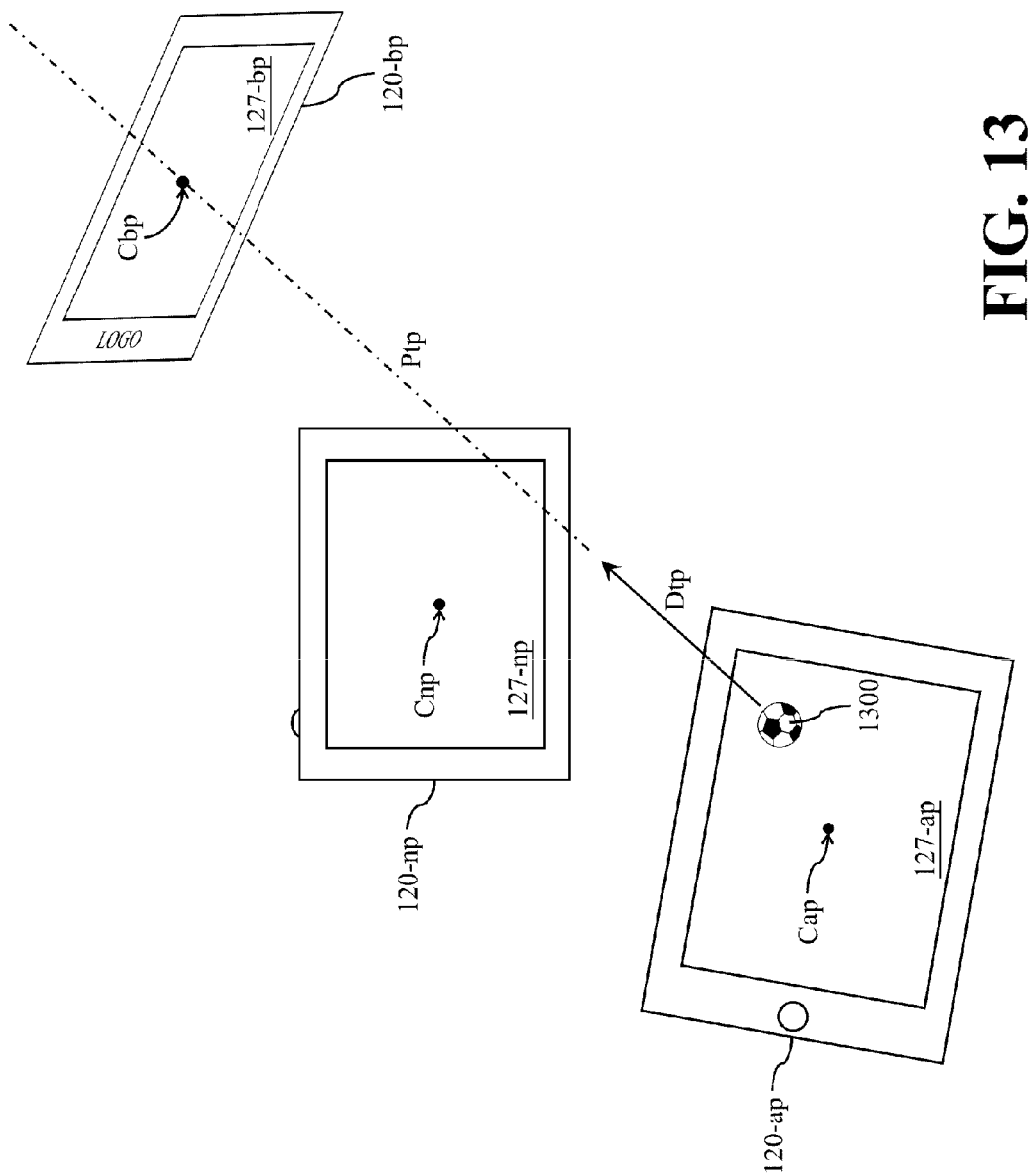
FIGS. 13~21 show simplified schematic diagrams of different types of relative position among projections projected by partial electronic devices in FIG. 1 on a reference horizontal plane according to several embodiments of the present disclosure.

In the pattern of FIG. 13, the target projection direction Dtp is projected by the target direction Dt on the reference horizontal plane, and the target projection path Ptp to which the target projection direction Dtp points passes through the projection location Cbp of the centroid Cb of the display 127-*b*. This means that the projection location of the electronic device 120-*b* on the reference horizontal plane is positioned on the target projection path Ptp. Since the projection location of the electronic device 120-*b* is positioned on the target projection path Ptp, a distance between the projection location of the electronic device 120-*b* and the target projection path Ptp is zero. As shown in FIG. 13, the target projection path Ptp passes through the projection region 127-*np* of the display 127-*n* but does not pass through the projection location Cnp of the centroid Cn of the display 127-*n*, which means that the projection location of the electronic device 120-*n* is not positioned on the target projection path Ptp.

Accordingly, for the pattern of FIG. 13, when the candidate electronic device is the electronic device 120-*b*, the multimedia interaction module 128-*a* determines that a relative position between the location of the electronic device 120-*b* and the target direction Dt satisfies the predetermined condition in the aforementioned twenty-first to twenty-third embodiments. When the candidate electronic device is the electronic device 120-*n*, the multimedia interaction module 128-*a* determines that a relative position between the location of the electronic device 120-*n* and the target direction Dt satisfies the predetermined condition in the aforementioned twenty-third embodiment. The multimedia interaction module 128-*a*, however, determines that the relative position between the location of the electronic device 120-*n* and the target direction Dt does not satisfy the predetermined condition in the aforementioned twenty-first embodiment.

Figure 14:
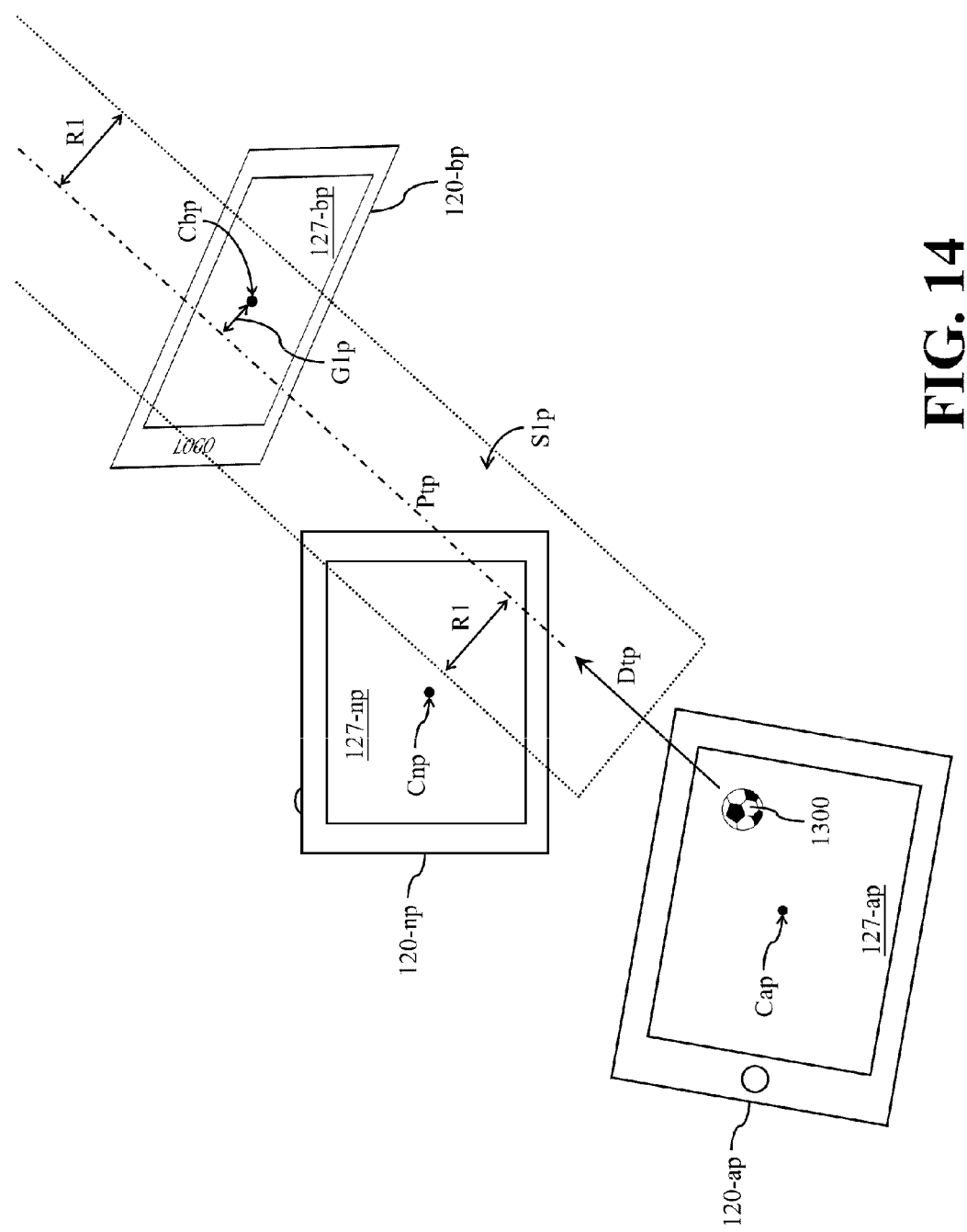

In the pattern of FIG. 14, the target projection path Ptp to which the target projection direction Dtp points passes through a projection region 127-*bp* of the display 127-*b* but does not pass through the projection location Cbp of the centroid Cb of the display 127-*b*. This means that the projection location of the electronic device 120-*b* is not positioned on the target projection path Ptp. A distance between the projection location Cbp of the centroid Cb and the target projection path Ptp is G1*p*, which means that the distance between the projection location of the location of the electronic device 120-*b* and the target projection path Ptp is G1*p*. In addition, the target projection path Ptp passes through the projection region 127-*np* of the electronic device 120-*n* but does not pass through the projection location Cnp of the display 127-*n*, which means that the projection location of the electronic device 120-*n* is not positioned on the target projection path Ptp. As shown in FIG. 14, the distance G1*p* between the projection location Cbp of the centroid Cb of the display 127-*b* and the target projection path Ptp is less than the first predetermined value R1, but a distance between the projection location Cnp of the centroid Cn of the display 127-*n* and the target projection path Ptp is apparently greater than the first predetermined value R1.

Accordingly, for the pattern of FIG. 14, when the candidate electronic device is the electronic device 120-*b*, the multimedia interaction module 128-*a* determines that the relative position between the location of the electronic device 120-*b* and the target direction Dt satisfies the predetermined condition in the aforementioned twenty-second and twenty-third embodiments. In comparison, the multimedia interaction module 128-*a* determines that the relative position between the location of the electronic device 120-*b* and the target direction Dt does not satisfy the predetermined condition in the aforementioned twenty-first embodiment. When the candidate electronic device is the electronic device 120-*n*, the multimedia interaction module 128-*a* determines that the relative position between the location of the electronic device 120-*n* and the target direction Dt does not satisfy the predetermined condition in the aforementioned twenty-first and twenty-second embodiments. In comparison, the multimedia interaction module 128-*a* determines that the relative position between the location of the electronic device 120-*n* and the target direction Dt satisfies the predetermined condition in the aforementioned twenty-third embodiment.

In a twenty-fourth embodiment, the aforementioned predetermined condition specifies that the target projection direction Dtp points to the target projection path Ptp and a strip region S1*p*, and the aforementioned candidate projection location is positioned in the strip region S1*p*, wherein the target projection path Ptp is a central line of the strip region S1*p*, and a width of the strip region S1*p* is two times of the first predetermined value R1.

In the pattern of FIG. 14, the projection location Cbp of the centroid Cb of the display 127-*b* is positioned within the strip region S1*p* to which the target projection direction Dtp points. This means that the projection location of the electronic device 120*b* is positioned in the strip region S1*p*. The projection location Cnp of the centroid Cn of the display 127-*n* is positioned outside the strip region S1*p*, which means that the projection location of the electronic device 120-*n* is not positioned in the strip region S1*p*.

Accordingly, for the pattern of FIG. 14, when the candidate electronic device is the electronic device 120-*b*, the multimedia interaction module 128-*a* determines that the relative position between the location of the candidate electronic device 120-*b* and the target direction Dt satisfies the predetermined condition in the aforementioned twenty-fourth embodiment. When the candidate electronic device is the electronic device 120-*n*, the multimedia interaction module 128-*a* determines that the relative position between the location of the candidate electronic device 120-*n* and the target direction Dt does not satisfy the predetermined condition in the aforementioned twenty-fourth embodiment.

In a twenty-fifth embodiment, the aforementioned predetermined condition specifies that the target projection direction Dtp points to a triangle region S2*p*, and the aforementioned candidate projection location is positioned in the triangle region S2*p*, wherein the target projection path Ptp is a central line of the triangle region S2*p*, a projection location projected by the target image object 400 on the reference horizontal plane (i.e., the location of the target projection object 1300) is an apex of the triangle region S2*p*, and a vertex angle of the triangle region S2*p* is an acute angle.

Figure 15:
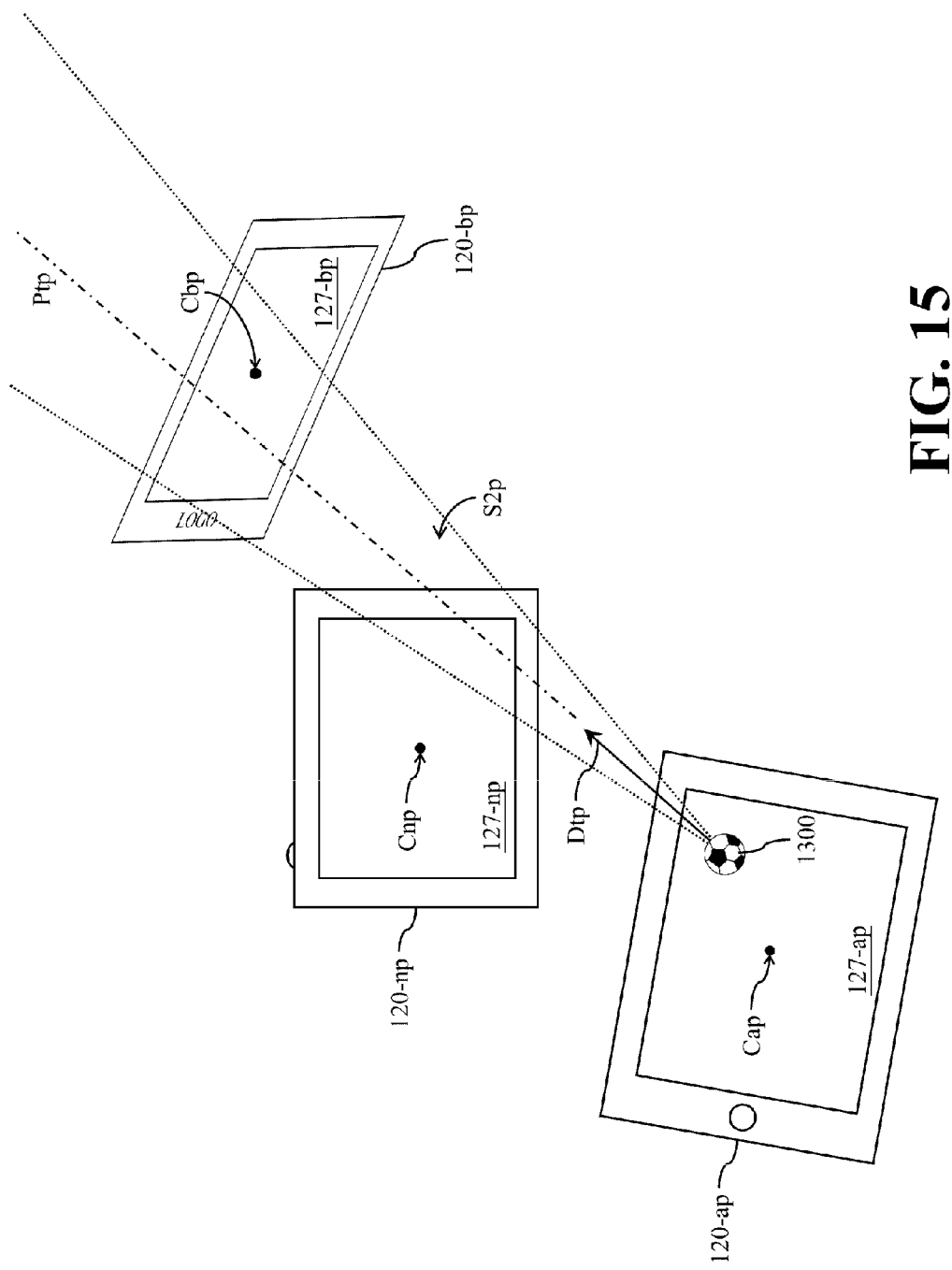

In the pattern of FIG. 15, the projection location Cbp of the centroid Cb of the display 127-*b* is positioned within the triangle region S2*p*, which means that the projection location of the electronic device 120-*b* is positioned in the triangle region S2*p*. The projection location Cnp of the centroid Cn of the display 127-*n* is positioned outside the triangle region S2*p*, which means that the projection location of the electronic device 120-*n* is not positioned in the triangle region S2*p*.

Accordingly, for the pattern of FIG. 15, when the candidate electronic device is the electronic device 120-*b*, the multimedia interaction module 128-*a* determines that the relative position between the location of the electronic device 120-*b* and the target direction Dt satisfies the predetermined condition in the aforementioned twenty-fifth embodiment. When the candidate electronic device is the electronic device 120-*n*, the multimedia interaction module 128-*a* determines that the relative position between the location of the electronic device 120-*n* and the target direction Dt does not satisfy the predetermined condition in the aforementioned twenty-fifth embodiment.

In a twenty-sixth embodiment, the aforementioned predetermined condition specifies that an eleventh included angle between the target projection direction Dtp and a first projection direction is an acute angle and less than a threshold angle Ath, wherein a projection location Cap projected by the source electronic device 120-*a* on the reference horizontal plane (hereinafter, a source projection location Cap) is a starting point of the first projection direction, and the first projection direction points to the candidate projection location.

Figure 16:
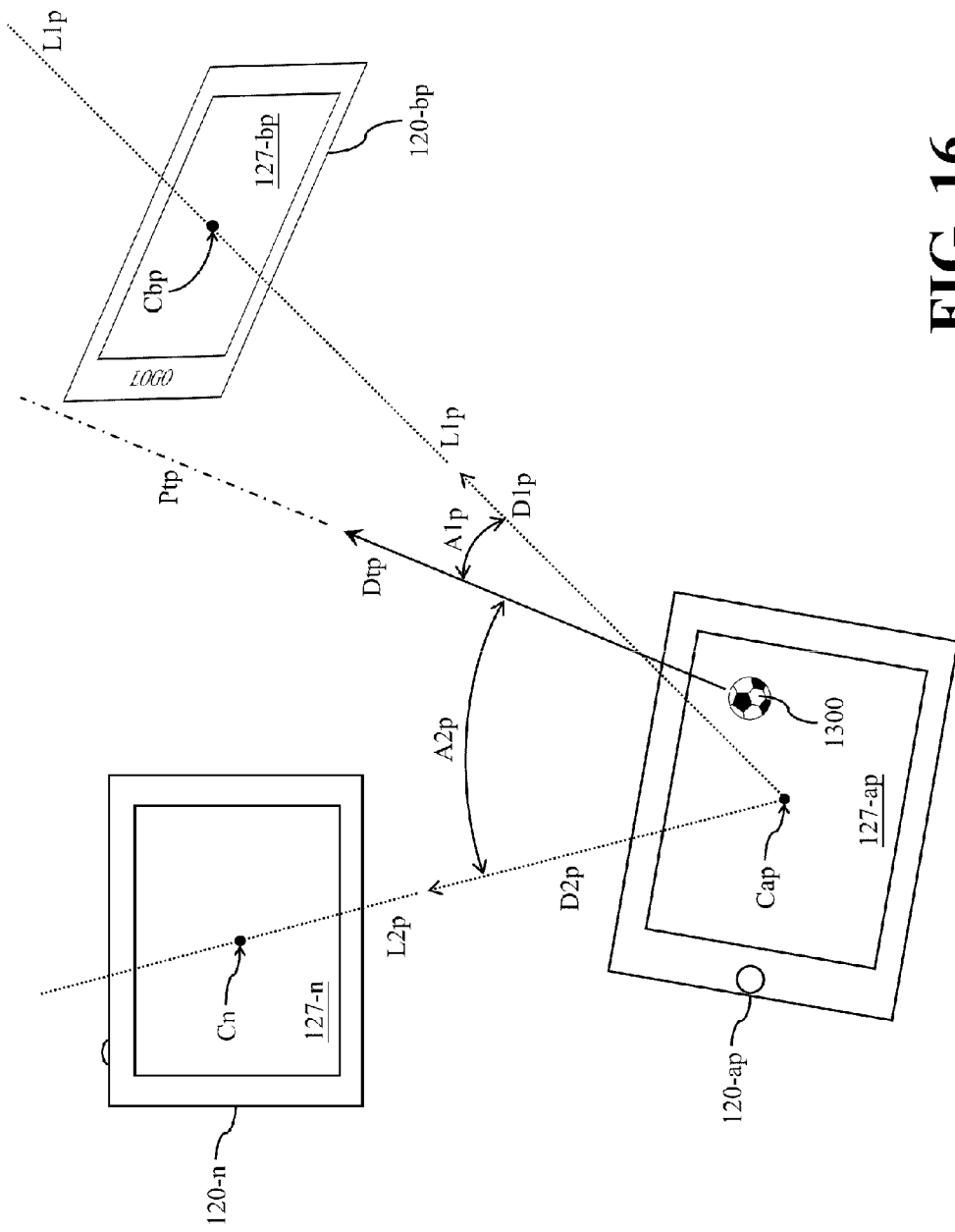

In the pattern of FIG. 16, when the candidate electronic device is the electronic device 120-*b*, the first projection direction is a projection direction D1*p* that points to the projection location Cbp of the centroid Cb of the display 127-*b*, and the projection location Cap of the centroid Ca of the display 127-*a* is the starting point of the first projection direction. The eleventh included angle is an included angle A1*p* between the projection direction D1*p* and the target projection direction Dtp. The distance between the projection location of the candidate electronic device 120-*b* and the target projection path Ptp to which the target projection direction Dtp points is related to the included angle A1*p* to some extent. In this embodiment, the smaller the included angle A1*p*, the closer the projection location of the candidate electronic device 120-*b* to the target projection path Ptp. Accordingly, if the included angle A1*p* is an acute angle and smaller than the threshold angle Ath, the multimedia interaction module 128-*a* determines that the relative position between the location of the electronic device 120-*b* and the target direction Dt satisfies the predetermined condition in the aforementioned twenty-sixth embodiment. On the contrary, if the included angle A1*p* is greater than the threshold angle Ath, the multimedia interaction module 128-*a* determines that the relative position between the location of the electronic device 120-*b* and the target direction Dt does not satisfy the predetermined condition in the aforementioned twenty-sixth embodiment.

In the pattern of FIG. 16, when the candidate electronic device is the electronic device 120-*n*, the first projection direction is a projection direction D2*p* that points to the projection location Cnp of the centroid Cn of the display 127-*n*, and the projection location Cap of the centroid Ca of the display 127-*a* is the starting point of the first projection direction. The eleventh included angle is an included angle A2*p* between the projection direction D2*p* and the target projection direction Dtp. The distance between the projection location of the candidate electronic device 120-*n* and the target projection path Ptp is related to the included angle A2*p* to some extent. In this embodiment, the smaller the included angle A2*p*, the closer the projection location of the candidate electronic device 120-*n* to the target projection path Ptp. Accordingly, if the included angle A2*p* is an acute angle and smaller than the threshold angle Ath, the multimedia interaction module 128-*a* determines that the relative position between the location of the electronic device 120-*n* and the target direction Dt satisfies the predetermined condition in the aforementioned twenty-sixth embodiment. On the contrary, if the included angle A2*p* is greater than the threshold angle Ath, the multimedia interaction module 128-*a* determines that the relative position between the location of the electronic device 120-*n* and the target direction Dt does not satisfy the predetermined condition in the aforementioned twenty-sixth embodiment.

If the relative position between the location of the candidate electronic device and the target direction Dt satisfies the predetermined condition specified in any of the aforementioned twenty-first to twenty-sixth embodiments, it means that the candidate electronic device is positioned near the target path Pt to which the target direction Dt points, and the distance between the candidate electronic device and the target path Pt is within an error tolerance range. Accordingly, when the multimedia interaction system 100 wants to create a multimedia interaction effect showing that the target image object is transmitted from the source electronic device 120-*a* to the candidate electronic device, by adopting the configuration of the predetermined condition illustrated in any of the aforementioned twenty-first to twenty-sixth embodiments the multimedia interaction system 100 is enabled to prevent the candidate electronic device from receiving the target image object when the distance between the candidate electronic device and the target path Pt to which the target direction Dt points is beyond a reasonable range, or to prevent similar unexpected results.

In addition, if the multimedia interaction application that is being carried out by the multimedia interaction system 100 does not demand a highly accurate determination for the relative position between the candidate electronic device and the target direction Dt, the multimedia interaction system 100 may loosen the aforementioned first predetermined value R1 or the threshold angle Ath. On the contrary, if the multimedia interaction application demands a higher accurate determination for the relative position between the candidate electronic device and the target direction Dt, the multimedia interaction system 100 may lower the aforementioned first predetermined value R1 or the threshold angle Ath, or simply adopt the configuration of the predetermined condition in the twenty-first embodiment.

In a twenty-seventh embodiment, the aforementioned predetermined condition specifies that a twelfth included angle between the target projection direction Dtp and a second projection direction is an acute angle, and the aforementioned eleventh included angle is less than the twelfth included angle, wherein the source projection location Cap is a starting point of the second projection direction, and the second projection direction points to a third projection location projected by a third electronic device of the electronic devices 120-*a*~120-*n* on the reference horizontal plane.

Figure 17:
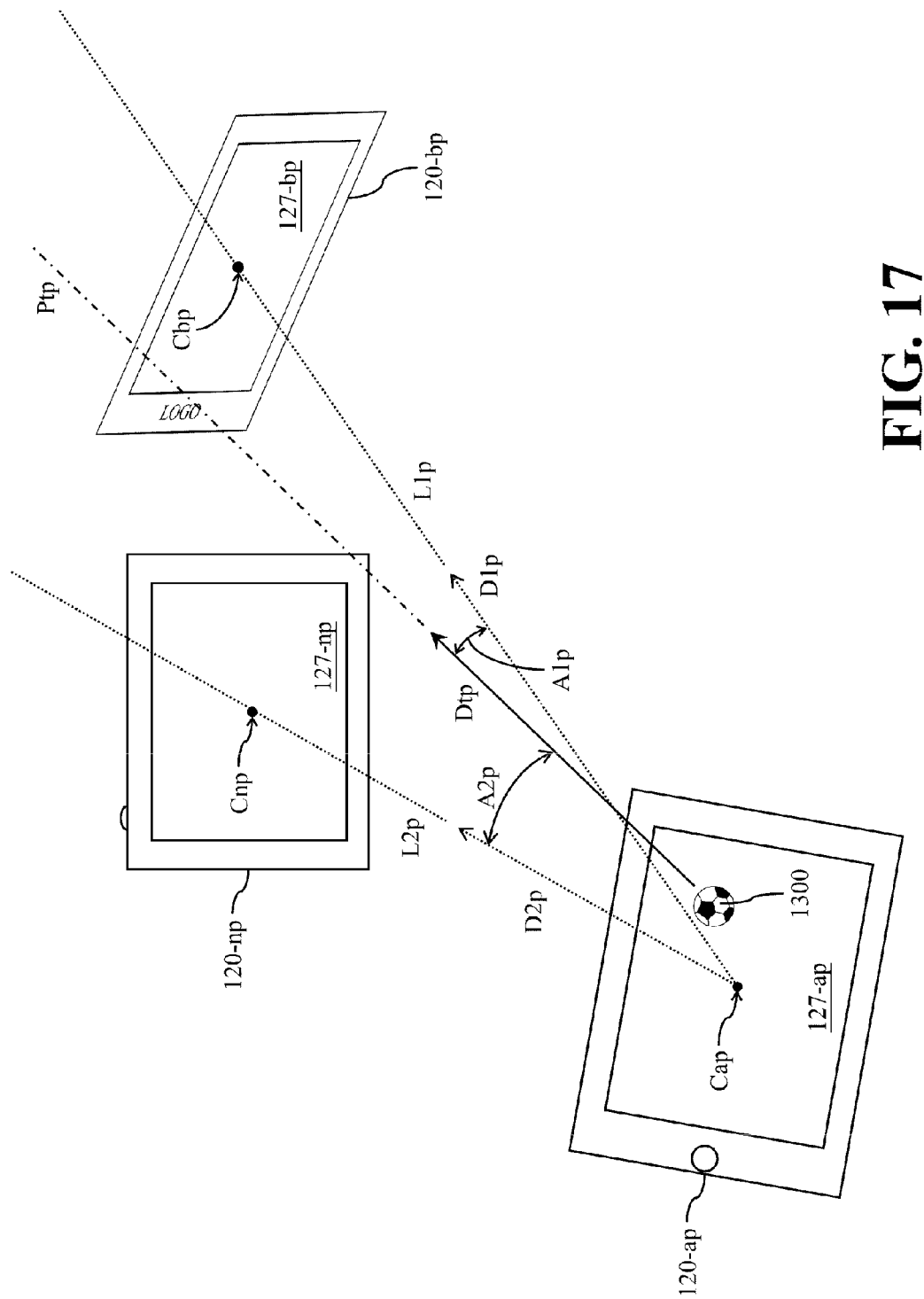

In the pattern of FIG. 17, when the candidate electronic device is the electronic device 120-*b*, the multimedia interaction module 128-*a* selects another electronic device whose projection location is near the target projection path Ptp, such as the electronic device 120-*n*, as a third electronic device. In this situation, the first projection direction is the projection direction D1*p* that points the projection location Cbp of to the centroid Cb of the display 127-*b*, and the projection location Cap of the centroid Ca of the display 127-*a* is the starting point of the first projection direction. The eleventh included angle is the included angle A1*p* between the projection direction D1*p* and the target projection direction Dtp. The second projection direction is the projection direction D2*p* that points to the projection location Cnp of the centroid Cn of the display 127*n*, and the projection location Cap of the centroid Ca of the display 127-*a* is the starting point of the second projection direction. The twelfth included angle is the included angle A2*p* between the projection direction D2*p* and the target projection direction Dtp. The distance between the projection location of the third electronic device 120-*n* and the target projection path Ptp is related to the included angle A2p to some extent. In this embodiment, the smaller the included angle A2p, the closer the projection location of the third electronic device 120-n to the target projection path Ptp. In the pattern of FIG. 17, since the included angle A1p is an acute angle and less than the included angle A2p, it means that the projection location of the electronic device 120-b is closer to the target projection path Ptp than the projection location of the third electronic device 120-n. Accordingly, the multimedia interaction module 128-a determines that the relative position between the location of the candidate electronic device 120-b and the target direction Dt satisfies the predetermined condition in the twenty-seventh embodiment.

In the pattern of FIG. 17, when the candidate electronic device is the electronic device 120-n, the multimedia interaction module 128-a selects another electronic device whose projection location is near the target projection path Ptp, such as the electronic device 120-b, as a third electronic device. In this situation, the first projection direction is the projection direction D2p that points to the projection location Cnp of the centroid Cn of the display 127-n, and the projection location Cap of the centroid Ca of the display 127-a is the starting point of the second projection direction. The eleventh included angle is the included angle A2p between the projection direction D2p and the target projection direction Dtp. The second projection direction is the projection direction D1p that points to the projection location Cbp of the centroid Cb of the display 127b, and the projection location Cap of the centroid Ca of the display 127-a is the starting point of the second projection direction. The twelfth included angle is the included angle A1p between the projection direction D1p and the target projection direction Dtp. In the pattern of FIG. 17, since the included angle A2p is greater than the included angle A1p, it means that the projection location of the third electronic device 120-b is closer to the target projection path Ptp than the projection location of the electronic device 120-n. Accordingly, the multimedia interaction module 128-a determines that the relative position between the location of the candidate electronic device 120-n and the target direction Dt does not satisfy the predetermined condition in the aforementioned twenty-seventh embodiment.

When the multimedia interaction system 100 wants to create a multimedia interaction effect where the target image object or the target command transmitted from the source electronic device 120-a can only be received by a single candidate electronic device whose projection location is closest to the target projection path Ptp, by adopting the configuration of the predetermined condition illustrated in the aforementioned twenty-seventh embodiment the multimedia interaction system 100 is enabled to prevent the target image object from being received by multiple candidate electronic devices, or to prevent similar unexpected results.

In a twenty-eighth embodiment, the aforementioned predetermined condition specifies that a projection of the source electronic device 120-a on the reference horizontal plane is a source projection region 120-ap, a projection of the candidate electronic device on the reference horizontal plane is a candidate projection region, and the candidate projection region is positioned on the target projection path Ptp, wherein a section of the target projection path Ptp between the source projection region 120-ap and the candidate projection region does not contact with projections of other ones of the electronic devices 120-a~120-n on the reference horizontal plane.

In a twenty-ninth embodiment, the aforementioned predetermined condition specifies that a distance between the candidate projection location and the target projection path Ptp is less than the first predetermined value R1, wherein a section of the target projection path Ptp between the source projection region 120-ap and the candidate projection region does not contact with the projections of other ones of the electronic devices 120-a~120-n on the reference horizontal plane.

In a thirtieth embodiment, the aforementioned predetermined condition specifies that the target projection path Ptp passes through a display projection region projected by the candidate display on the reference horizontal plane, wherein a section of the target projection path Ptp between the source projection region 120-ap and the candidate projection region does not contact with the projections of other ones of the electronic devices 120-a~120-n on the reference horizontal plane.

Figure 18:
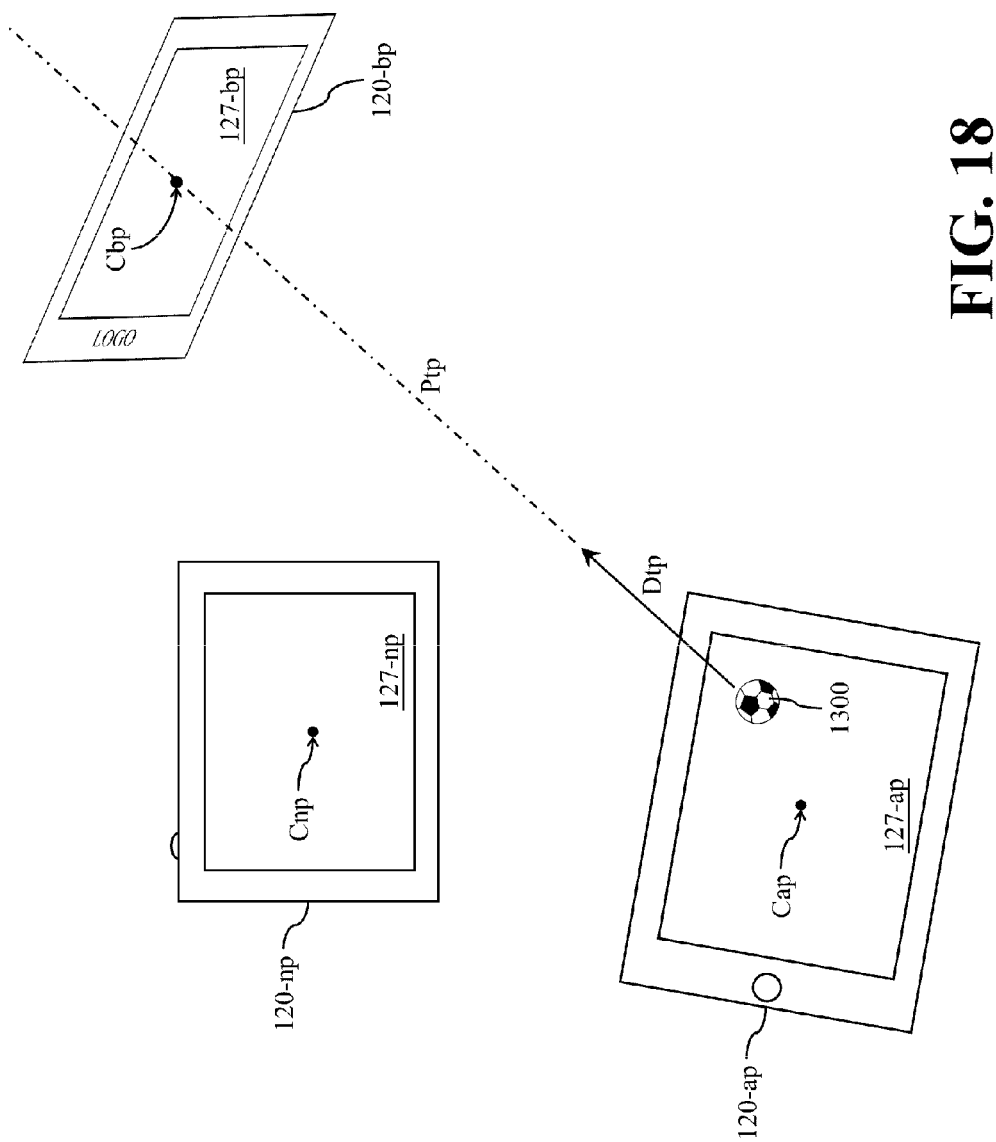

In the pattern of FIG. 18, the projection region 120-bp is projected by the electronic device 120-b on the reference horizontal plane. The target projection path Ptp passes through the projection location Cbp of the centroid Cb of the display 127-b, which means that the projection location Cbp of the electronic device 120-b is positioned on the target projection path Ptp. Therefore, the distance between the projection location Cbp of the electronic device 120-b and the target projection path Ptp is zero. In addition, a section of the target projection path Ptp between the source projection region 120-ap and the projection region 120-bp of the electronic device 120-b does not contact with projections of the other electronic devices. In one aspect, this means that the section between the source electronic device 120-a and the electronic device 120-b is not blocked by other electronic devices.

Accordingly, for the pattern of FIG. 18, when the candidate electronic device is the electronic device 120-b, the multimedia interaction module 128-a determines that the relative position between the location of the candidate electronic device 120-b and the target direction Dt satisfies the predetermined condition in the aforementioned twenty-eighth to thirtieth embodiments.

In compared with FIG. 18, in the pattern of aforementioned FIG. 13, the section of the target projection path Ptp between the source projection region 120-ap and the projection region 120-bp of the electronic device 120-b passes through the projection 127-np of region of the display 127-n of the electronic device 120-n. In one aspect, this means that the section between the source electronic device 120-a and the electronic device 120-b is blocked by the electronic device 120-n.

Accordingly, for the pattern of FIG. 13, when the candidate electronic device is the electronic device 120-b, the multimedia interaction module 128-a determines that the relative position between the location of the candidate electronic device 120-b and the target direction Dt does not satisfy the predetermined condition in the aforementioned twenty-eighth to thirtieth embodiments.

If the relative position between the location of the candidate electronic device and the target direction Dt satisfies the predetermined condition specified in any of the aforementioned twenty-eighth to thirtieth embodiments, it means that the projection location of the candidate electronic device is positioned near the target projection path Ptp to which the target projection direction Dtp points, the distance between the projection location of the candidate electronic device and the target projection path Ptp is within an error tolerance range, and no other electronic device block is positioned between the candidate electronic device and the source electronic device 120-a. Accordingly, when the multimedia interaction system 100 wants to create a multimedia interaction effect where the target image object can be transmitted from the source electronic device 120-a to the candidate electronic device only if no other electronic device is positioned between the candidate electronic device and the source electronic device 120-*a*, by adopting the configuration of the predetermined condition illustrated in any of the aforementioned twenty-eighth to thirtieth embodiments the multimedia interaction system 100 is enabled to prevent the candidate electronic device from receiving the target image object if there is other electronic device blocking between the candidate electronic device and the source electronic device 120-*a*, or to prevent similar unexpected results.

In a thirty-first embodiment, the aforementioned predetermined condition specifies that a thirteen included angle is defined by the aforementioned first projection direction and second projection direction, and the aforementioned eleventh included angle is less than a half of the thirteen included angle.

In a thirty-second embodiment, the aforementioned predetermined condition specifies that a second reference line in which the second projection direction resides divides the reference horizontal plane into a first half region and a second half region, wherein the target projection direction Dtp points to the first half region and the candidate projection location is positioned in the first half region.

Figure 19:
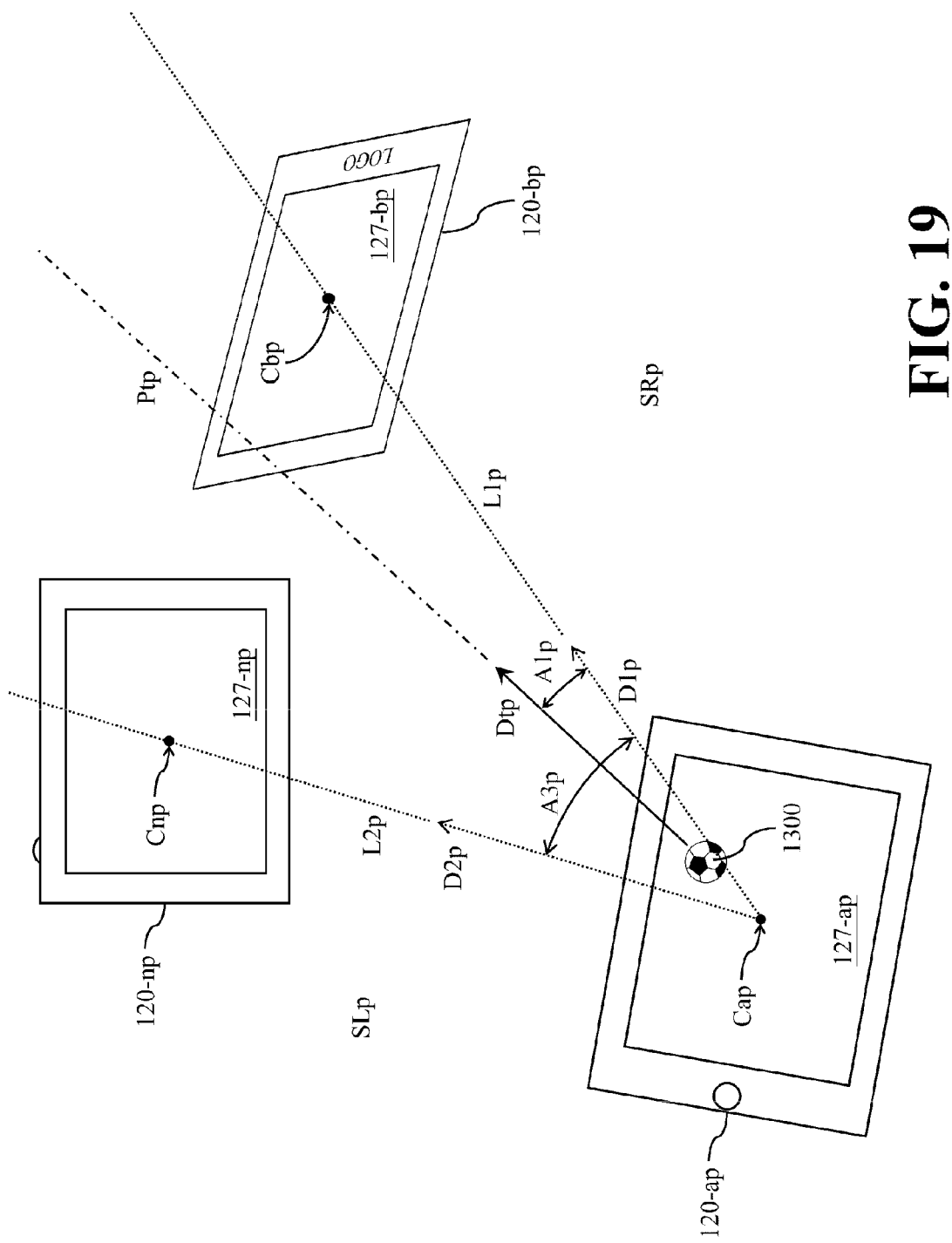

In the pattern of FIG. 19, when the candidate electronic device is the electronic device 120-*b*, the multimedia interaction module 128-*a* selects another electronic device whose projection location is near the target projection path Ptp, such as the electronic device 120-*n*, as a third electronic device. In this situation, the first projection direction is the projection direction Dip that points to the projection location Cbp of the centroid Cb of the display 127-*b*, and the projection location Cap of the centroid Ca of the display 127-*a* is the starting point of the first projection direction. The eleventh included angle is the included angle A1$p$ between the projection direction D1$p$ and the target projection direction Dtp. The second projection direction is the projection direction D2$p$ that points to the projection location Cnp of the centroid Cn of the display 127*n*, and the projection location Cap of the centroid Ca of the display 127-*a* is the starting point of the second projection direction. The thirteen included angle is an included angle A3$p$ between the projection direction D1$p$ and the projection direction D2$p$. If the included angle A1$p$ is less than a half of the thirteen included angle A3$p$, it means that the projection location Cbp of the candidate electronic device 120-*b* is closer to the target projection path Ptp than the projection location Cnp of the third electronic device 120-*n*. In addition, the second reference line is a reference line L2$p$ on which the projection direction D2$p$ resides. The reference line L2$p$ divides the reference horizontal plane into a first half region SRp and a second half region SLp. As shown in FIG. 19, the target projection direction Dtp points to the first half region SRp, and the candidate electronic device 120-*b* is positioned in the first half region SRp. Accordingly, the multimedia interaction module 128-*a* determines that the relative position between the location of the candidate electronic device 120-*b* and the target direction Dt satisfies the predetermined condition in the aforementioned thirty-first and thirty-second embodiments.

When the multimedia interaction system 100 wants to create a multimedia interaction effect where the target image object or the target command transmitted from the source electronic device 120-*a* can only be received by a single candidate electronic device which is closest to the target projection path Ptp to which the target projection direction Dtp points, by adopting the configuration of the predetermined condition illustrated in the aforementioned thirty-first or thirty-second embodiment the multimedia interaction system 100 is enabled to prevent the target image object from being received by multiple candidate electronic devices, or to prevent similar unexpected results.

In a thirty-third embodiment, the aforementioned predetermined condition specifies that a source orientation projection direction Dap projected by a source orientation direction Da of the source electronic device 120-*a* on the reference horizontal plane refers to the source projection location Cap as an axis and rotates the first viewing angle VA1 toward two sides of the axis to define a target viewing angle region, wherein the source orientation projection direction Dap divides the target viewing angle region into a first half region and a second half region, the target projection direction Dtp points to the first half region, and the candidate projection location is positioned in the first half region.

In a thirty-fourth embodiment, the aforementioned predetermined condition specifies that a fourteen included angle is defined by the source orientation projection direction Dap and the target projection direction Dtp, and a fifteen included angle is defined by the aforementioned first projection direction and the source orientation projection direction Dap, wherein the fourteen included angle and the fifteen included angle are both less than the first viewing angle VA1.

Figure 20:
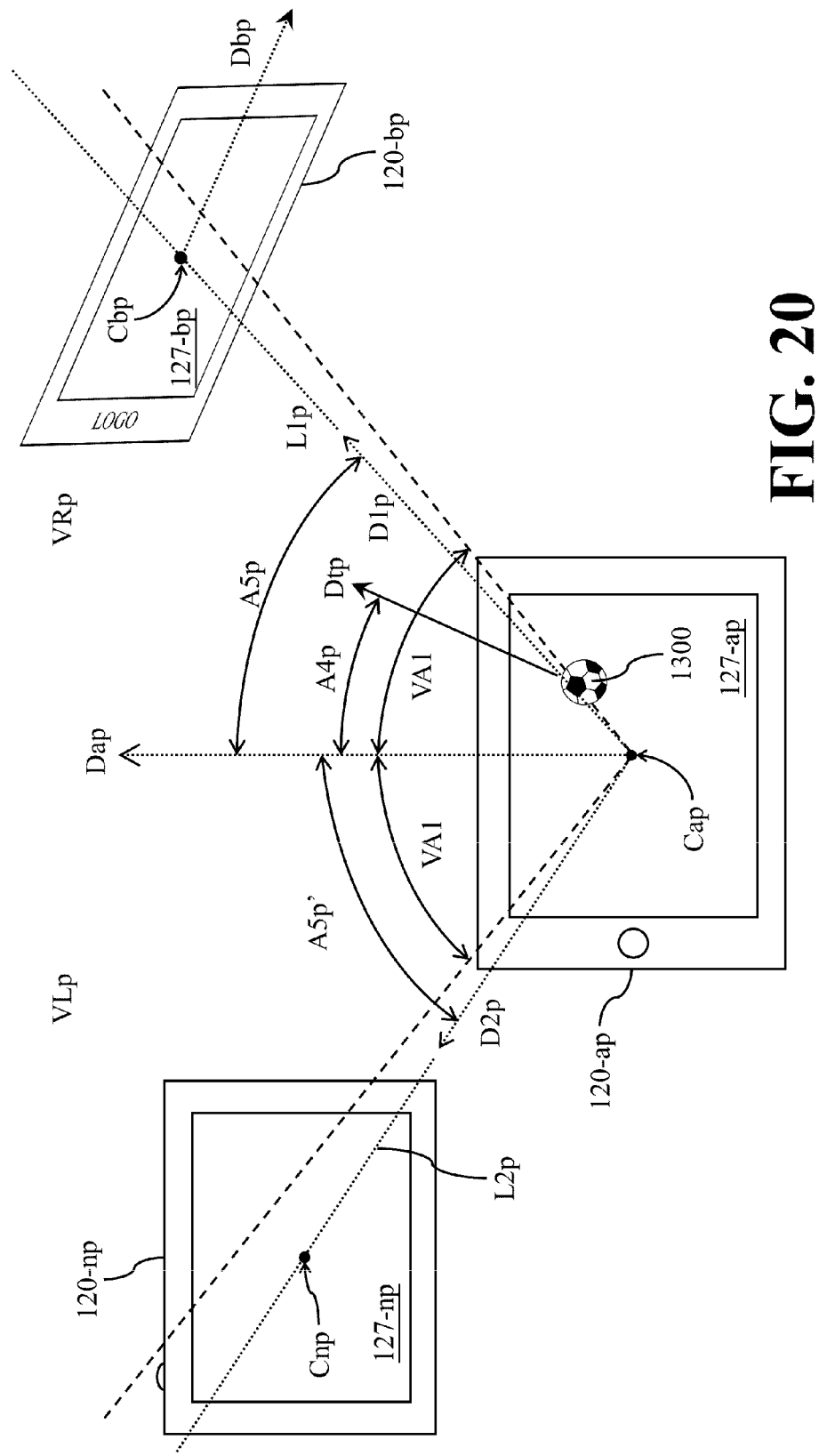

In the pattern of FIG. 20, source orientation projection direction Dap refers to the projection location of the source electronic device 120-*a* (e.g., the projection location Cap of the centroid Ca in this embodiment) as an axis and rotates the first viewing angle VA1 toward two sides of the axis to define a target viewing angle region composed of a right-half region VRp and a left-half region VLp. The projection location Cbp of the centroid Cb of the display 127-*b* is positioned within the right-half region VRp, which means that the projection location of the electronic device 120-*b* is positioned within the right-half region VRp. As shown in FIG. 20, the target projection direction Dtp points to the right-half region VRp. The fourteen included angle is an included angle A4$p$ between the source orientation projection direction Dap and the target projection direction Dtp. If the included angle A4$p$ is less than the first viewing angle VA1, it means that the target projection direction Dtp points to the target viewing angle region of the source electronic device 120-*a*.

For the pattern of FIG. 20, when the candidate electronic device is the electronic device 120-*b*, the first projection direction is the projection direction D1$p$ that points to the projection location Cbp of the centroid Cb of the display 127-*b*, and the projection location Cap of the centroid Ca of the display 127-*a* is the starting point of the first projection direction. The fifteen included angle is an included angle A5$p$ between the projection direction D1$p$ and the source orientation projection direction Dap. Since the included angle A4$p$ and the included angle A5$p$ are both less than the first viewing angle VA1, the multimedia interaction module 128-*a* determines that the relative position between the location of the candidate electronic device 120-*b* and the target direction Dt satisfies the predetermined condition in the aforementioned thirty-third and thirty-fourth embodiments.

As shown in FIG. 20, the projection location Cnp of the centroid Cn of the display 127-*n* is positioned outside the target viewing angle region, which means that the projection location of the electronic device 120-*n* is positioned outside the target viewing angle region.

For the pattern of FIG. 20, when the candidate electronic device is the electronic device 120-*n*, the first projection direction is the projection direction D2$p$ that points to the projection location Cnp of the centroid Cn of the display 127-*n*, and the projection location Cap of the centroid Ca of the display 127-*a* is the starting point of the first projection direction. The fifteen included angle in this case is an included angle A5*p*' between the projection direction D2*p* and the source orientation projection direction Dap. Since the included angle A5*p*' is greater than the first viewing angle VA1, and the electronic device 120-*n* is positioned outside the target viewing angle region, the multimedia interaction module 128-*a* determines that the relative position between the location of the candidate electronic device 120-*n* and the target direction Dt does not satisfy the predetermined condition in the aforementioned thirty-third and thirty-fourth embodiments.

When the multimedia interaction system 100 wants to create a multimedia interaction effect where the target image object or the target command transmitted from the source electronic device 120-*a* can be received by a candidate electronic device only if the projection location of the candidate electronic device is positioned within the target viewing angle region of the source electronic device 120-*a*, by adopting the configuration of the predetermined condition illustrated in the aforementioned thirty-third or thirty-fourth embodiment the multimedia interaction system 100 is enabled to prevent the target image object from being received by other electronic device whose projection location is outside the target viewing angle region of the source electronic device 120-*a*, or to prevent similar unexpected results.

In a thirty-fifth embodiment, the aforementioned predetermined condition specifies that a sixteen included angle is defined by a candidate orientation projection direction projected by the candidate orientation direction of the candidate electronic device on the reference horizontal plane and a first inverse projection direction, the aforementioned fourteen included angle and fifteen included angle are both less than the first viewing angle VA1, and the sixteen included angle is less than the second viewing angle VA2, wherein the candidate projection location is a starting point of the first inverse projection direction, and the first inverse projection direction points to the source projection location Cap.

In a thirty-sixth embodiment, the aforementioned predetermined condition specifies that the candidate orientation projection direction refers to the candidate projection location as an axis and rotates the second viewing angle VA2 toward two sides of the axis to define a candidate viewing angle region, wherein the source projection location Cap is positioned in the candidate viewing angle region, the target projection direction Dtp points to the aforementioned first half region, and the candidate projection location is positioned in the first half region.

When the fifteen included angle is less than the first viewing angle VA1, it means that the candidate electronic device is positioned within the target viewing angle region of the source electronic device 120-*a*. When the sixteen included angle is less than the second viewing angle VA2, it means that the source electronic device 120-*a* is positioned within the candidate viewing angle region of the candidate electronic device.

Figure 21:
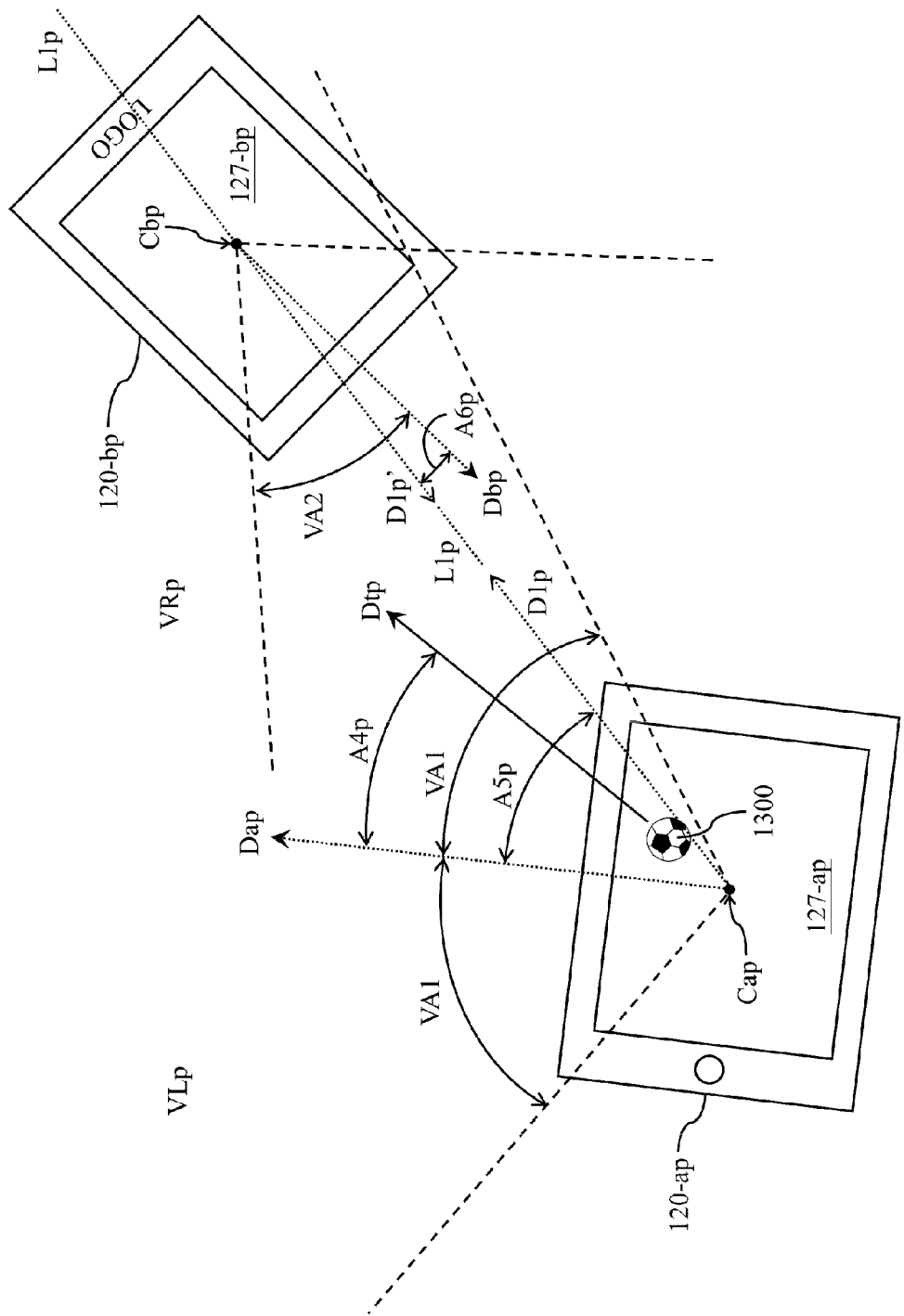

In the pattern of FIG. 21, source orientation projection direction Dap refers to the projection location of the source electronic device 120-*a* (e.g., the projection location Cap of the centroid Ca in this embodiment) as an axis and rotates the first viewing angle VA1 toward two sides of the axis to define the target viewing angle region composed of a right-half region VRp and a left-half region VLp. The projection location Cbp of the centroid Cb of the display 127-*b* is positioned within the right-half region VRp, which means that the projection location of the electronic device 120-*b* is positioned within the right-half region VRp. As shown in FIG. 21, the target projection direction Dtp points to the right-half region VRp. The fourteen included angle is the included angle A4*p* between the source orientation projection direction Dap and the target projection direction Dtp. If the included angle A4*p* is less than the first viewing angle VA1, it means that the target projection direction Dtp points to the target viewing angle region of the source electronic device 120-*a*. When the candidate electronic device is the electronic device 120-*b*, the first projection direction is the projection direction D1*p* that points to the projection location Cbp of the centroid Cb of the display 127-*b*, and the projection location Cap of the centroid Ca of the display 127-*a* is the starting point of the first projection direction. The fifteen included angle is the included angle A5*p* between the projection direction D1*p* and the source orientation projection direction Dap. The multimedia interaction module 128-*a* may shift the projection direction D1*p* so that the projection location of the source electronic device 120-*b* (e.g., the projection location Cbp of the centroid Cb in this embodiment) becomes the starting point of the shifted projection direction D1*p*. The multimedia interaction module 128-*a* then inverses the shifted projection direction D1*p* and utilize the inversed direction as a first inverse projection direction D1*p*'. The sixteen included angle is an included angle A6*p* between the first inverse projection direction D1*p*' and a candidate orientation projection direction Dbp of the candidate electronic device 120-*b*. The candidate orientation projection direction Dbp refers to the projection location Cbp as an axis and rotates the second viewing angle VA2 toward two sides of the axis to define a candidate viewing angle region. As shown in FIG. 21, since the included angle A5*p* is less than the first viewing angle VA1 and the included angle A6*p* is less than the second viewing angle VA2, the multimedia interaction module 128-*a* determines that the relative position between the location of the candidate electronic device 120-*b* and the target direction Dt satisfies the predetermined condition in the aforementioned thirty-fifth and thirty-sixth embodiments.

In the thirty-fifth embodiment, by restricting the fifteen included angle to be less than the first viewing angle VA1 and restricting the sixteen included angle to be less than the second viewing angle VA2, the source electronic device 120-*a* is allowed to transmit the target command to the candidate electronic device 120-*b* only if the relative position between the projection locations of the source electronic device 120-*a* and the candidate electronic device 120-*b* on the reference horizontal plane belongs to or is close to a face-to-face pattern, thereby avoiding strange user experience.

In implementation, the aforementioned first viewing angle VA1 may be the same with the second viewing angle VA2, or may be different from the second viewing angle VA2.

When the multimedia interaction system 100 wants to create a multimedia interaction effect where the target image object or the target command transmitted from the source electronic device 120-*a* can be received by a candidate electronic device only if the relative position between source electronic device 120-*a* and the candidate electronic device 120-*b* belongs to or is close to a face-to-face pattern, by adopting the configuration of the predetermined condition illustrated in the aforementioned thirty-fifth or thirty-sixth embodiment the multimedia interaction system 100 is enabled to prevent the target image object or the target command from being received by the candidate electronic device when the candidate electronic device is back to the source electronic device 120-*a*, or to prevent similar unexpected results. On the other hand, by adopting the configuration of the predetermined condition illustrated in the aforementioned thirty-fifth or thirty-sixth embodiment the multimedia interaction system 100 is enabled to prevent the target image object or the target command from being received by the candidate electronic device when the source electronic device 120-*a* is back to the candidate electronic device, or to prevent similar unexpected results.

As can be appreciated from the foregoing descriptions that the source electronic device 120-*a* transmits the target command corresponding to the target image object to the selected candidate electronic device only if the candidate electronic device's three-dimensional location or two-dimensional location satisfies a specific condition, i.e., the relative position between the candidate electronic device and the target direction satisfies the predetermined condition. In other words, the candidate electronic device is allowed to utilize the corresponding candidate display to perform a multimedia operation corresponding to the target image object according to the target command only if the relative position between the candidate electronic device and the target direction satisfies the predetermined condition. If the relative position between the candidate electronic device and the target direction does not satisfy the predetermined condition, the source electronic device 120-*a* is not allowed to transmit the target command to the selected candidate electronic device, and thus the candidate electronic device would not execute the target command. Apparently, by adopting the multimedia interaction method illustrated in FIG. 3, the multimedia interaction system 100 is capable of effectively reducing multimedia interaction results that do not conform to normal user experiences, multimedia interaction results that are not supposed to occur in the design of the multimedia interaction applications, multimedia interaction results that violate rules configured by the interaction applications, or unexpected multimedia interaction results.

In addition, by utilizing the source electronic device 120-*a* to determine whether the location and orientation of other electronic device satisfies the predetermined condition, the required computing resource for other electronic devices can be effectively reduced, thereby increasing the battery duration of the other electronic devices participating in the multimedia interaction application.

The operations of the multimedia interaction system 100 in accordance with other embodiments will be further described below with reference to FIG. 22.

Figure 22:
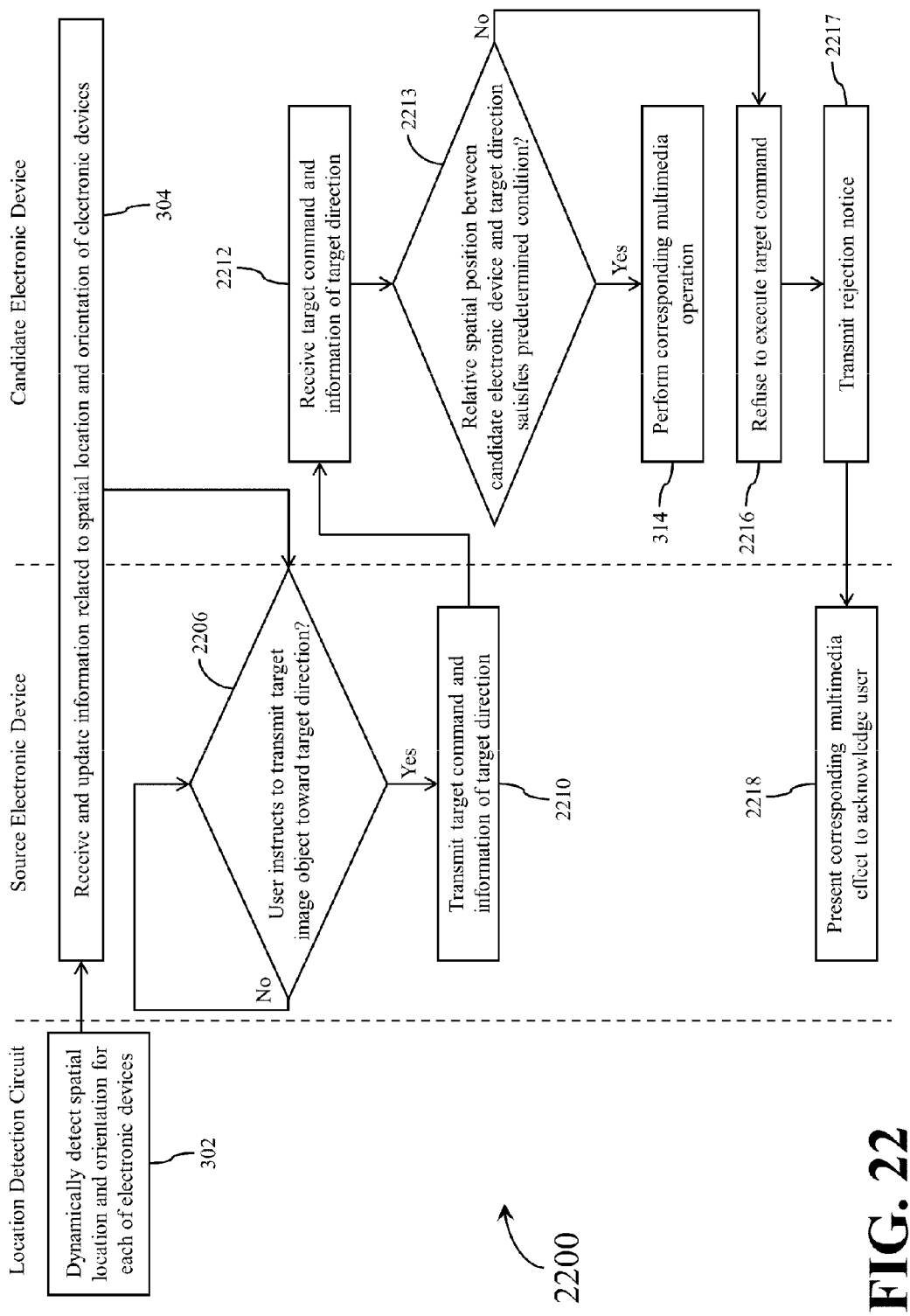
FIGS. 22~23 show simplified flowcharts illustrating multimedia interaction methods according to several embodiment of the present disclosure.

FIG. 22 shows a simplified flowchart 2200 illustrating another multimedia interaction method for the multimedia interaction system 100 according to an embodiment of the present disclosure.

When performing the multimedia interaction method of the flowchart 2200, the control circuit 121 of the electronic device 120 executes the multimedia interaction module 128 to enable the electronic device 120 to perform some or all operations within the corresponding column. For illustrative purpose, it is assumed hereinafter that the source electronic device is the electronic device 120-*a*, and the candidate electronic device may be one of the other electronic devices 120-*b*~120-*n* in order to illustrate the multimedia interaction method of the flowchart 2200.

Operations 302 and 304 in FIG. 22 are the same as the operations 302 and 304 in FIG. 3. Accordingly, the foregoing descriptions regarding the operations, implementations, and related advantages of the operations 302 and 304 in FIG. 3 are also applicable to the embodiment of FIG. 22. For simplicity, the descriptions will not be repeated here.

In the embodiment of FIG. 22, when the user of the source electronic device 120-*a* manipulates the source electronic device 120-*a*, the multimedia interaction module 128-*a* performs an operation 2206 to determine whether the user instructs to transmit a target image object toward a target direction at this time. If the user's manipulation is not related to the target image object, the control circuit 121-*a* performs a corresponding operation according to the user's manipulation.

If the user performs a predetermined manipulation (such as a particular touch control scheme, a particular mouse manipulation, or issuing a particular voice control command) to the source electronic device 120-*a* to instruct the source electronic device 120-*a* to transmit a target image object toward a target direction, the multimedia interaction module 128-*a* performs an operation 2210.

In the operation 2210, the multimedia interaction module 128-*a* utilizes the communication circuit 125-*a* to transmit a target command corresponding to the target image object and information related to the target direction to one or more candidate electronic devices of the other electronic devices 120-*b*~120-*n*. The aforementioned target command may comprise one or more commands utilized by the electronic device 120-*a* to configure, control, change, or adjust the multimedia contents presented on a display of the candidate electronic device (hereinafter, a candidate display). The target command may comprise parameters related to image attributes, such as the shape, size, color, position, lasting time, moving direction, moving speed, or the like of one or more image objects.

For illustrative purpose, it is assumed hereinafter that the source electronic device 120-*a* transmits the target command and information related to the target direction to a candidate electronic device 120-*b* of the electronic devices 120-*b*-120-n in the operation 2210.

In an operation 2212, the multimedia interaction module 128-*b* of the candidate electronic device 120-*b* utilizes the communication circuit 125-*b* to receive the target command and information related to the target direction.

In an operation 2213, the multimedia interaction module 128-*b* determines whether a relative position between the candidate electronic device 120-*b* and the target direction satisfies a predetermined condition according to the latest information related to a spatial location and an orientation of the candidate electronic device 120-*b*. If the relative position between the candidate electronic device 120-*b* and the target direction satisfies a predetermined condition, the multimedia interaction module 128-*b* proceeds to an operation 314. On the contrary, if the relative position between the candidate electronic device 120-*b* and the target direction does not satisfy the predetermined condition, the multimedia interaction module 128-*b* proceeds to an operation 2216.

The operation 2213 of the multimedia interaction module 128-*b* is the same as the operation 308 of FIG. 3 performed by the multimedia interaction module 128-*a*. In addition, the operation 314 in FIG. 22 is also the same as the operation 314 in FIG. 3. Accordingly, the foregoing descriptions regarding the operations, implementations, and related advantages of the operations 308 and 314 in FIG. 3 are also applicable to the operations 2213 and 314 in embodiment of FIG. 22. For simplicity, the descriptions will not be repeated here.

In the operation 2216, the multimedia interaction module 128-*b* refuses to execute the received target command.

In an operation 2217, the multimedia interaction module 128-*b* utilizes the communication circuit 125-*b* to transmit a rejection notice to the source electronic device 120-*a*.

When the source electronic device 120-*a* received the rejection notice transmitted from the candidate electronic device 120-*b*, the source electronic device 120-*a* performs an operation 2218.

In the operation 2218, the multimedia interaction module 128-*a* may utilize the display 127-*a* (hereinafter, a source display), the speaker, the luminance circuit, the vibrator, or the like of the source electronic device 120-*a* to present a corresponding multimedia effect indicating that the candidate electronic device 120-*b* refused to execute the target command. For example, the multimedia interaction module 128-*a* may control the display 127-*a* to present an animation effect showing that the target image object collides with an edge of the display 127-*a* and then rebounds. The multimedia interaction module 128-*a* may control the speaker to produce a particular sound effect. The multimedia interaction module 128-*a* may control the vibrator to perform a particular vibration mode. The multimedia interaction module 128-*a* may control the luminance circuit (such as a LED or a flashlight) to present a particular vision effect. The multimedia interaction module 128-*a* may utilize various combination of the aforementioned devices to present particular multimedia effect in order to acknowledge the user that the candidate electronic device 120-*b* does not perform corresponding multimedia operation according to the target command, i.e., a particular multimedia interaction expected by the user is not achieved.

As can be appreciated from the foregoing descriptions that the candidate electronic device 120-*b* utilizes the corresponding candidate display to perform a multimedia operation corresponding to the target image object according to the received target command only if the relative position between the candidate electronic device and the target direction satisfies the predetermined condition. If the candidate electronic device 120-*b* determines that the relative position between the candidate electronic device and the target direction does not satisfy the predetermined condition, the candidate electronic device 120-*b* refuses to execute the target command, and thus the multimedia operation corresponding to the target image object will not be performed. Similarly, if other candidate electronic device that has received the target command determines that the relative position between itself and the target direction does not satisfy the predetermined condition, the candidate electronic device refuses to execute the target command as well. Accordingly, by adopting the multimedia interaction method illustrated in FIG. 22, the multimedia interaction system 100 is also capable of effectively reducing multimedia interaction results that do not conform to normal user experiences, multimedia interaction results that are not supposed to occur in the design of the multimedia interaction applications, multimedia interaction results that violate rules configured by the interaction applications, or unexpected multimedia interaction results.

In addition, since the determination of the predetermined condition is carried out by respective candidate electronic devices participating in the multimedia interaction application in the embodiment of FIG. 22, the required computing resource for the source electronic device 120-*a* can be effectively reduced, thereby increasing the battery duration of the source electronic device 120-*a*.

The operations of the multimedia interaction system 100 in accordance with other embodiments will be further described below with reference to FIG. 23.

Figure 23:
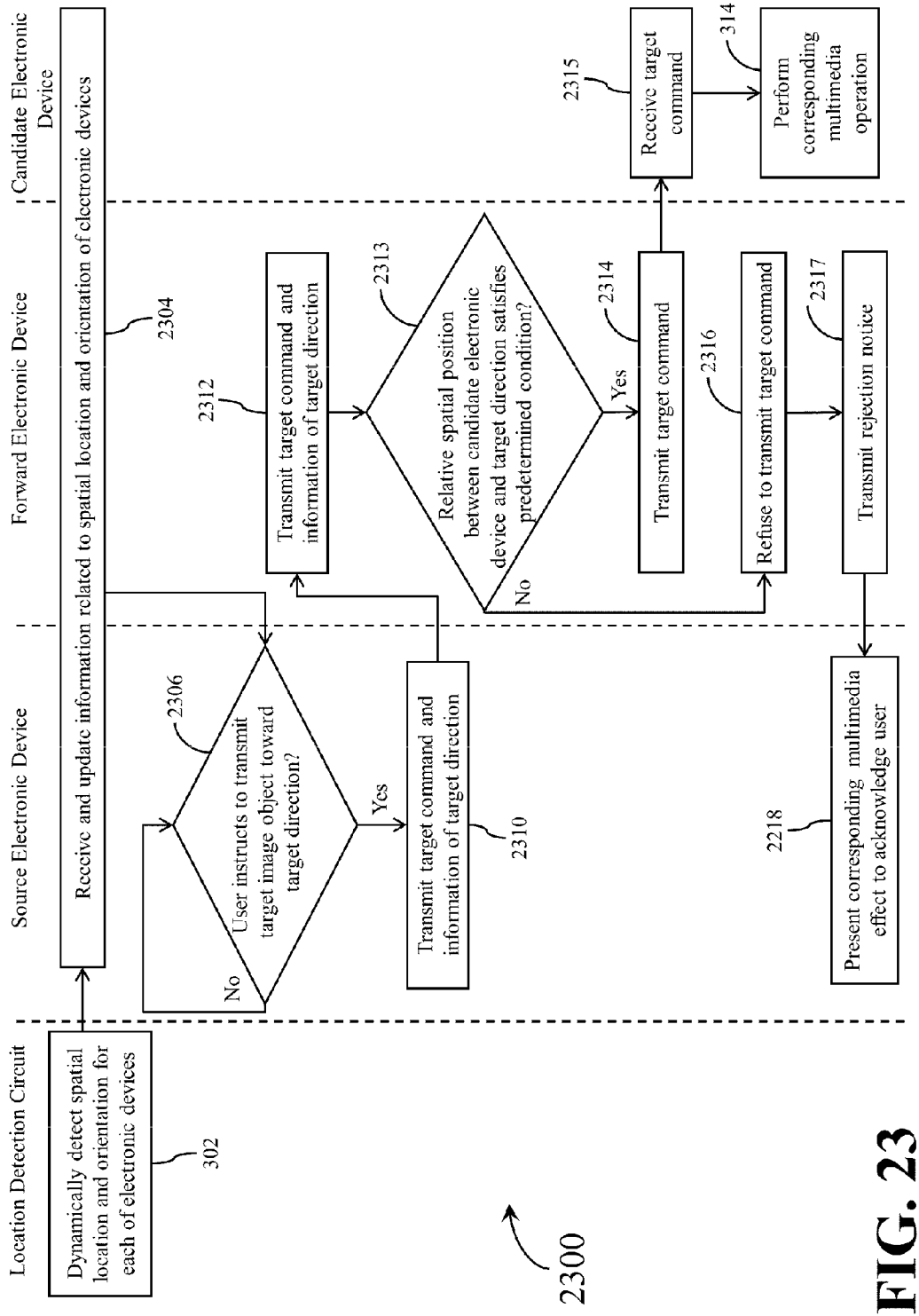

FIG. 23 shows a simplified flowchart 2300 illustrating another multimedia interaction method for the multimedia interaction system 100 according to an embodiment of the present disclosure. In this embodiment, the multimedia interaction system 100 may dynamically assign one of the electronic devices 120-*a*~120-*n* as a forwarding electronic device. The forwarding electronic device is utilized as a command-transmitting medium among the electronic devices 120-*a*~120-*n*, so that the electronic devices 120-*a*~120-*n* are able to transmit multimedia interaction commands with each other through the forwarding electronic device instead of through a remote central server (not shown). In this way, the transmission efficiency and transmission speed of the multimedia interaction commands among the electronic devices 120-*a*~120-*n* can be improved.

In the flowchart 2300, operations within a column under the label "forwarding electronic device" are operations to be performed by the electronic device 120 that is assigned as the forwarding electronic device.

When performing the multimedia interaction method of the flowchart 2300, the control circuit 121 of the electronic device 120 executes the multimedia interaction module 128 to enable the electronic device 120 to perform some or all operations within the corresponding column. For illustrative purpose, it is assumed hereinafter that the source electronic device is the electronic device 120-*a*, the forwarding electronic device is the electronic device 120-*n*, and the candidate electronic device may be one of the electronic devices 120-*b*~120-*n* in order to illustrate the multimedia interaction method of the flowchart 2300.

The operation 302 in FIG. 23 is the same as the operation 302 in FIG. 3. Accordingly, the foregoing descriptions regarding the operations, implementations, and related advantages of the operation 302 in FIG. 3 are also applicable to the embodiment of FIG. 23. For simplicity, the descriptions will not be repeated here.

In an operation 2304, the multimedia interaction module 128 of each electronic device 120 may utilize the communication circuit 125 to dynamically receive information related to the spatial location and the orientation for the electronic device 120 from the location detection circuit 110 through a wireless transmission approach, and record the received information. In addition, the multimedia interaction module 128-*n* of the forwarding electronic device 120-*n* may utilize the communication circuit 125-*n* to dynamically receive information related to the spatial location and the orientation for other electronic devices 120-*a*~120-*m* from the location detection circuit 110 or the electronic devices 120-*a*~120-*m*, and record the received information. The forwarding electronic device 120-*n* may periodically or intermittently perform the aforementioned operation 2304 to dynamically receive the latest information generated by the location detection circuit 110 or other electronic devices 120-*a*~120-*m*, and then update the record related to the spatial locations and the orientations of respective electronic devices.

In the embodiment of FIG. 23, when the user of the source electronic device 120-*a* manipulates the source electronic device 120-*a*, the multimedia interaction module 128-*a* performs an operation 2306 to determine whether the user instructs to transmit a target image object toward a target direction at this time. If the user's manipulation is not related to the target image object, the control circuit 121-*a* performs a corresponding operation according to the user's manipulation.

If the user performs a predetermined manipulation (such as a particular touch control scheme, a particular mouse manipulation, or issuing a particular voice control command) to the source electronic device 120-*a* to instruct the source electronic device 120-*a* to transmit a target image object toward a target direction, the multimedia interaction module 128-*a* performs an operation 2310.

In the operation 2310, the multimedia interaction module 128-*a* utilizes the communication circuit 125-*a* to transmit a target command corresponding to the target image object and information related to the target direction to the forwarding electronic device 120-*n*. The aforementioned target command may comprise one or more commands utilized by the electronic device 120-*a* to configure, control, change, or adjust the multimedia contents presented on a display of the candidate electronic device (hereinafter, a candidate display). The target command may comprise parameters related to image attributes, such as the shape, size, color, position, lasting time, moving direction, moving speed, or the like of one or more image objects.

In an operation 2312, the multimedia interaction module 128-*n* of the forwarding electronic device 120-*n* utilizes the communication circuit 125-*n* to receive the target command and information related to the target direction.

In an operation 2313, the multimedia interaction module 128-*n* may sequentially select one of the electronic devices 120-*b*~120-*n* as a candidate electronic device, and then determine whether a relative position between the selected candidate electronic device and the target direction satisfies a predetermined condition according to the latest information related to a spatial location and an orientation of the selected candidate electronic device. If the relative position between the selected candidate electronic device and the target direction satisfies the predetermined condition, the multimedia interaction module 128-*n* performs an operation 2314. On the contrary, if the relative position between the selected candidate electronic device and the target direction does not satisfy the predetermined condition, the multimedia interaction module 128-*n* performs an operation 2316.

The operation 2313 of the multimedia interaction module 128-*n* is the same as the operation 308 of FIG. 3 performed by the multimedia interaction module 128-*a*. Accordingly, the foregoing descriptions regarding the operations, implementations, and related advantages of the operation 308 in FIG. 3 are also applicable to the operation 2313 in embodiment of FIG. 23. For simplicity, the descriptions will not be repeated here.

In the operation 2314, the multimedia interaction module 128-*n* utilizes the communication circuit 125-*n* to transmit the target command corresponding to the target image object to a candidate electronic device that satisfies the predetermined condition.

In an operation 2315, the multimedia interaction module of the candidate electronic device utilizes the communication circuit of the candidate electronic device to receive the target command, and proceeds to an operation 314. The operation 314 of FIG. 23 is the same as the operation 314 of FIG. 3. Accordingly, the foregoing descriptions regarding the operations, implementations, and related advantages of the operation 314 in FIG. 3 are also applicable to the operation 314 in FIG. 23. For simplicity, the descriptions will not be repeated here.

In the operation 2316, the multimedia interaction module 128-*n* refuses to transmit the target command to the candidate electronic device.

In an operation 2317, the multimedia interaction module 128-*n* utilizes the communication circuit 125-*n* to transmit a rejection notice to the source electronic device 120-*a*.

When the source electronic device 120-*a* received the rejection notice transmitted from the forwarding electronic device 120-*n*, the source electronic device 120-*a* performs an operation 2218. The operation 2218 of FIG. 23 is the same as the operation 2218 of FIG. 22. Accordingly, the foregoing descriptions regarding the operations, implementations, and related advantages of the operation 2218 in FIG. 22 are also applicable to the operation 2218 in FIG. 23. For simplicity, the descriptions will not be repeated here.

As can be seen from the aforementioned descriptions, only if the relative position between the target direction and the selected candidate electronic device satisfies the predetermined condition, the forwarding electronic device 120-*n* forwards the target command transmitted from the source electronic device 120-*a* to the selected candidate electronic device, so that the candidate electronic device utilizes the corresponding candidate display to perform the multimedia operation corresponding to the target image object according to the target command. If the relative position between the target direction and the candidate electronic device does not satisfy the predetermined condition, the forwarding electronic device 120-*n* would not transmit the target command to the candidate electronic device, and thus the candidate electronic device would not execute the target command. Similarly, the forwarding electronic device 120-*n* would not transmit the target command to other electronic devices that do not satisfy the predetermined condition to prevent the electronic devices that do not satisfy the predetermined condition from performing the multimedia operation corresponding to the target image object. In other words, by adopting the multimedia interaction method of FIG. 23 the multimedia interaction system 100 is enabled to effectively prevent strange or unreasonable multimedia interaction results from occurring.

In addition, by utilizing the forwarding electronic device 120-*n* to determine whether the location and orientation of other electronic device satisfies the predetermined condition, the required computing resource for other electronic devices can be effectively reduced, thereby increasing the battery duration of the other electronic devices participating in the multimedia interaction application. Accordingly, the multimedia interaction system 100 may assign an electronic device having most remaining battery power or coupled with a traditional electricity network as the forwarding electronic device.

In implementations, various combinations of the aforementioned criteria specified in the predetermined condition of different embodiments may be adopted based on the design purpose of the multimedia interaction applications, so as to enable the multimedia interaction system 100 to have more powerful determining capability in determining the relative position among different electronic devices, thereby providing rich and more diversified user experience. For example, the criteria specified in the predetermined condition of the nineteenth or twentieth embodiment may be combined with the criteria specified in the predetermined condition of any of the first to the eighteenth embodiments. The criteria specified in the predetermined condition of the thirty-fifth or thirty-sixth embodiment may be combined with the criteria specified in the predetermined condition of any of the twenty-first to the thirty-fourth embodiments. The criteria specified in the predetermined condition of the seventeenth or eighteenth embodiment may be combined with the criteria specified in the predetermined condition of any of the first to the sixteenth embodiments. The criteria specified in the predetermined condition of the thirty-third or thirty-fourth embodiment may be combined with the criteria specified in the predetermined condition of any of the twenty-first to the thirty-second embodiments.

The aforementioned forwarding electronic device may be utilized to be not only the transmitting medium of multimedia interaction commands among the electronic devices 120-*a*~120-*n*, but also the transmitting medium of information related to spatial locations and orientations among the electronic devices 120-*a*~120-*n*. For example, in the embodiment of FIG. 3 or FIG. 22, if an unspecified electronic device is assigned as the forwarding electronic device by the multimedia interaction system 100, the forwarding electronic device may dynamically receive information related to the spatial location and the orientation for the other electronic devices from the location detection circuit 110 or the electronic devices, and record the received information. Then, each electronic device may dynamically receive information related to the spatial location and the orientation for the other electronic devices from the forwarding electronic device, and record the received information, thereby simplifying the propagation of information related to the spatial location and the orientation of respective electronic devices among all electronic devices.

In addition, some multimedia data, such as background images, initial image objects, animations, or parameters for generating above multimedia data required for the electronic device 120 during conducting the interaction operations regarding multimedia contents, may be provided by the source electronic device that generates the multimedia interaction command or provided by other multimedia servers (not shown).

Furthermore, each electronic device 120 may display the relative position among some or all of the electronic devices 120-*a*~120-*n* on a partial region of its own display, and display an animation related to a motion of the target image object on the partial region. In this way, the electronic device 120 is enabled to provide more related multimedia information to the user when participating in the multimedia interaction application, thereby offering more multimedia interaction experience to the user.

Figure 24:
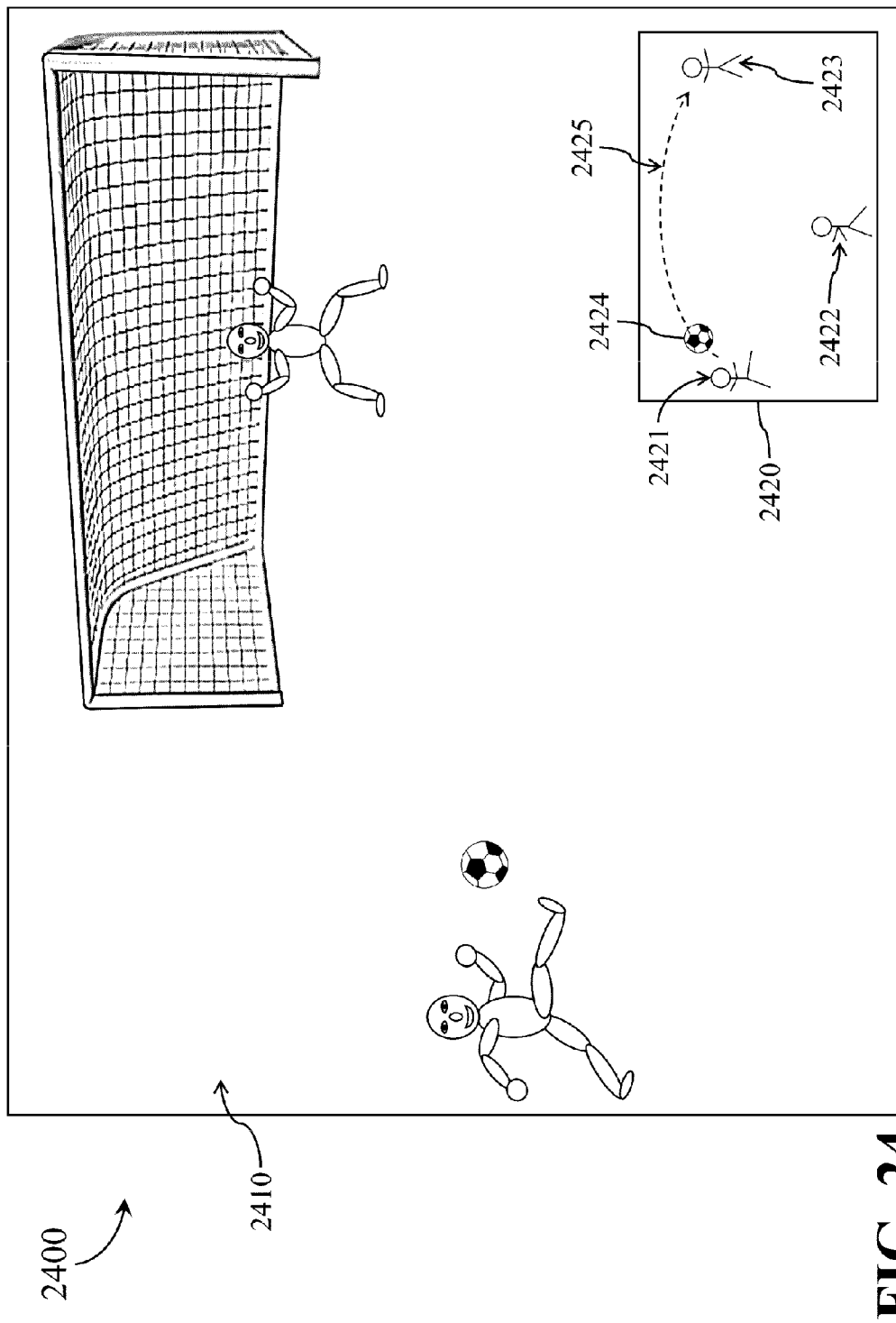
FIG. 24 shows a simplified schematic diagram of a multimedia interaction screen according to an embodiment of the present disclosure.

In implementation, the electronic device 120 participating in the multimedia interaction may utilize the display 127 to display related image content of the multimedia interaction, such as a multimedia interaction screen 2400 shown in FIG. 24. As shown in FIG. 24, the multimedia interaction screen 2400 comprises a main screen 2410 displayed on a main region of the display 127, and a miniature screen 2420 displayed on a partial region of the display 127. The electronic device 120 may display the relative position among some or all of the electronic devices 120-*a*~120-*n* on the miniature screen 2420, and display an animation related to the motion of the target image object 400 on the miniature screen 2420. For example, the relative position among portraits 2421, 2422, and 2423 shown on the miniature screen 2420 may represent the relative position among three electronic devices 120 participating in the multimedia interaction, or may represent the relative position among the users of three electronic devices 120. The location of an image object 2424 shown in miniature screen 2420 may be utilized to represent the location of the aforementioned target image object 400. A trace line 2425 shown in the miniature screen 2420 may be utilized to represent a motion trace or a predicted motion trace of the target image object 400.

The target image object 400 is merely a computer image created by the multimedia interaction application program after all, and the user is not able to actually perceive a physical object corresponding to the target image object 400 in the air with the human eyes. Hence, it is difficult for the user to clearly sense the motion trace of the target image object 400 in the virtual space. By displaying the image object 2424 and related trace line 2425 corresponding to the target image object 400 on the miniature screen 2420, the electronic device 120 is capable of providing a multimedia interaction experience similar to the augmented reality to the user. The user of the electronic device 120 may decide whether to move himself/herself, to move the electronic device 120, or to adjust the orientation of the electronic device 120 by referencing to the content shown in the miniature screen 2420, thereby changing the relative position between himself/herself (or the electronic device 120) and other electronic devices to create more fun when participating in the multimedia interaction applications.

In practical applications, the miniature screen 2420 displayed on the display 127 may be utilized as a user control interface, so that the multimedia interaction module 128 may compute the aforementioned target direction Dt according to the user's manipulation to the displaying region of the miniature screen 2420. For example, when the user clicks on a particular portrait shown on the miniature screen 2420, the multimedia interaction module 128 may compute a target direction corresponding to the particular portrait, and then attempt to transmit a target image object that is predetermined or selected by the user toward the target direction by using the aforementioned method. In another embodiment, when the user drags a target image object from an initial position in the miniature screen 2420 to a target portrait shown on the miniature screen 2420, the multimedia interaction module 128 may compute a target direction defined by the initial position and the target portrait, and then attempt to transmit the target image object toward the target direction by using the aforementioned method.

In one aspect, the multimedia interaction system 100 and related multimedia interaction methods determines the rationality of the relative position between different electronic devices, and decides whether to transmit a multimedia interaction command to a particular electronic device, or decides whether the particular electronic device is allowed to execute a received multimedia interaction command. As a result, multimedia interaction results that do not conform to normal user experiences, multimedia interaction results that are not supposed to occur in the design of the multimedia interaction applications, multimedia interaction results that violate rules configured by the interaction applications, or unexpected multimedia interaction results can be effectively prevented from occurring among the source electronic device of multimedia interaction commands and other electronic devices.

In another aspect, the multimedia interaction system 100 and related multimedia interaction methods filter or block out multimedia interaction commands that may lead to multimedia interaction results that do not conform to normal user experiences, multimedia interaction results that are not supposed to occur in the design of the multimedia interaction applications, multimedia interaction results that violate rules configured by the interaction applications, or unexpected multimedia interaction results to occur in the multimedia interaction system, so as to ensure that the multimedia interaction behaviors in the multimedia interaction system can conform to the original design purpose of the multimedia interaction applications. As a result, the user experiences delivered by the multimedia interaction system 100 can be greatly improved.

Accordingly, the disclosed multimedia interaction system 100, related methods, and computer program products offer significant benefits to the development for various cross-device multimedia interaction applications.

In the drawings, the size and relative sizes of some elements may be exaggerated or simplified for clarity. Accordingly, unless the context clearly specifies, the shape, size, relative size, and relative position of each element in the drawings are illustrated merely for clarity, and not intended to be used to restrict the claim scope.

The same reference numbers may be used throughout the drawings to refer to the same or like parts, components, or operations. Certain terms are used throughout the description and the claims to refer to particular components. One skilled in the art appreciates that a component may be referred to as different names. This disclosure does not intend to distinguish between components that differ in name but not in function. In the description and in the claims, the term "comprise" is used in an open-ended fashion, and thus should be interpreted to mean "include, but not limited to . . . " Also, the phrase "coupled with" is intended to compass any indirect or direct connection. Accordingly, if this disclosure mentioned that a first device is coupled with a second device, it means that the first device may be directly or indirectly connected to the second device through electrical connections, wireless communications, optical communications, or other signal connections with/without other intermediate devices or connection means.

The term "and/or" may comprise any and all combinations of one or more of the associated listed items. In addition, the singular forms "a", "an", and "the" herein are intended to comprise the plural forms as well, unless the context clearly indicates otherwise.

Other embodiments of the invention will be apparent to those skilled in the art from consideration of the specification and practice of the invention disclosed herein. It is intended that the specification and examples be considered as exemplary only, with a true scope and spirit of the invention indicated by the following claims.

What is claimed is:

1. A multimedia interaction system having multiple displays, comprising:
    a plurality of electronic devices;
    a plurality of displays, respectively arranged on the electronic devices; and
    a location detection circuit, configured to dynamically detect a spatial location and an orientation for each of the electronic devices, and configured to transmit information related to detection results to at least one of the electronic devices through a wireless communication approach;
    wherein when a user instructs a source electronic device of the electronic devices to transmit a target image object toward a target direction, the source electronic device transmits information of the target direction and a target command corresponding to the target image object to a candidate electronic device of the other electronic devices, the candidate electronic device determines whether a relative position between the candidate electronic device and the target direction satisfies a predetermined condition, and only if the relative position between the candidate electronic device and the target direction satisfies the predetermined condition, the candidate electronic device utilizes a corresponding candidate display to perform a multimedia operation corresponding to the target image object according to the target command;
    wherein the location detection circuit detects and transmits spatial coordinates of multiple transmitting-end reference points of the source electronic device to the source electronic device, and the location detection circuit detects and transmits spatial coordinates of multiple receiving-end reference points of the candidate electronic device to the candidate electronic device;
    wherein the source electronic device computes a central location of a first multimedia interaction program window displayed on the source display according to the spatial coordinates of the transmitting-end reference points to represent a spatial location of the source electronic device, and the candidate electronic device computes a central location of a second multimedia interaction program window displayed on the candidate display according to the spatial coordinates of the receiving-end reference points to represent a spatial location of the candidate electronic device.

2. The multimedia interaction system of claim 1, wherein the predetermined condition comprises at least one of the following conditions:
    the candidate electronic device is positioned in a pillar region to which the target direction pointed, wherein the target direction is an axis of the pillar region and a radius of the pillar region is a first predetermined value;
    the candidate electronic device is positioned in a pyramidal or cone region to which the target direction pointed, wherein the target direction is an axis of the pyramidal or cone region, a location of the target image object is an apex of the pyramidal or cone region, and a vertex angle of the pyramidal or cone region is an acute angle;
    the target direction is parallel to a target shifted direction, a first included angle between the target shifted direction and a first direction is an acute angle, and the first included angle is less than a threshold angle, wherein a location of the source electronic device is a starting point of both the target shifted direction and the first direction, and the first direction points to a location of the candidate electronic device;
    a second included angle between the target shifted direction and a second direction is an acute angle and the first included angle is less than the second included angle, wherein the location of the source electronic device is a starting point of the second direction and the second direction points to a location of a third electronic device of the electronic devices;
    the candidate electronic device is positioned on a target path to which the target direction points, and a section of the target path between the source electronic device and the candidate electronic device does not contact with other electronic devices of the electronic devices;
    a distance between the location of the candidate electronic device and the target path is less than the first predetermined value, and a section of the target path between the source electronic device and the candidate electronic device does not contact with other electronic devices of the electronic devices;
    the target path passes through the candidate display, and a section of the target path between the source electronic device and the candidate electronic device does not contact with other electronic devices of the electronic devices;
    the candidate electronic device is positioned on a target vertical plane in which the target path resides, and a section of the target vertical plane between the source electronic device and the candidate electronic device does not contact with other electronic devices of the electronic devices;
    a distance between the location of the candidate electronic device and the target vertical plane is less than the first predetermined value, and a section of the target vertical plane between the source electronic device and the candidate electronic device does not contact with other electronic devices of the electronic devices;
    the candidate electronic device is positioned on the target path;
    the distance between the location of the candidate electronic device and the target path is less than the first predetermined value;
    the target path passes through the candidate display;
    the candidate electronic device is positioned on the target vertical plane;
    the distance between the location of the candidate electronic device and the target vertical plane is less than the first predetermined value;

a third included angle is defined by the first direction and the second direction, and the first included angle is less than a half of the third included angle;

a second vertical plane in which the second direction resides divides a space into a first half space and a second half space, wherein the target direction points to the first half space and the candidate electronic device is positioned in the first half space;

a source vertical plane in which a source orientation direction of the source electronic device resides refers to the location of the source electronic device as an axis and rotates a first viewing angle toward two sides of the axis to define a target viewing angle region, wherein the source vertical plane divides the target viewing angle region into a first half region and a second half region, the target direction points to the first half region, and the candidate electronic device is positioned in the first half region;

a fourth included angle is defined by the source orientation direction and the target shifted direction, a fifth included angle is defined by the first direction and the source orientation direction, and the fourth included angle and the fifth included angle are both less than the first viewing angle;

a sixth included angle is defined by a candidate orientation direction of the candidate electronic device and a first inverse direction, the fourth included angle and the fifth included angle are both less than the first viewing angle, and the sixth included angle is less than a second viewing angle, wherein the location of the candidate electronic device is a starting point of the first inverse direction, and points to the location of the source electronic device; and a candidate vertical plane in which the candidate orientation direction resides refers to the location of the candidate electronic device as an axis and rotates the second viewing angle toward two sides of the axis to define a candidate viewing angle region, wherein the source electronic device is positioned in the candidate viewing angle region, the target direction points to the first half region, and the candidate electronic device is positioned in the first half region.

3. The multimedia interaction system of claim 2, wherein the location detection circuit is positioned higher than the source electronic device, the candidate electronic device, and the third electronic device, and the first viewing angle is equal to the second viewing angle.

4. The multimedia interaction system of claim 1, wherein the location detection circuit detects a projection location and an orientation on a same reference horizontal plane for each of the electronic devices, and the predetermined condition comprises at least one of the following conditions:

a target projection direction projected by the target direction on the reference horizontal plane points to a target projection path and a strip region, and a candidate projection location projected by the candidate electronic device on the reference horizontal plane is positioned in the strip region, wherein the target projection path is a central line of the strip region, and a width of the strip region is two times of a first predetermined value;

the target projection direction points to a triangle region, and the candidate projection location is positioned in the triangle region, wherein the target projection path is a central line of the triangle region, a projection location projected by the target image object on the reference horizontal plane is an apex of the triangle region, and a vertex angle of the triangle region is an acute angle;

an eleventh included angle between the target projection direction and a first projection direction is an acute angle and less than a threshold angle, wherein a source projection location projected by the source electronic device on the reference horizontal plane is a starting point of the first projection direction, and the first projection direction points to the candidate projection location;

a twelfth included angle between the target projection direction and a second projection direction is an acute angle, and the eleventh included angle is less than the twelfth included angle, wherein the source projection location is a starting point of the second projection direction, and the second projection direction points to a third projection location projected by a third electronic device of the electronic devices on the reference horizontal plane;

a projection of the source electronic device on the reference horizontal plane is a source projection region, a projection of the candidate electronic device on the reference horizontal plane is a candidate projection region, and the candidate projection region is positioned on the target projection path, wherein a section of the target projection path between the source projection region and the candidate projection region does not contact with projections of other ones of the electronic devices on the reference horizontal plane;

a distance between the candidate projection location and the target projection path is less than the first predetermined value, wherein a section of the target projection path between the source projection region and the candidate projection region does not contact with the projections of other ones of the electronic devices on the reference horizontal plane;

the target projection path passes through a display projection region projected by the candidate display on the reference horizontal plane, wherein a section of the target projection path between the source projection region and the candidate projection region does not contact with the projections of other ones of the electronic devices on the reference horizontal plane;

the candidate projection location is positioned on the target projection path;

the distance between the candidate projection location and the target projection path is less than the first predetermined value;

the target projection path passes through the display projection region;

a thirteen included angle is defined by the first projection direction and the second projection direction, and the eleventh included angle is less than a half of the thirteen included angle;

a second reference line in which the second projection direction resides divides the reference horizontal plane into a first half region and a second half region, wherein the target projection direction points to the first half region and the candidate projection location is positioned in the first half region;

a source orientation projection direction projected by a source orientation direction of the source electronic device on the reference horizontal plane refers to the source projection location as an axis and rotates a first viewing angle toward two sides of the axis to define a target viewing angle region, wherein the source orientation projection direction divides the target viewing angle region into a first half region and a second half region, the target projection direction points to the first half region, and the candidate projection location is positioned in the first half region;
a fourteen included angle is defined by the source orientation projection direction and the target projection direction, and a fifteen included angle is defined by the first projection direction and the source orientation projection direction, wherein the fourteen included angle and the fifteen included angle are both less than the first viewing angle;
a sixteen included angle is defined by a candidate orientation projection direction projected by a candidate orientation direction of the candidate electronic device on the reference horizontal plane and a first inverse projection direction, the fourteen included angle and the fifteen included angle are both less than the first viewing angle, and the sixteen included angle is less than a second viewing angle, wherein the candidate projection location is a starting point of the first inverse projection direction, and the first inverse projection direction points to the source projection location; and
the candidate orientation projection direction refers to the candidate projection location as an axis and rotates the second viewing angle toward two sides of the axis to define a candidate viewing angle region, wherein the source projection location is positioned in the candidate viewing angle region, the target projection direction points to the first half region, and the candidate projection location is positioned in the first half region.

5. The multimedia interaction system of claim 4, wherein the location detection circuit is positioned higher than the source electronic device, the candidate electronic device, and the third electronic device, and the first viewing angle is equal to the second viewing angle.

6. The multimedia interaction system of claim 1, further comprising:
a third electronic device, comprising a third display;
wherein the location detection circuit detects a spatial location and an orientation of the third electronic device, and the candidate electronic device displays a relative position among the source electronic device, the candidate electronic device, and the third electronic device on a partial region of the candidate display and displays an animation related to a motion of the target image object on the partial region.

7. The multimedia interaction system of claim 1, wherein the candidate electronic device receives information related to a spatial location and an orientation of the source electronic device from at least one of the location detection circuit and the source electronic device.

8. The multimedia interaction system of claim 1, further comprising:
a forwarding electronic device, configured to be a command-transmitting medium among the electronic devices;
wherein the forwarding electronic device receives information related to a location and an orientation of the source electronic device from at least one of the location detection circuit and the source electronic device, and provides the information to the candidate electronic device.

9. A computer program product, stored in a non-transitory storage device of a candidate electronic device comprising a candidate display, enabling the candidate electronic device to perform a multimedia interaction operation when executed by a control circuit of the candidate electronic device, wherein the multimedia interaction operation comprises:
receiving spatial coordinates of multiple receiving-end reference points of the candidate electronic device from a location detection circuit;
computing a central location of a multimedia interaction program window displayed on the candidate display according to the spatial coordinates of the receiving-end reference points to represent a spatial location of the candidate electronic device;
utilizing a communication circuit of the candidate electronic device to dynamically receive information related to a spatial location and an orientation for each of the candidate electronic device and one or more electronic devices through a wireless communication approach;
when a user instructs a source electronic device of the one or more electronic devices to transmit a target image object toward a target direction, utilizing the control circuit to receive information of the target direction and a target command corresponding to the target image object from the source electronic device;
utilizing the control circuit to determine whether a relative position between the candidate electronic device and the target direction satisfies a predetermined condition; and
utilizing the candidate display to perform a multimedia operation corresponding to the target image object according to the target command only if the relative position between the candidate electronic device and the target direction satisfies the predetermined condition.

10. The computer program product of claim 9, wherein the predetermined condition comprises at least one of the following conditions:
the candidate electronic device is positioned in a pillar region to which the target direction pointed, wherein the target direction is an axis of the pillar region and a radius of the pillar region is a first predetermined value;
the candidate electronic device is positioned in a pyramidal or cone region to which the target direction pointed, wherein the target direction is an axis of the pyramidal or cone region, a location of the target image object is an apex of the pyramidal or cone region, and a vertex angle of the pyramidal or cone region is an acute angle;
the target direction is parallel to a target shifted direction, a first included angle between the target shifted direction and a first direction is an acute angle, and the first included angle is less than a threshold angle, wherein a location of the source electronic device is a starting point of both the target shifted direction and the first direction, and the first direction points to a location of the candidate electronic device;
a second included angle between the target shifted direction and a second direction is an acute angle and the first included angle is less than the second included angle, wherein the location of the source electronic device is a starting point of the second direction and the second direction points to a location of a third electronic device of the electronic devices;
the candidate electronic device is positioned on a target path to which the target direction points, and a section of the target path between the source electronic device and the candidate electronic device does not contact with other electronic devices of the electronic devices;
a distance between the location of the candidate electronic device and the target path is less than the first predetermined value, and a section of the target path between the source electronic device and the candidate electronic device does not contact with other electronic devices of the electronic devices;

the target path passes through the candidate display, and a section of the target path between the source electronic device and the candidate electronic device does not contact with other electronic devices of the electronic devices;

the candidate electronic device is positioned on a target vertical plane in which the target path resides, and a section of the target vertical plane between the source electronic device and the candidate electronic device does not contact with other electronic devices of the electronic devices;

a distance between the location of the candidate electronic device and the target vertical plane is less than the first predetermined value, and a section of the target vertical plane between the source electronic device and the candidate electronic device does not contact with other electronic devices of the electronic devices;

the candidate electronic device is positioned on the target path;

the distance between the location of the candidate electronic device and the target path is less than the first predetermined value;

the target path passes through the candidate display;

the candidate electronic device is positioned on the target vertical plane;

the distance between the location of the candidate electronic device and the target vertical plane is less than the first predetermined value;

a third included angle is defined by the first direction and the second direction, and the first included angle is less than a half of the third included angle;

a second vertical plane in which the second direction resides divides a space into a first half space and a second half space, wherein the target direction points to the first half space and the candidate electronic device is positioned in the first half space;

a source vertical plane in which a source orientation direction of the source electronic device resides refers to the location of the source electronic device as an axis and rotates a first viewing angle toward two sides of the axis to define a target viewing angle region, wherein the source vertical plane divides the target viewing angle region into a first half region and a second half region, the target direction points to the first half region, and the candidate electronic device is positioned in the first half region;

a fourth included angle is defined by the source orientation direction and the target shifted direction, a fifth included angle is defined by the first direction and the source orientation direction, and the fourth included angle and the fifth included angle are both less than the first viewing angle;

a sixth included angle is defined by a candidate orientation direction of the candidate electronic device and a first inverse direction, the fourth included angle and the fifth included angle are both less than the first viewing angle, and the sixth included angle is less than a second viewing angle, wherein the location of the candidate electronic device is a starting point of the first inverse direction, and the first inverse direction points to the location of the source electronic device; and a candidate vertical plane in which the candidate orientation direction resides refers to the location of the candidate electronic device as an axis and rotates the second viewing angle toward two sides of the axis to define a candidate viewing angle region, wherein the source electronic device is positioned in the candidate viewing angle region, the target direction points to the first half region, and the candidate electronic device is positioned in the first half region.

11. The computer program product of claim 9, wherein the predetermined condition comprises at least one of the following conditions:

a target projection direction projected by the target direction on the reference horizontal plane points to a target projection path and a strip region, and a candidate projection location projected by the candidate electronic device on the reference horizontal plane is positioned in the strip region, wherein the target projection path is a central line of the strip region, and a width of the strip region is two times of a first predetermined value;

the target projection direction points to a triangle region, and the candidate projection location is positioned in the triangle region, wherein the target projection path is a central line of the triangle region, a projection location projected by the target image object on the reference horizontal plane is an apex of the triangle region, and a vertex angle of the triangle region is an acute angle;

an eleventh included angle between the target projection direction and a first projection direction is an acute angle and less than a threshold angle, wherein a source projection location projected by the source electronic device on the reference horizontal plane is a starting point of the first projection direction, and the first projection direction points to the candidate projection location;

a twelfth included angle between the target projection direction and a second projection direction is an acute angle, and the eleventh included angle is less than the twelfth included angle, wherein the source projection location is a starting point of the second projection direction, and the second projection direction points to a third projection location projected by a third electronic device of the electronic devices on the reference horizontal plane;

a projection of the source electronic device on the reference horizontal plane is a source projection region, a projection of the candidate electronic device on the reference horizontal plane is a candidate projection region, and the candidate projection region is positioned on the target projection path, wherein a section of the target projection path between the source projection region and the candidate projection region does not contact with projections of other ones of the electronic devices on the reference horizontal plane;

a distance between the candidate projection location and the target projection path is less than the first predetermined value, wherein a section of the target projection path between the source projection region and the candidate projection region does not contact with the projections of other ones of the electronic devices on the reference horizontal plane;

the target projection path passes through a display projection region projected by the candidate display on the reference horizontal plane, wherein a section of the target projection path between the source projection region and the candidate projection region does not contact with the projections of other ones of the electronic devices on the reference horizontal plane;

the candidate projection location is positioned on the target projection path;

the distance between the candidate projection location and the target projection path is less than the first predetermined value;

the target projection path passes through the display projection region;

a thirteen included angle is defined by the first projection direction and the second projection direction, and the eleventh included angle is less than a half of the thirteen included angle;

a second reference line in which the second projection direction resides divides the reference horizontal plane into a first half region and a second half region, wherein the target projection direction points to the first half region and the candidate projection location is positioned in the first half region;

a source orientation projection direction projected by a source orientation direction of the source electronic device on the reference horizontal plane refers to the source projection location as an axis and rotates a first viewing angle toward two sides of the axis to define a target viewing angle region, wherein the source orientation projection direction divides the target viewing angle region into a first half region and a second half region, the target projection direction points to the first half region, and the candidate projection location is positioned in the first half region;

a fourteen included angle is defined by the source orientation projection direction and the target projection direction, and a fifteen included angle is defined by the first projection direction and the source orientation projection direction, wherein the fourteen included angle and the fifteen included angle are both less than the first viewing angle;

a sixteen included angle is defined by a candidate orientation projection direction projected by a candidate orientation direction of the candidate electronic device on the reference horizontal plane and a first inverse projection direction, the fourteen included angle and the fifteen included angle are both less than the first viewing angle, and the sixteen included angle is less than a second viewing angle, wherein the candidate projection location is a starting point of the first inverse projection direction, and the first inverse projection direction points to the source projection location; and the candidate orientation projection direction refers to the candidate projection location as an axis and rotates the second viewing angle toward two sides of the axis to define a candidate viewing angle region, wherein the source projection location is positioned in the candidate viewing angle region, the target projection direction points to the first half region, and the candidate projection location is positioned in the first half region.

12. The computer program product of claim 9, wherein the multimedia interaction operation further comprises:

receiving information related to a spatial location and an orientation of a third electronic device from a location detection circuit;

displaying a relative position among the source electronic device, the candidate electronic device, and the third electronic device on a partial region of the candidate display; and displaying an animation related to a motion of the target image object on the partial region.

13. The computer program product of claim 9, wherein the multimedia interaction operation further comprises:

receiving information related to a location and an orientation of the source electronic device from at least one of a location detection circuit and the source electronic device.

14. The computer program product of claim 9, wherein the multimedia interaction operation further comprises:

receiving information related to a location and an orientation of the source electronic device from a forwarding electronic device.

* * * * *